US011288238B2

(12) United States Patent
Bono et al.

(10) Patent No.: US 11,288,238 B2
(45) Date of Patent: Mar. 29, 2022

(54) METHODS AND SYSTEMS FOR LOGGING DATA TRANSACTIONS AND MANAGING HASH TABLES

(71) Applicant: EMC IP Holding Company LLC, Hopkinton, MA (US)

(72) Inventors: Jean-Pierre Bono, Westboro, MA (US); Marc A. De Souter, Wayne, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 16/672,397

(22) Filed: Nov. 1, 2019

(65) Prior Publication Data
US 2021/0133158 A1 May 6, 2021

(51) Int. Cl.
G06F 16/00 (2019.01)
G06F 16/18 (2019.01)
G06F 16/901 (2019.01)

(52) U.S. Cl.
CPC ...... G06F 16/1865 (2019.01); G06F 16/9014 (2019.01)

(58) Field of Classification Search
CPC .................. G06F 16/1865; G06F 16/9014
See application file for complete search history.

(56) References Cited

U.S. PATENT DOCUMENTS

| | | | |
|---|---|---|---|
| 5,394,537 A * | 2/1995 | Courts | G06F 12/08 711/202 |
| 6,370,618 B1 | 4/2002 | Arimilli | |
| 6,920,110 B2 | 7/2005 | Roberts | |
| 9,069,553 B2 | 6/2015 | Zaarur et al. | |
| 9,250,953 B2 | 2/2016 | Kipp | |
| 9,330,103 B1 | 5/2016 | Bono et al. | |
| 9,443,095 B2 | 9/2016 | Lähteenmäki | |
| 9,485,310 B1 | 11/2016 | Bono et al. | |
| 9,501,419 B2 | 11/2016 | Rastogi | |
| 9,779,015 B1 * | 10/2017 | Oikarinen | G06F 16/10 |
| 2006/0101081 A1 * | 5/2006 | Lin | G06F 16/2343 |
| 2008/0270461 A1 | 10/2008 | Gordon et al. | |
| 2009/0248957 A1 * | 10/2009 | Tzeng | G06F 13/4239 711/103 |
| 2009/0287902 A1 | 11/2009 | Fullerton | |
| 2009/0307538 A1 * | 12/2009 | Hernandez | G06F 11/0745 714/54 |
| 2010/0274772 A1 | 10/2010 | Samuels | |

(Continued)

OTHER PUBLICATIONS

Rajwar et al., Virtualizing Transactional Memory. (Year: 2005).*

(Continued)

*Primary Examiner* — Syed H Hasan
(74) *Attorney, Agent, or Firm* — Chamberlain, Hrdlicka, White, Williams & Aughtry

(57) ABSTRACT

A method for storing transaction records includes receiving, by a transaction log manager, a first commit request for a first transaction record from a first core, copying, based on the first commit request, the first transaction record to a first region of memory, making a first determination that the first region surpasses a space threshold, and copying, based on the first determination, a first plurality of transaction records from the first region to storage, wherein the first plurality of transaction records comprises the first transaction record.

14 Claims, 29 Drawing Sheets

(56) References Cited

U.S. PATENT DOCUMENTS

| | | |
|---|---|---|
| 2011/0161281 A1* | 6/2011 | Sayyaparaju ....... G06F 16/2379 |
| | | 707/607 |
| 2011/0289519 A1 | 11/2011 | Frost |
| 2011/0314246 A1 | 12/2011 | Miller et al. |
| 2012/0096059 A1 | 4/2012 | Shimizu et al. |
| 2013/0111136 A1 | 5/2013 | Bell, Jr. |
| 2013/0111146 A1 | 5/2013 | Ash |
| 2013/0227236 A1 | 8/2013 | Flynn et al. |
| 2014/0089619 A1 | 3/2014 | Khanna et al. |
| 2014/0195564 A1* | 7/2014 | Talagala ................ G06F 11/141 |
| | | 707/802 |
| 2014/0279859 A1 | 9/2014 | Benjamin-deckert et al. |
| 2017/0075812 A1 | 3/2017 | Wu |
| 2017/0286153 A1* | 10/2017 | Bak ......................... G06F 9/542 |

OTHER PUBLICATIONS

Satyanarayanan et al., Lightweight Recoverable Virtual Memory. (Year: 1994).*

Dr. Amit Golander, NetApp; "ZUFS—How to develop an efficient PM-based file system in user space"; SNIA Storage Development Conference EMEA; Feb. 2018.

Dr. Amit Golander, NetApp; "ZUFS—Simplifying the Development of PM-Based File Systems"; SNIA Persistent Memory Summit 2018; Jan. 24, 2018.

Shachar Sharon (NetApp); "ZUFS Overview—Developing PMEM-based File-System in User-Space"; Persistent Programming In Real Life(PIRL'19), University of California, San Diego; Jul. 22, 2019; https://pirl.nvsl.io/program/.

* cited by examiner

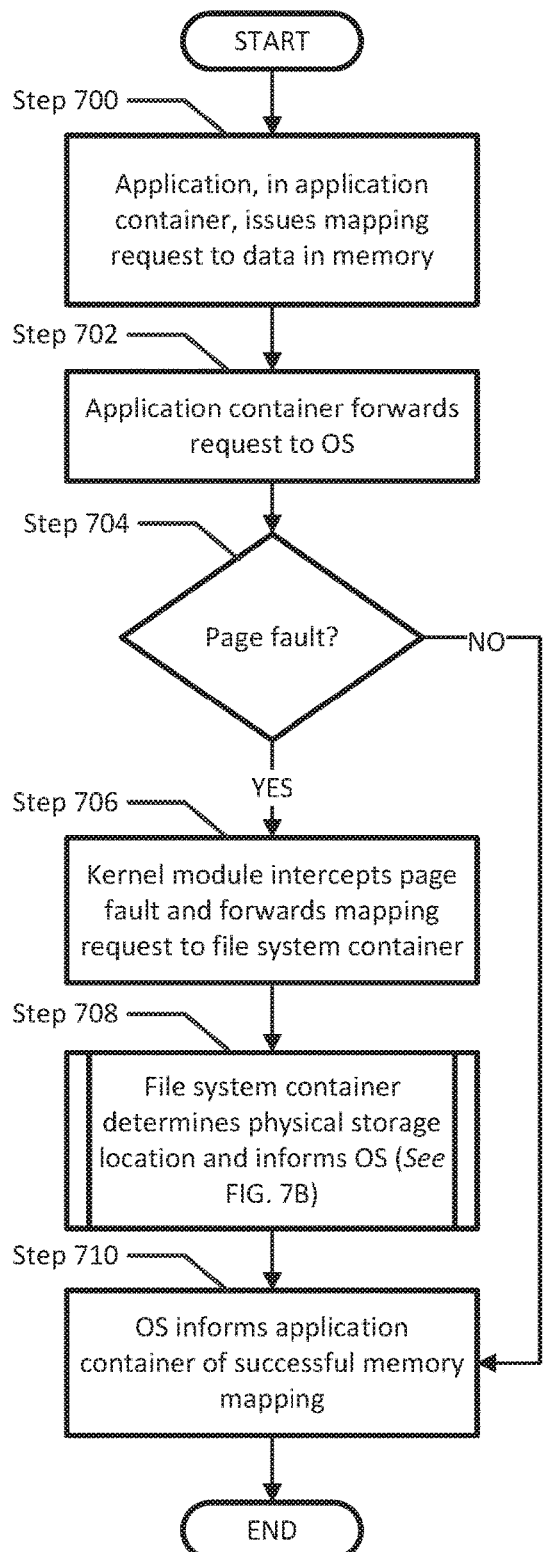
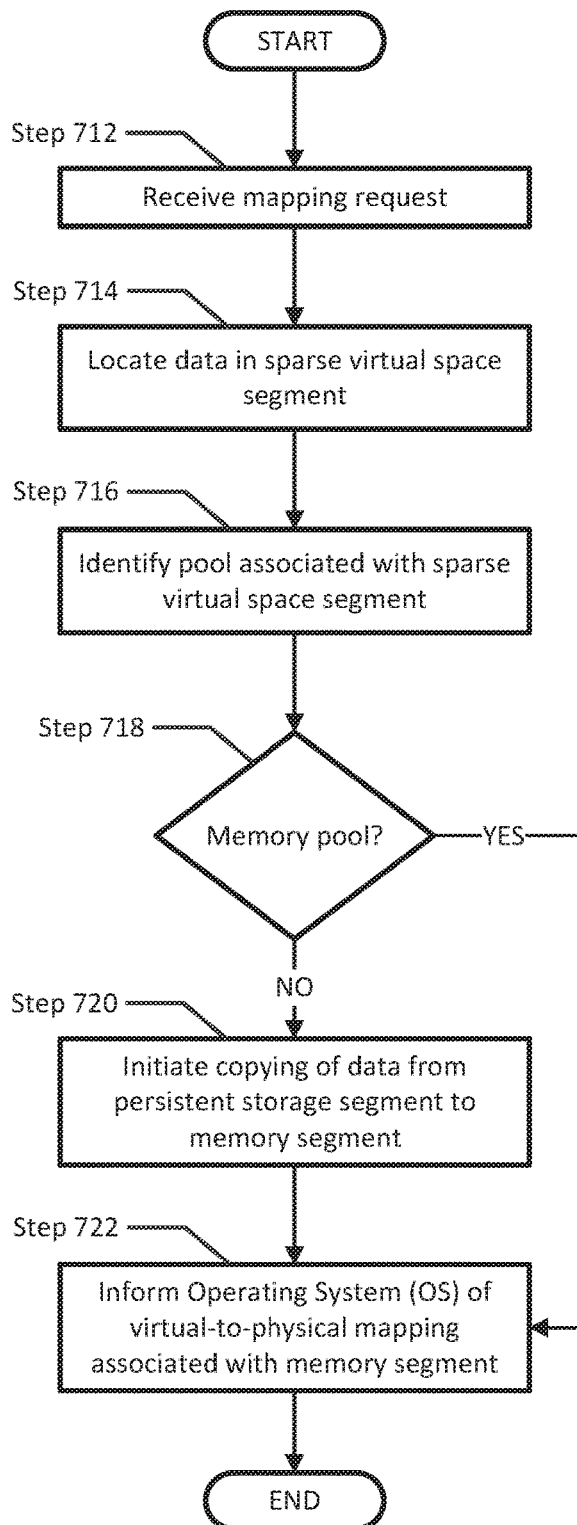
FIG. 7A
FIG. 7B

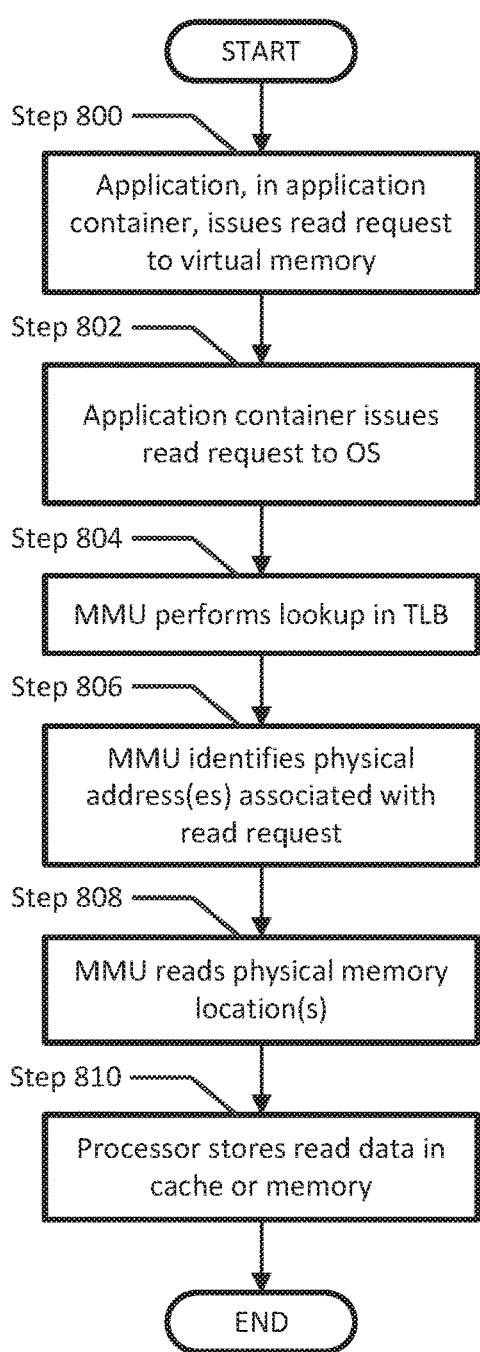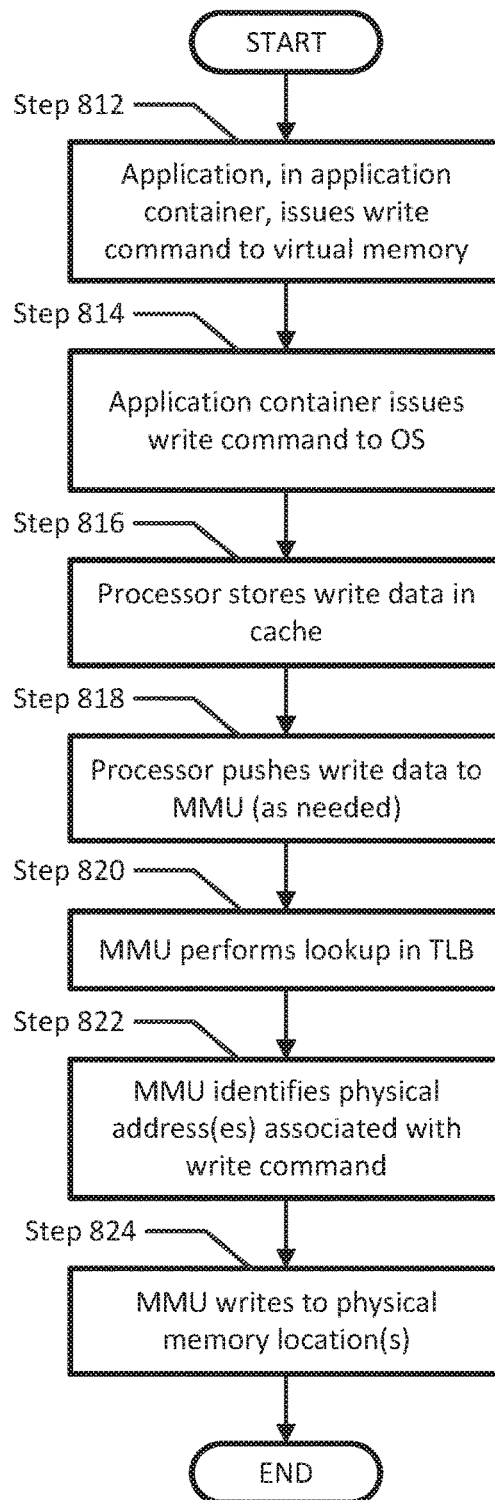
FIG. 8A
FIG. 8B

METHODS AND SYSTEMS FOR LOGGING DATA TRANSACTIONS AND MANAGING HASH TABLES

BACKGROUND

Devices and/or components of devices are often capable of performing certain functionalities that other devices and/or components are not configured to perform and/or are not capable of performing. In such scenarios, it may be desirable to adapt one or more system to enhance the functionalities of devices and/or components that cannot perform the one or more functionalities.

SUMMARY

In general, in one aspect, the invention relates to a method for processing requests. The method includes receiving, by a transaction log manager, a first commit request for a first transaction record from a first core, copying, based on the first commit request, the first transaction record to a first region of memory, making a first determination that the first region surpasses a space threshold, and copying, based on the first determination, a first plurality of transaction records from the first region to storage, wherein the first plurality of transaction records comprises the first transaction record.

In general, in one aspect, the invention relates to a non-transitory computer readable medium that includes instructions which, when executed by a computer processor, enables the computer processor to perform a method for processing requests. The method includes receiving, by a transaction log manager, a first commit request for a first transaction record from a first core, copying, based on the first commit request, the first transaction record to a first region of memory, making a first determination that the first region surpasses a space threshold, and copying, based on the first determination, a first plurality of transaction records from the first region to storage, wherein the first plurality of transaction records comprises the first transaction record.

In general, in one aspect, the invention relates to a node that includes a node, that includes memory, and a processor, wherein the processor is configured to receive, by a transaction log manager, a first commit request for a first transaction record from a first core, copy, based on the first commit request, the first transaction record to a first region of the memory, make a first determination that the first region surpasses a space threshold, and copy, based on the first determination, a first plurality of transaction records from the first region to storage, wherein the first plurality of transaction records comprises the first transaction record.

Other aspects of the invention will be apparent from the following description and the appended claims.

BRIEF DESCRIPTION OF DRAWINGS

FIG. 7A shows a flowchart of a method of generating and servicing a read request in accordance with one or more embodiments of the invention.

FIG. 7B shows a flowchart of a method of servicing a mapping request in accordance with one or more embodiments of the invention.

FIG. 8A shows a flowchart of a method of directly reading data in accordance with one or more embodiments of the invention.

FIG. 8B shows a flowchart of a method of directly writing data in accordance with one or more embodiments of the invention.

DETAILED DESCRIPTION

Figure 1:
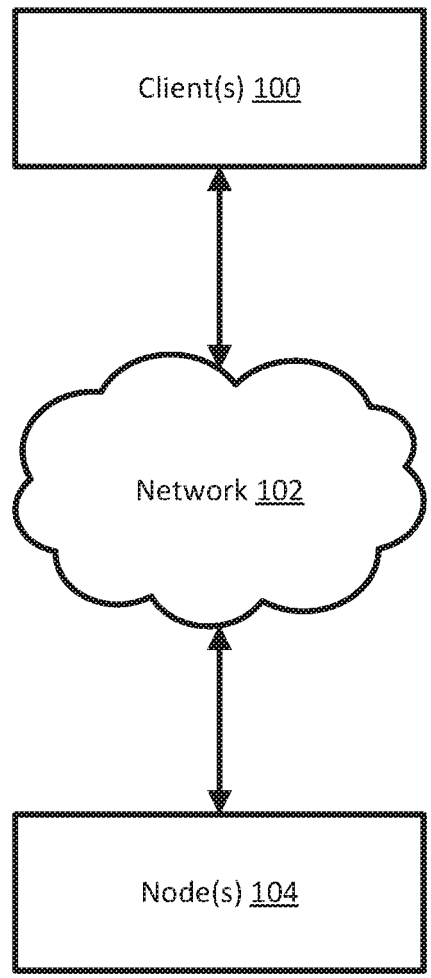
FIG. 1 shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging persistent memory to improve performance of data requests. More specifically, embodiments of the invention relate to a data management service that identifies, intercepts, and redirects requests to appropriate physical devices to optimize utilization of components of the system. Further, embodiments of the invention are directed to allowing for direct manipulation of persistent memory.

Embodiments of the invention described herein allow for, at least, implementing and intelligently leveraging memory to enhance performance. While the invention has been described with respect to a limited number of embodiments and examples, those skilled in the art, having benefit of this detailed description, would appreciate that other embodiments can be devised which do not depart from the scope of the invention as disclosed herein. Accordingly, the scope of the invention should be limited only by the attached claims.

FIG. 1 shows a diagram of a system in accordance with one or more embodiments of the invention. The system includes one or more client(s) (100), operatively connected to a network (102), which is operatively connected to one or more node(s) (104). The components illustrated in FIG. 1 may be connected via any number of operable connections supported by any combination of wired and/or wireless networks (e.g., network (102)). Each component of the system of FIG. 1 is discussed below.

In one embodiment of the invention, client(s) (100) are configured to issue requests to the node(s) (104) (or to a specific node of the node(s) (104)), to receive responses, and to generally interact with the various components of a node (described below).

In one or more embodiments of the invention, client(s) (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the client(s) (120) is implemented as a logical device. The logical device may utilize the computing resources of any number of computing devices and thereby provide the functionality of the client(s) (100) described throughout this application.

In one or more embodiments of the invention, client(s) (100) may request data and/or send data to the node(s) (104). Further, in one or more embodiments, client(s) (100) may initiate an application to execute on one or more node(s) (104) such the application may, itself, gather, transmit, and/or otherwise manipulate data on the node (e.g., node(s) (104)), remote to the client(s). In one or more embodiments, one or more client(s) (100) may share access to the same one or more node(s) (104) and may similarly share any data located on those node(s) (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) (104)) operatively connected to the network (102). In one embodiment of the invention, the client(s) (100) are operatively connected to the node(s) (104) via a network (e.g., network (102)).

Various embodiments of the node(s) (104) are provided in FIG. 2 and FIG. 3 below.

While FIG. 1 shows a specific configuration of a system, other configurations may be used without departing from the scope of the disclosure. For example, although the client(s) (100) and node(s) (104) are shown to be operatively connected through network (102), client(s) (100) and node(s) (104) may be directly connected, without an intervening network (e.g., network (102)). Further, the functioning of the client(s) (100) and the node(s) (104) is not dependent upon the functioning and/or existence of the other device(s) (e.g., node(s) (104) and client(s) (100), respectively). Rather, the client(s) (100) and the node(s) (104) may function independently and perform operations locally that do not require communication with other devices. Accordingly, embodiments disclosed herein should not be limited to the configuration of devices and/or components shown in FIG. 1.

Figure 2:
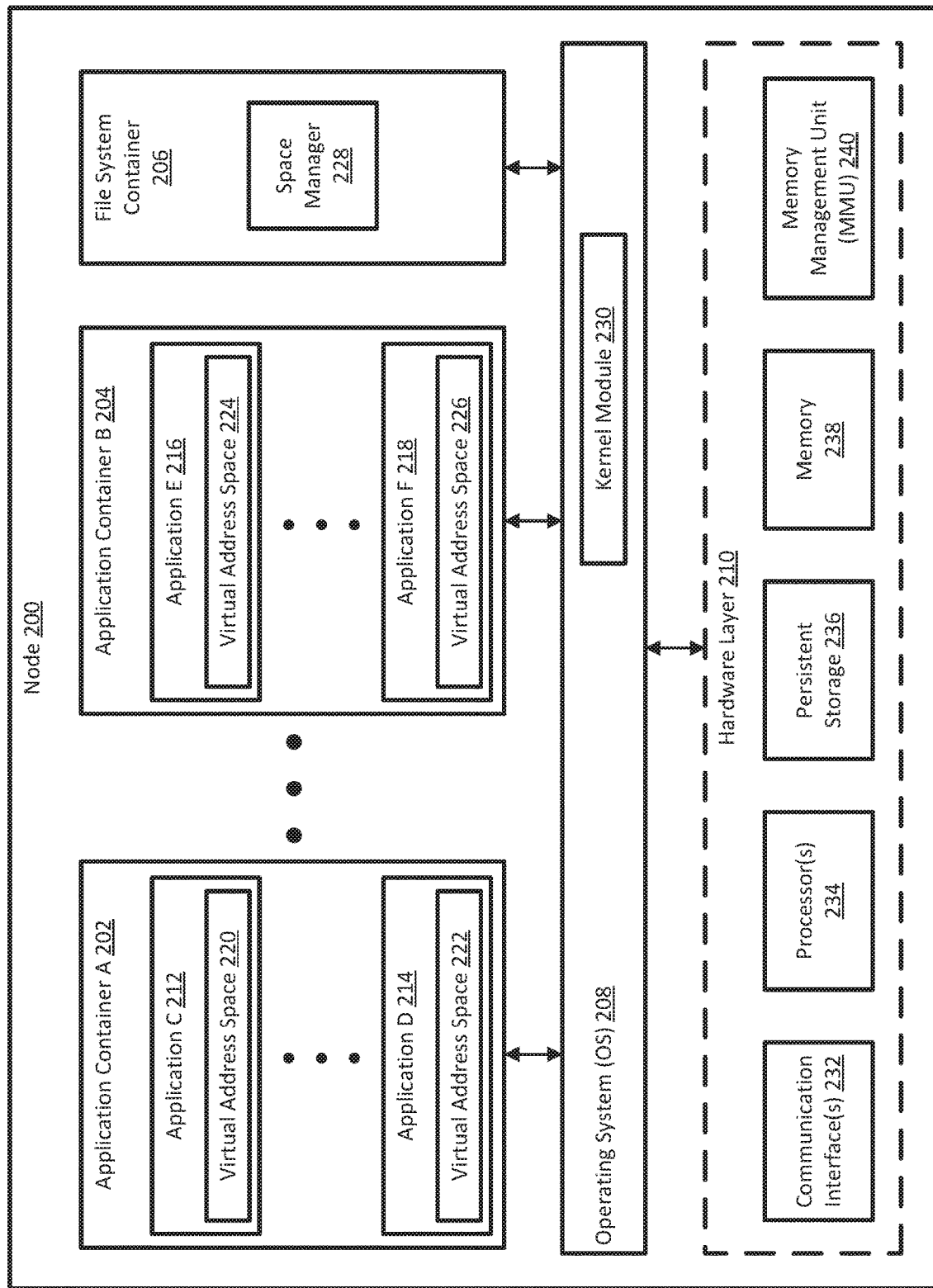
FIG. 2 shows a diagram of a node in accordance with one or more embodiments of the invention.

FIG. 2 shows a diagram of a node (200) in accordance with one or more embodiments of the invention. In one embodiment of the invention, node (200) includes one or more application container(s) (e.g., application container A (202), application container B (204)), a file system container (206), an operating system (OS) (208), and a hardware layer (210). Each of these components is described below. In one or more embodiments of the invention, the node (200) is configured to perform all, or a portion, of the functionality described in FIGS. 5-11.

In one or more embodiments of the invention, an application container (202, 204) is software executing on the node. In one embodiment of the invention, an application container (202, 204) may be an independent software instance that executes within a larger container management software instance (not shown) (e.g., Docker®, Kubernetes®). In one embodiment, where the application container (202, 204) is executing as an isolated software instance, the application container (202, 204) may establish a semi-isolated virtual environment, inside the container, in which to execute one or more applications (e.g., applications (212, 214, 216, 218), described below). In one embodiment of the invention, an application container (202, 204) may be executing in "user space" (e.g., a layer of the software that utilizes low-level system components for the execution of applications) of the operating system (OS) (208) of the node (200).

In one or more embodiments of the invention, an application container (202, 204) includes one or more applications (e.g., application C (212), application D (214), application E (216), application F (218)). In one embodiment of the invention, an application (212, 214, 216, 218) is software executing within the application container (e.g., 202, 204), that may include instructions which, when executed by a processor(s) (234), initiate the performance of one or more operations of components of the hardware layer (210). Although applications (212, 214, 216, 218) are shown executing within application containers (202, 204) of FIG. 2, one or more applications (e.g., 212, 214, 216, 218) may execute outside of an application container (e.g., 212, 214, 216, 218). That is, in one or more embodiments, one or more applications (e.g., 212, 214, 216, 218) may execute in a non-isolated instance, at the same level as the application container (202, 204) or file system container (206).

In one or more embodiments of the invention, each application (212, 214, 216, 218) includes a virtual address space (e.g., virtual address space (220), virtual address space (222), virtual address space (224), virtual address space (226)). In one embodiment of the invention, a virtual address space (220, 222, 224, 226) is a simulated range of addresses (e.g., identifiable locations) that mimics the physical locations of one or more components of the hardware layer (210). In one embodiment, an application (212, 214, 216, 218) is not configured to identify the physical addresses of one or more components of the hardware layer (210); rather, the application (212, 214, 216, 218) relies on other components of the node (200) to translate one or more virtual addresses of the virtual address space (e.g., 220, 222, 224, 226) to one or more physical addresses of one or more components of the hardware layer (210). Accordingly, in one or more embodiments of the invention, an application may utilize a virtual address space (220, 222, 224, 226) to read, write, and/or otherwise manipulate data, without being configured to directly identify the physical address of that data within the components of the hardware layer (210).

Additionally, in one or more embodiments of the invention, an application may coordinate with other components of the node (200) to establish a mapping between a virtual address space (e.g., 220, 222, 224, 226) and underlying physical components of the hardware layer (210). In one embodiment, if a mapping is established, an application's use of the virtual address space (e.g., 220, 222, 224, 226) enables the application to directly manipulate data of those physical components, without relying on other components of the node (200) to repeatedly update mappings between the virtual address space (e.g., 220, 222, 224, 226) and the physical addresses of one or more components of the hardware layer (210).

In one or more embodiments of the invention, a file system container (206) is software executing on the node (200). In one or more embodiments of the invention, a file system container (206) may be an independent software instance that executes within a larger container management software instance (not shown) (e.g., Docker®, Kubernetes®, etc.). In one embodiment, where the file system container (206) is executing as an isolated software instance, the file system container (206) may establish a semi-isolated virtual environment, inside the container, in which to execute an application (e.g., space manager (228), described below). In one embodiment of the invention, a file system container (206) may be executing in "user space" (e.g., a layer of the software that utilizes low-level system components for the execution of applications) of the OS (208).

In one embodiment of the invention, the file system container (206) includes a space manager (228). In one embodiment, a space manager (228) is software executing within the file system container (206), that may include instructions which, when executed, initiate operations of one or more components in the hardware layer (210).

In one or more embodiments of the invention, a space manager (228) may include functionality to generate one or more virtual-to-physical address mappings by translating a virtual address of a virtual address space (220, 222, 224, 226) to a physical address of a component in the hardware layer (210). Further, in one embodiment of the invention, the space manager may further be configured to communicate one or more virtual-to-physical address mappings to one or more components of the hardware layer (210) (e.g., memory management unit (240)). In one embodiments of the invention, the space manager (228) tracks and maintains virtual-to-physical address mappings through an abstraction layer(s) of virtual spaces that form a hierarchy of mappings to translate a virtual address to a physical address. In one or more embodiments of the invention, the space manager (228) is configured to maintain and utilize a hierarchy of addresses (via a sparse virtual space, one or more memory pool(s), and one or more persistent storage pool(s)) a described in FIG. 4. Additionally, in one or more embodiments of the invention, a space manager is configured to initiate the copying of data from one storage medium to another based on a determination that a storage device may be incapable of servicing an application request.

In one or more embodiments of the invention, an OS (208) is software executing on the node (200). In one embodiment of the invention, an OS (208) coordinates operations between software executing in "user space" (e.g., containers (202, 204, 206), applications (212, 214, 216, 218)) and one or more components of the hardware layer (210) to facilitate the proper use of those hardware layer (210) components. In one or more embodiments of the invention, the OS (208) includes a kernel module (230). In one embodiment of the invention, the kernel module (208) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (210) is a collection of physical components configured to perform the operations of the node (200) and/or otherwise execute the software of the node (200) (e.g., those of the containers (202, 204, 206), applications (212, 214, 216, 218).

In one embodiment of the invention, the hardware layer (210) includes one or more communication interface(s) (232). In one embodiment of the invention, a communication interface (232) is a hardware component that provides capabilities to interface the node (200) with one or more devices (e.g., a client, another node, a network of devices) and allow for the transmission and receipt of data with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the hardware layer (210) includes one or more processor(s) (234). In one embodiment of the invention, a processor (234) may be an integrated circuit for processing instructions (e.g., those of the containers (202, 204, 206), applications (212, 214, 216, 218) and/or those received via a communication interface (232)). In one embodiment of the invention, processor(s) (234) may be one or more processor cores or processor micro-cores. Further, in one or more embodiments of the invention, one or more processor(s) (234) may include cache (as described in FIG. 3 below).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.).

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212, 214, 216, 218), containers (202, 204, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage: "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory devices (238).

Examples of memory (238) devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

In one embodiment of the invention, the hardware layer (210) includes a memory management unit (MMU) (240). In one or more embodiments of the invention, an MMU (240) is hardware configured to translate virtual addresses (e.g., those of a virtual address space (220, 222, 224, 226)) to physical addresses (e.g., those of memory (238)). In one embodiment of the invention, an MMU (240) is operatively connected to memory (238) and is the sole path to access any memory device (e.g., memory (238)) as all commands and data destined for memory (238) must first traverse the MMU (240) prior to accessing memory (238). In one or more embodiments of the invention, an MMU (240) may be configured to handle memory protection (allowing only certain applications to access memory) and provide cache control and bus arbitration. Further, in one or more embodiments of the invention, an MMU (240) may include a translation lookaside buffer (as described in FIG. 3 below).

While FIG. 2 shows a specific configuration of a node, other configurations may be used without departing from the scope of the disclosure. Accordingly, embodiments disclosed herein should not be limited to the configuration of devices and/or components shown in FIG. 2.

Figure 3:
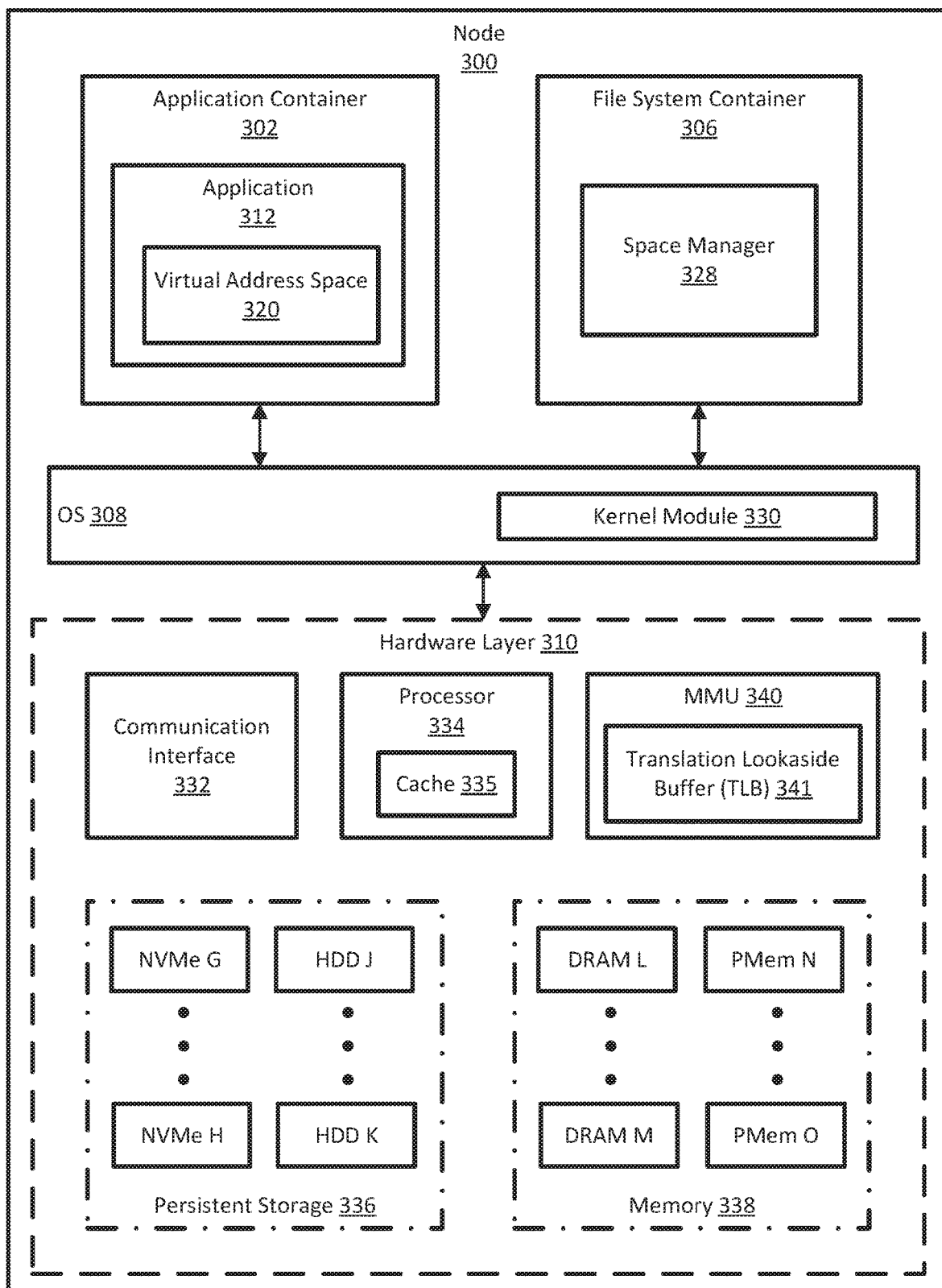
FIG. 3 shows an example of a node in accordance with one or more embodiments of the invention.

FIG. 3 shows an example of one embodiment of a node (300). In one embodiment of the invention, node (300) includes an application container (302) with application (312) and virtual address space (320), a file system container (306) with space manager (328), an OS (308) with kernel module (330), and a hardware layer (310) with communication interface (332), processor (334) with cache (335), MMU (340) with a translation lookaside buffer (TLB) (341), persistent storage (336), and memory (338). Similarly named parts shown in FIG. 3 have all of the same properties and functionalities as described above in FIG. 2. Accordingly, only additional properties and functionalities will be described below.

In one or more embodiments of the invention, processor (334) includes cache (335). In one embodiment of the invention, cache (335) may be one or more hardware devices capable of storing digital information (e.g., data) in a non-transitory medium. Cache (335) may be used internally by the processor (334) to perform operations on data, as requested by one or more software instances (e.g., application container (302), application (312), file system container (306), space manager (328), OS (308), etc.) or hardware layer components (e.g., communication interface (332), MMU (340), TLB (341), etc.).

In one or more embodiments of the invention, cache (335) is a limited resource (e.g., little total space) and may therefore reach a maximum capacity more quickly than other devices of the hardware layer (e.g., persistent storage (336) and memory (338)). However, although limited in total capacity, cache may be significantly faster at performing operations (e.g., reading, writing) than other devices of the hardware layer (e.g., persistent storage (336) and memory (338)). In one embodiment of the invention, data may only be located in cache temporarily, prior to being copied to memory (338) and/or persistent storage (336). Further data, located in cache, may be considered "uncommitted" or "dirty" until copied to memory (338) and/or persistent storage (336).

In one or more embodiments of the invention, MMU (340) includes TLB (341). In one embodiment of the invention, TLB (341) may be one or more hardware devices capable of storing digital information (e.g., data) in a non-transitory medium. Specifically, in one embodiment of the invention, the TLB (341) stores one or more virtual-to-physical address mappings which the MMU may access.

In one or more embodiments of the invention, although memory (338) may use a series of physical addresses to locate data, application (312) uses a series of virtual addresses (e.g., those of virtual address space (320)) to reference data. Accordingly, the TLB (341) provides the MMU (340) a translation table that includes one or more virtual-to-physical address mappings to identify the physical address of memory (338) associated with a virtual address (as specified by an application request). Although shown as a component of MMU (340), the TLB (341) may be located outside of the MMU (340) and inside the hardware layer (310) generally, or as part of processor (334).

In the example shown here, persistent storage (336) is shown to include one or more NVMe devices and one or more HDD devices. Similarly, in the example shown here, memory (338) is shown to include a one or more DRAM devices and one or more PMem devices. These specific instances of persistent storage devices and memory devices in FIG. 3 are shown for illustrative purposes only. One of ordinary skill in the art, having the benefit of this detailed description, would appreciate that persistent storage (336) and memory (338) may be comprised of any number of appropriate devices.

While FIG. 3 shows a specific example of a node, other configurations may be used without departing from the scope of the disclosure. Accordingly, embodiments disclosed herein should not be limited to the configuration of devices and/or components shown in FIG. 3.

Figure 4:
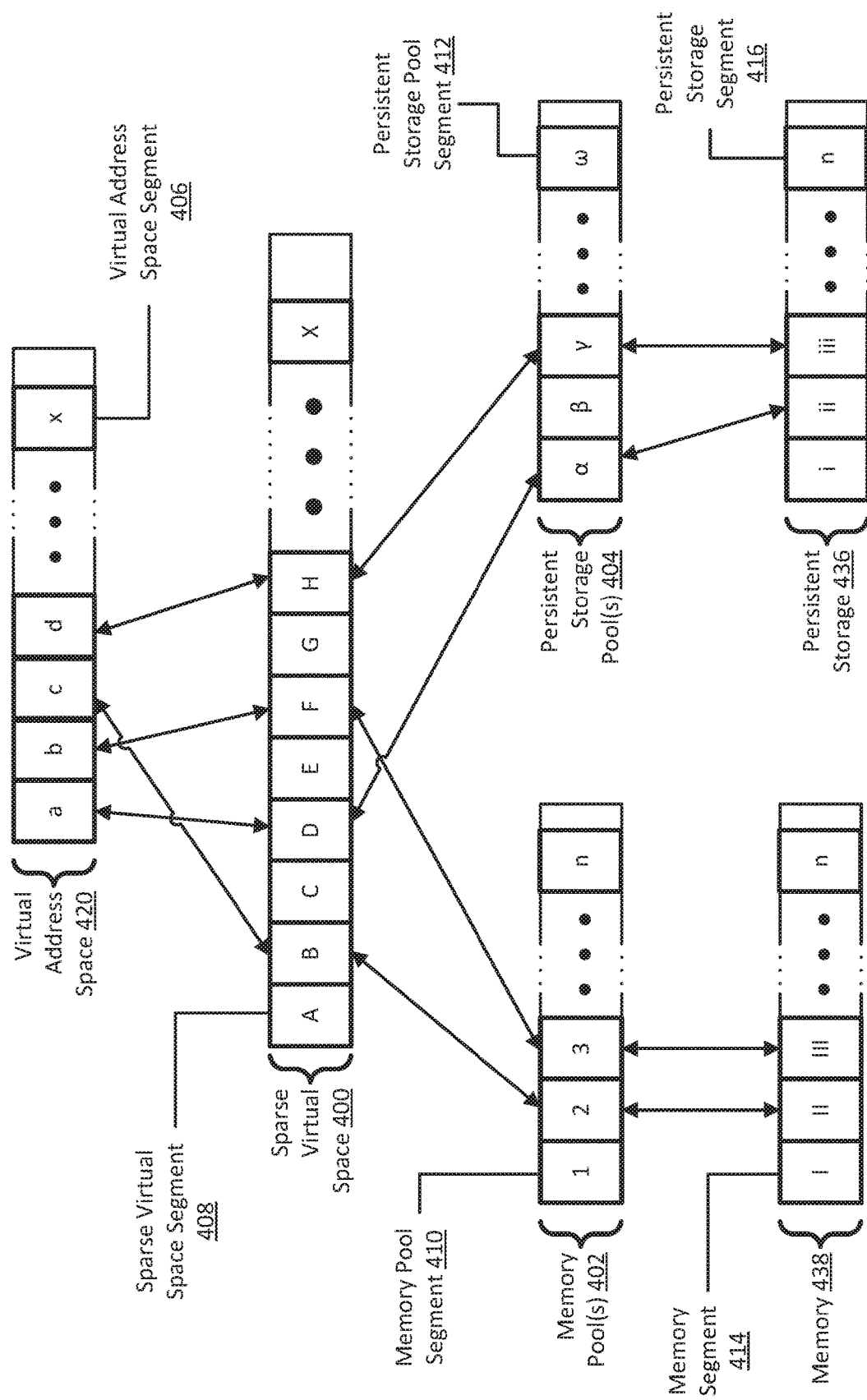
FIG. 4 shows relationships between various virtual and physical elements in the system in accordance with one or more embodiments of the invention.

FIG. 4 shows a diagram of a virtual-to-physical segment hierarchy in accordance with one or more embodiments of the invention. In one embodiment of the invention, the virtual-to-physical segment hierarchy includes a virtual address space (420), a sparse virtual space (400), one or more memory pool(s) (402), one or more persistent storage pool(s) (404), memory (438), and persistent storage (436). Each of these components is described below.

In one or more embodiments of the invention, virtual address space (420) has all of the same properties and functionalities as the virtual address space(s) described above in FIG. 1. Additionally, in one embodiment of the invention, a virtual address space (e.g., virtual address space (420)) may include one or more virtual address space segment(s) (e.g., virtual address space segment (406)). In one or more embodiments of the invention, a virtual address space segment (406) may correspond to some other smaller portion of the virtual address space (420) (e.g., a subset of virtual addresses). In one embodiment of the invention, virtual address space segment (406) may be associated with a single virtual address (as described in FIG. 1). In one or more embodiments of the invention, a virtual address space address segment (406) is mapped to a sparse virtual space segment (408) (described below). In one embodiment of the invention, every virtual address space segment (e.g., virtual address space segment (404)) is individually and uniquely mapped to a unique sparse virtual space segment (e.g., sparse virtual space segment (408)).

In one or more embodiments of the invention, sparse virtual space (400) is a sparse, virtual data structure that provides a comprehensive layout and mapping of data managed by the file system container of the node. In one embodiment of the invention, the sparse virtual space (400) spans the entire virtual-to-physical segment hierarchy, such that every adjacent layer in in the virtual-to-physical segment hierarchy maps to the sparse virtual space (400). That is, while there may be multiple virtual address space(s) (e.g., virtual address space (420), others not shown) and there may be multiple pool(s) for storage (e.g., memory pool(s) (402), persistent storage pool(s) (404)), there is only one sparse virtual space (400).

Further, as the sparse virtual space (400) may need to be continually updated to allow for new internal associations with adjacent layers, the sparse virtual space (400) may be initially allocated substantially sparse enough to be able to handle new associations without having to allocate additional space outside of that initially reserved. Accordingly, for example, the sparse virtual space may be allocated with several petabytes of sparse space, with the intention being that the physical memory and persistent storage (associated with the sparse virtual space) will not exceed several petabytes of physical storage space.

In one or more embodiments of the invention, the sparse virtual space (400) may include one or more sparse virtual space segment(s) (e.g., sparse virtual space segment (408)). In one embodiment of the invention, a sparse virtual space segment (408) is a smaller virtual sub-region of the sparse virtual space (400) that is uniquely associated with some data. In one or more embodiments of the invention, a sparse virtual space segment (408) may provide the logical volume and logical volume offset for data (physically located in the persistent storage and/or memory of the node).

In one or more embodiments of the invention, each sparse virtual space segment (e.g., sparse virtual space segment (408)) is uniquely associated with a unique memory pool segment (410) or a unique persistent storage pool segment (412), as explained below.

In one or more embodiments of the invention, each sparse virtual space segment (408) may be uniformly sized throughout the sparse virtual space (400). In one or more embodiments of the invention, each sparse virtual space segment (408) may be equal to the largest memory pool segment (410) or persistent storage pool segment (412) associated with the sparse virtual space (e.g., the largest block of a persistent storage device). Alternatively, in one or more embodiments of the invention, each sparse virtual space segment (408) may be allocated to be sufficiently larger than any current and future individual memory pool segment (410) and/or persistent storage pool segment (412) (e.g., larger than a persistent storage block).

In one or more embodiments of the invention, memory pool(s) (402) are virtual data spaces that identify physical regions of a portion of, one, or several memory devices (e.g., memory (438)) of the hardware layer. Memory pool(s) (402) may identify physical regions of memory by maintaining a virtual mapping to the physical addresses of data that comprise those memory devices (e.g., memory (438)).

In one or more embodiments of the invention, several memory pools (402) may concurrently exist, each of which is independently mapped to part of, one, or several memory devices (e.g., memory (438)). Alternatively, in one embodiment of the invention, there may only be a single memory pool (402) associated with the physical regions of data of all memory devices (e.g., memory (438)) in a node.

In one embodiment of the invention, a single memory pool (of memory pool(s) (402)) may be uniquely associated with a single memory device. Accordingly, a single memory pool may provide a one-to-one virtual emulation of a single memory device of the hardware layer. Alternatively, in one or more embodiments of the invention, a single memory pool may be associated with multiple memory devices, each sharing some characteristic. For example, there may be a single memory pool for two or more DRAM devices and a second memory pool for two or more PMem devices. One of ordinary skill in the art, having the benefit of this detailed description, would appreciate that memory pool(s) (402) may be organized by any suitable characteristic of the underlying memory (e.g., based on individual size, collective size, type, speed, etc.).

In one or more embodiments of the invention, memory pool(s) (402) include one or more memory pool segment(s) (e.g., memory pool segment (410)). In one embodiment of the invention, a memory pool segment (410) is a smaller sub-region of a memory pool (402) that is uniquely associated with some data located in memory (438). Further, one or more memory pool segment(s) (410) may be uniquely associated with one or more unique regions of a memory device (e.g., memory segment (414)). For example, memory pool segment (410) may be associated with a physical address range on a memory device (e.g., memory (438)) that corresponds to the physical location of a single byte of data (as explained below).

In one or more embodiments of the invention, memory (438) has all of the same properties and functionalities as the memory described in FIG. 1 above. Additionally, as disclosed in FIG. 4, memory (438) may include one or more memory segment(s) (e.g., memory segment (414)) that divide memory (438) in smaller sub-regions. In one or more embodiments of the invention, a memory segment (414) is a unique physical region of the memory (438) that stores data and is accessible using a physical address.

In one or more embodiments of the invention, as shown in FIG. 4, two or more contiguous memory pool segments (410) are associated with two or more contiguous memory segments (414), respectively. Accordingly, there may be a sequential mapping between memory (438) and a memory pool (402) such that by referencing a sequence of memory pool segments (e.g., "1", "2", "3" of memory pool(s) (402)), a corresponding sequence of memory segments (e.g., "I", "II", "III" of memory (438)) will be accessed. Further, when a direct mapping between a memory pool (402) and memory (438) is maintained, the memory pool, alone, provides an accurate, direct, and sequential representation of the underlying memory (e.g., total space, data location, available space, etc.). Alternatively, in one embodiment of the invention, a series of memory pool segment(s) (410) are not consecutively associated with a series of memory segment(s) (414) (not shown).

In one or more embodiments of the invention, persistent storage pool(s) (404) are virtual data spaces that identify regions of a portion of, one, or several persistent storage devices (e.g., persistent storage (436)) of the hardware layer. Persistent storage pool(s) (404) may identify physical regions of persistent storage by maintaining a virtual mapping to the physical location of data that comprise those persistent storage devices (e.g., persistent storage (436)).

In one or more embodiments of the invention, several persistent storage pools (404) may concurrently exist, each of which is independently mapped to part of, one, or several persistent storage devices (e.g., persistent storage (436)). Alternatively, in one embodiment of the invention, there may only be a single persistent storage pool (404) associated with the physical locations of data on all persistent storage devices (e.g., persistent storage (438)) in a node.

In one embodiment of the invention, a single persistent storage pool (of persistent storage pool(s) (404)) may be uniquely associated with a single persistent storage device. Accordingly, a single persistent storage pool may provide a one-to-one virtual emulation of a single persistent storage device of the hardware layer. Alternatively, in one or more embodiments of the invention, a single persistent storage pool may be associated with multiple persistent storage devices, each sharing some characteristic. For example, there may be a first persistent storage pool for two or more NVMe devices and a second persistent storage pool for two or more SSD devices. One of ordinary skill in the art, having the benefit of this detailed description, would appreciate that persistent storage pool(s) (404) may be organized by any suitable characteristic of the underlying persistent storage (e.g., based on individual size, collective size, type, speed, etc.).

In one or more embodiments of the invention, persistent storage pool(s) (404) include one or more persistent storage pool segment(s) (e.g., persistent storage pool segment (412)). In one embodiment of the invention, a persistent storage pool segment (412) is a smaller sub-region of a persistent storage pool (404) that is uniquely associated with some data located in persistent storage (436). Further, one or more persistent storage pool segment(s) (412) may be uniquely associated with one or more unique regions of a persistent storage device (e.g., persistent storage segment (416)).

In one or more embodiments of the invention, persistent storage (436) has all of the same properties and functionalities as the persistent storage described in FIG. 1 above. Additionally, as disclosed in FIG. 4, persistent storage (436) may include one or more persistent storage segment(s) (e.g., persistent storage segment (416)) that divide persistent storage (436) in smaller sub-regions. In one or more embodiments of the invention, a persistent storage segment (416) is a unique physical region of persistent storage (436) that stores data and is accessible using a physical address.

In one or more embodiments of the invention, as shown in FIG. 4, two or more contiguous persistent storage pool segments (412) are not associated with two or more contiguous persistent storage segments (416). Accordingly, there may be a non-sequential mapping between persistent storage (436) and a persistent storage pool (404) such that by referencing a non-sequential series of persistent storage pool segments (e.g., "α", "γ", of persistent storage pool(s) (404)), a corresponding sequential or non-sequential series of persistent storage segments (e.g., "ii", "iii" of persistent storage (436)) will be accessed. Alternatively, in one embodiment of the invention, like memory pool(s) (402) and memory (438), there may be a corresponding sequential association of segments between the persistent storage pool segments (412) and persistent storage segments (416) (not shown).

Accordingly, in one embodiment of the invention, the virtual-to-physical segment hierarchy of FIG. 4 provides a mapping from a virtual address space segment (406) of an application to a physical location of the hardware (memory segment (414) or persistent storage segment (416)).

As an example, virtual address space (420) may correspond to a single file being accessed by the application where each virtual address space segment ("a", "b", "c", and "d") represent four bytes of that file. In order for the application to access those four bytes, the space manager locates, in the sparse virtual space, the unique sparse virtual space segments that are associated with those four bytes ("D", "F", "B", and "H", respectively). In turn, two of those sparse virtual space segments ("B" and "F") are mapped to two memory pool segments ("2" and "3", respectively); while the other two sparse virtual space segments ("D" and "H") are mapped to two persistent pool segments ("α" and "γ", respectively). As the memory pool (402) maintains a one-to-one sequential mapping to memory (438), the two memory pool segments, "2" and "3", directly correspond to memory segments "II" and "III". For persistent storage pool (404), however, a sequential mapping to persistent storage (436) is not maintained, and the two persistent pool segments, "α" and "γ", are associated with persistent storage segments "ii" and "iii", respectively. Accordingly, the original segments of data ("a", "b", "c", and "d") may be translated to the physical locations of each segment ("ii", "III", "II", and "ii", respectively) using the virtual-to-physical segment hierarchy.

While FIG. 4 shows a specific configuration of a virtual-to-physical segment hierarchy, other configurations may be used without departing from the scope of the disclosure. For instance, as discussed above, there may be many virtual address spaces of several applications that may access the sparse virtual space to identify the physical location of data. Further, there can be any number of memory pools and/or persistent storage pools mapping into the sparse virtual space. Similarly, the memory pools and persistent storage pools may be mapped into any number of memory and persistent storage devices, respectively. Accordingly, embodiments disclosed herein should not be limited to the configuration of devices and/or components shown in FIG. 4.

Figure 5:
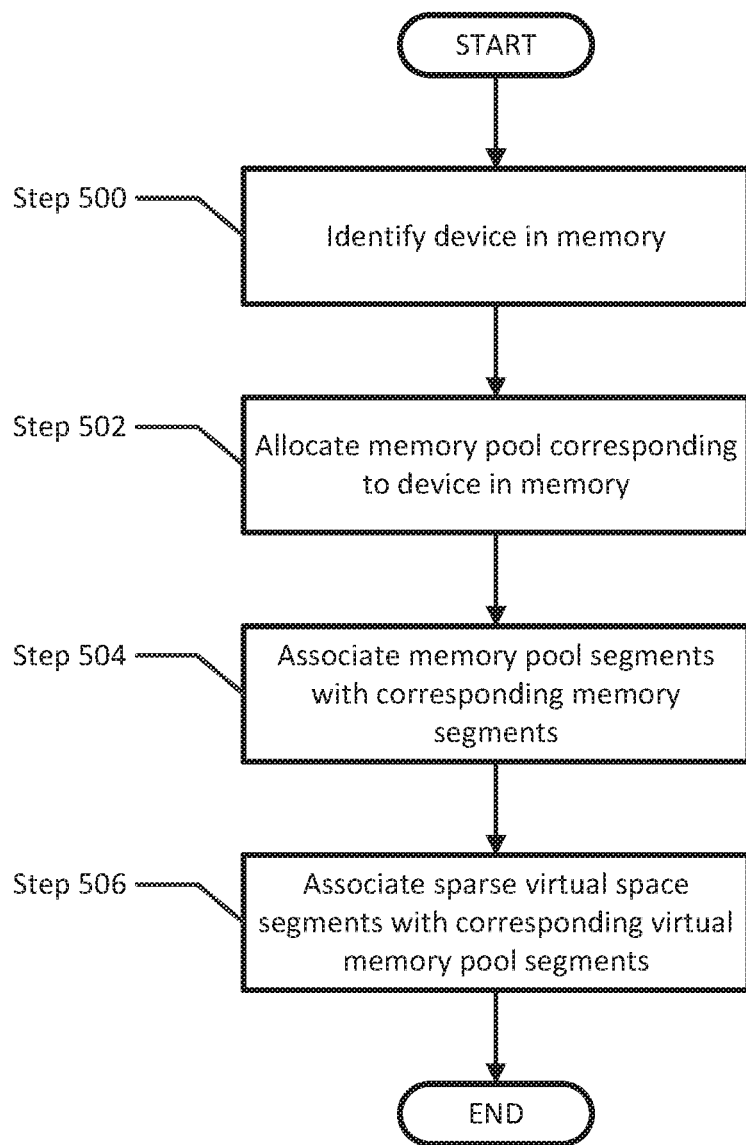
FIG. 5 shows a flowchart of a method of configuring the system in accordance with one or more embodiments of the invention.

FIG. 5 shows a flowchart of a method of creating a memory pool and a sparse virtual space, in accordance with one or more embodiments of the invention. All or a portion of the method shown in FIG. 5 may be performed by the space manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a space manager identifies one or more memory devices to which the node has access. In one or more embodiments of the invention, the selection of memory devices may be based on connectivity (i.e., if an operative connection to the memory devices exists), permissions to access the memory device, physical location (e.g., located within the node, or accessible through a communication interface), and/or other management roles (e.g., file system ownership). Further, some portion of a single memory device may be available to a space manager, while another portion of that same memory device will be inaccessible based on one or more of the aforementioned characteristics.

In one or more embodiments of the invention, a space manager will be caused to identify all memory devices to which the node has access (Step 500) based on one or more conditions including, for example, the node being initially configured, a change in the hardware being detected, user instruction, and/or other any other event that would cause the space manager to need to establish (or otherwise update) a sparse virtual space and memory pools.

In Step 502, the space manager allocates one or more memory pools corresponding to the one or more memory devices identified in Step 500. Specifically, as discussed above with respect to FIG. 4, memory pools may be created and/or organized based on any suitable characteristic of the underlying memory (e.g., individual size, collective size, type, speed, etc.). For example, if two DRAM devices and one PMem are identified in Step 500, the space manager may create two memory pools, one memory pool for both DRAM devices, and one memory pool for the PMem device.

Further, in one embodiment of the invention, the memory pool(s) created by the space manager are created to correspond to the size of the underlying memory. For example, if the first DRAM device is 1,000 Mb, the second DRAM device is 1,500 Mb, and the PMem device is 2,000 Mb, the first memory pool (associated with the DRAM) will need to be at least 2,500 Mb of virtual space whereas the second memory pool will need to be at least 2,000 Mb of virtual space.

Continuing with the example, if a first memory pool corresponds to two DRAM devices, the space manager may associate a first portion of the memory pool to the first DRAM device and a second portion of the memory pool to the second DRAM device. Then, assuming the same sizes described above, the first memory pool (associated with the DRAM devices) is divided into two portions, 1,000 Mb for the first portion, 1,500 Mb for the second portion. Further, as the second memory pool is only associated with a single PMem device, there is no need to allocate a device-level portion in the second memory pool.

In Step 504, the space manager partitions the memory pool(s) into an appropriate number of memory pool segments corresponding to the memory devices identified in Step 500. The size of each of the memory pool segments may be determined by the space manager and/or based on the underlying characteristics of the memory devices.

In one or more embodiments of the invention, each memory pool is divided into the number of segments equal to the number of bytes accessible on that memory device (e.g., memory segments). Continuing with the example above, the first region of the first memory pool (associated with the 1,000 Mb DRAM device) is partitioned into 1,000 segments. The second region of the first memory pool (associated with the 1,500 Mb DRAM device) is partitioned into 1,500 segments. And, finally, the second memory pool (associated with the 2,000 Mb PMem device) is partitioned into 2,000 segments, corresponding to the 2,000 Mb of that PMem device.

In one or more embodiments of the invention, once each memory pool is partitioned into memory pool segments, each memory pool segment is associated with a corresponding memory segment. Thus, for example, the first memory segment of the first DRAM device is associated with the first memory pool segment of the first memory pool associated with DRAM device. Then, for each sequential addressable region of the memory device, the same association may be established with corresponding memory pool segment.

In Step 506, each memory pool segment is associated with a unique sparse virtual space segment. In one or more embodiments of the invention, in the event that the sparse virtual space does not yet exist, the space manager allocates a sufficiently large region of virtual space to allow for associations to all existing and future memory devices. As described above for FIG. 4, the sparse virtual space may be allocated with several petabytes of sparse space, with the intention being that the physical memory and persistent storage (associated with the sparse virtual space) will not exceed several petabytes of physical storage space.

In one or more embodiments of the invention, after the creation of the sparse virtual space, the space manager divides the entire sparse virtual space into uniformly sized segments. As described above for FIG. 4, in one or more embodiments of the invention, each sparse virtual space segment may be allocated to be sufficiently larger than any current and future individual memory pool segment and/or persistent storage pool segment (e.g., larger than a persistent storage block).

In one or more embodiments of the invention, once the sparse virtual space is partitioned into a very large number of sparse virtual space segments, each memory pool segment (created in Step 504) is associated with one of the sparse virtual space segments. In one embodiment of the invention, the sparse virtual space segments, associated with the memory pool segments, are scattered throughout the sparse virtual space with no particular ordering. Alternatively, in one embodiment of the invention, the sparse virtual space segments associated with memory segments are grouped consecutively, or in multiple consecutive sequences throughout the sparse virtual space.

Continuing with the example above, the 3,500 memory pool segments created across the two memory pools would then be associated with 3,500 sparse virtual space segments. In one embodiment of the invention, the sparse virtual space segments associated with the memory pool segments may be spread throughout the sparse virtual space, without any forced order or general organization.

Alternatively, in one or more embodiments of the invention, the space manager will not, initially, associate any sparse virtual space segments with the memory pool segments. Instead, for example, if the memory devices contain no data, the space manager may wait until a write request is received before associating one or more sparse virtual space segments with one or more memory pool segments.

Further, while Steps 500-506 only explain the process in relation to memory and memory devices, this same process may also apply to persistent storage, albeit modified, where necessary, to conform with the differences between memory and persistent storage, as discussed in FIGS. 2 and 4.

Figure 6A:
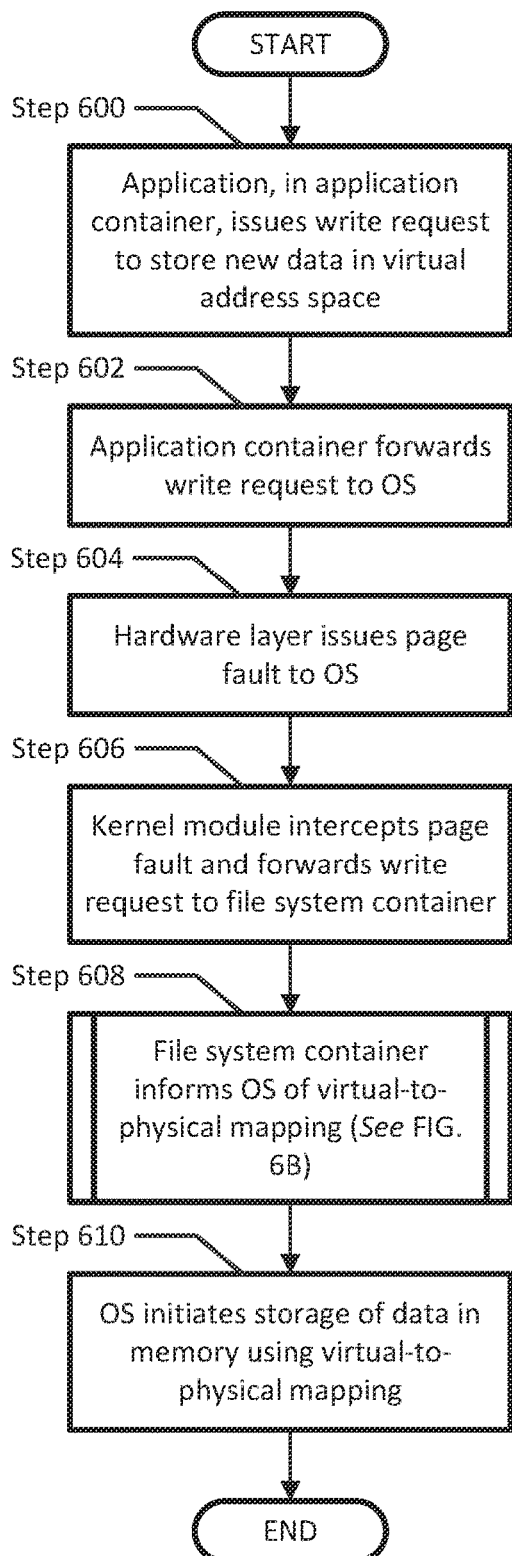
FIG. 6A shows a flowchart of a method of generating and servicing a write request in accordance with one or more embodiments of the invention.

FIG. 6A shows a flowchart of a method for writing new data to memory of the node, in accordance with one or more embodiments of the invention. All or a portion of the method shown in FIG. 6A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 600, an application issues a write request to store new data in the virtual address space of that application. In one or more embodiments of the invention, the write request specifies the virtual address space segment (e.g., virtual address) and the data to be written. Further, in one embodiment of the invention, as the data is new, there is no known physical location to store the data when initially generated, and therefore a location must be newly identified.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 602, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operation of the node.

In Step 604, the hardware layer of the node issues of page fault to the OS. In one or more embodiments of the invention, a page fault is an exception handling process of the OS caused by one or more components of the hardware layer receiving an invalid request.

In one embodiment of the invention, a page fault is issued by a processor when an invalid reference is provided to an MMU. Specifically, when a request to access or modify memory is sent to the MMU, using a virtual address, the MMU may perform a lookup in the TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

In one or more embodiments of the invention, the page fault specifies the original write request (i.e., the data to be written and the virtual address) and the reason for the page fault (that the MMU could not locate the virtual-to-physical address mapping).

In Step 606, the kernel module of the OS intercepts the page fault and forwards the page fault (and the associated write request) to the file system container of the node. In one embodiment of the invention, the kernel module may forward only the write request, as initially generated by the application, to the file system container.

In one or more embodiments of the invention, as described in FIG. 1 above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 608, the file system container, having received and processed the page fault forwarded by the kernel module, informs the OS of the proper virtual-to-physical address mapping for the write request. More details of the process of Step 608 are discussed in relation to FIG. 6B below.

In Step 610, the OS initiates writing of the requested data to the hardware layer of the node. In one or more embodiments of the invention, the write request, initially generated by the application, is serviced by storing, in memory, the requested data.

Specifically, in one or more embodiments of the invention, after receiving the virtual-to-physical address mapping from the file system container in Step 608, the OS informs the hardware layer (the MMU, specifically) of the virtual-to-physical address mapping. In turn, the MMU creates an entry in the TLB that associates the virtual address (of the application's virtual address space) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS reissues and/or forwards the initial write request back to hardware layer of the node. Then, as the hardware layer is now configured to service the request, the data is written to the physical address specified in the TLB (as identified by the file system container).

Figure 6B:
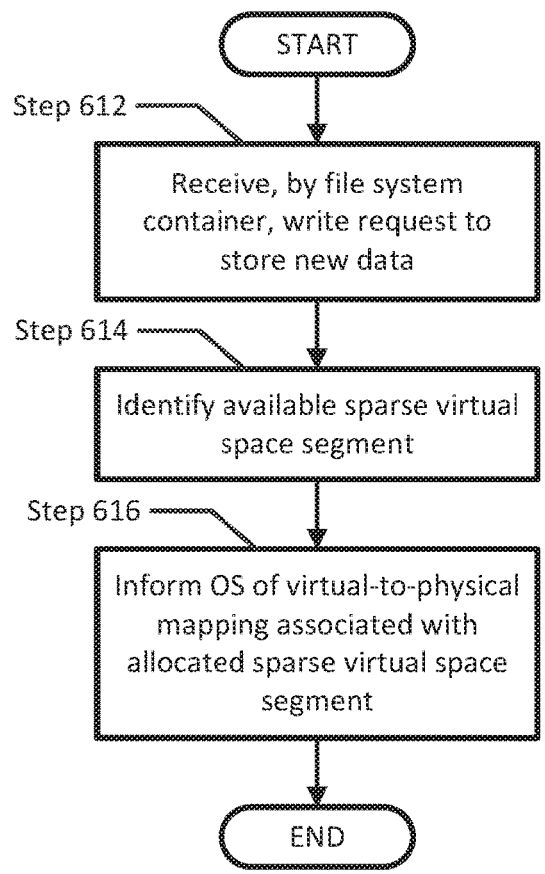
FIG. 6B shows a flowchart of a method of servicing a write request in accordance with one or more embodiments of the invention.

FIG. 6B shows a flowchart of a method for identifying a physical location to store new data, in accordance with one or more embodiments of the invention. All or a portion of the method shown in FIG. 6B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 612, the file system container receives a write request to store new data. As discussed above in Step 606, the file system container may receive a page fault (containing the write request) or the write request, alone, from a kernel module of the node. In one or more embodiments of the invention, the space manager of the file system container, performs the processing of the write request.

In Step 614, the space manager identifies one or more available sparse virtual space segments for the new data. In one or more embodiments of the invention, as described in Step 506 above, the space manager may have already allocated and associated every sparse virtual space segment with every available memory pool segment. However, in one or more embodiments of the invention, the space manager may not associate sparse virtual space segments with memory pool segments until receiving a write request.

In turn, in one or more embodiments of the invention, the space manager identifies one or more sparse virtual space segments sufficiently large enough (e.g., containing sufficient free space) to service the write request. If not already associated with memory pool segments, the space manager identifies one or more memory pool segments sufficiently large enough (e.g., containing sufficient free space) to service the write request and associate those memory pool segments with available sparse virtual space segments.

In one or more embodiments of the invention, once the one or more memory pool segments are identified, the associated one or more memory segments are identified based on a prior established mapping (see e.g., FIGS. 4-5).

In Step 616, the file system container informs the OS of the virtual-to-physical address mapping. In one or more embodiments of the invention, once a physical address of the memory is known, the space manager generates a virtual-to-physical address mapping using the virtual address received with the write request and the physical address identified in the memory pool.

In one or more embodiments of the invention, once the virtual-to-physical address mapping is generated, the space manager initiates the transmission of the virtual-to-physical address mapping to the OS (to ultimately inform the MMU).

As the space manager may be an isolated software instance executing within the file system container, the file system container may be the software instance that directly forwards the mapping to the OS.

In one or more embodiments of the invention, the file system container may also re-forward the write request back to the OS for servicing. Alternatively, in one embodiment of the invention, the OS may have temporarily stored the write request, while the file system container generated and provided the virtual-to-physical address mapping, so that the write request could be resent upon the receipt of the corresponding virtual-to-physical address mapping.

FIG. 7A shows a flowchart of a method for establishing direct access to memory of the hardware layer of the node via a virtual-to-physical address mapping, in accordance with one or more embodiments of the invention. All or a portion of the method shown in FIG. 7A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 700, an application issues a mapping request for data in the virtual address space of that application. In one or more embodiments of the invention, the mapping request specifies the virtual address space segment (e.g., virtual address) of the virtual address space. In one or more embodiments of the invention, the mapping request specifies the data using a file identifier and a file offset. Further, in one embodiment of the invention, as the data being directly accessed already exists, it is assumed the physical location of the data is identifiable.

In one or more embodiments of the invention, a mapping request is a request to establish a one-to-one mapping between one or more virtual address space segments and one or more memory segments (e.g., one or more virtual-to-physical address mappings that directly correlate application virtual memory address(es) to physical memory address(es)). Further, in one embodiment of the invention, as mapping to a region of memory requires that data to be located on a byte-addressable device (i.e., memory), it is therefore not possible to establish a direct mapping to data physically stored in persistent storage. That is, persistent storage is not configured to support, and is therefore not suitable for, servicing mapping requests, and the requested data will therefore need to be relocated to a suitable device in order to establish the requested direct access mapping (as discussed in relation to FIG. 7B below)

In one or more embodiments of the invention, as described in FIG. 1 above, the application may be executing within an application container that has the ability to access the OS of the node. Thus, when an application, isolated in an application container, issues a mapping request to an internal virtual address space, the application container handles that command before interacting with the OS.

In Step 702, the application container, to which the application belongs, forwards the mapping request to the OS. In one or more embodiments of the invention, although the application issued the mapping request to the virtual address space of the application, such internal requests ultimately trigger external commands to the underlying OS so that the request to the virtual address space may be serviced by the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 704, a determination is made as to whether a page fault is issued by the hardware layer of the node. In one or more embodiments of the invention, the virtual address specified by the mapping request will already be mapped to a physical address in the TLB with a virtual-to-physical address mapping. However, if the TLB lacks an entry associating the virtual address to any physical address, the hardware layer issues a page fault as described in Step 604 above. If a page fault is not issued (704-NO), the process proceeds to Step 710. Alternatively, if a page fault is issued (704-YES), the process proceeds to Step 706. In one or more embodiments of the invention, the page fault may include the initial mapping request and an indication that the virtual-to-physical address mapping does not exist in the TLB.

In Step 706, the kernel module intercepts and forwards the page fault to the file system container. In one or more embodiments of the invention, as described in Step 606 above, the OS is initially configured to forward the page fault to the application from which the request originally initiated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 708, the file system container, having received and processed the page fault forwarded by the kernel module, informs the OS of the proper virtual-to-physical address mapping for the write request. More details of the process of Step 708 are discussed in relation to FIG. 7B below.

In Step 710, the OS informs the application that a memory mapping has been established. In one or more embodiments of the invention, the mapping request, initially generated by the application, is serviced by informing the MMU (and TLB) of the virtual-to-physical address mapping associated with the virtual address specified by the application.

Specifically, in one or more embodiments of the invention, after receiving the virtual-to-physical address mapping from the file system container in Step 708, the OS informs the hardware layer (the MMU, specifically) of the virtual-to-physical address mapping. In turn, the MMU creates an entry in the TLB that associates the virtual address (initially specified by the application) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS informs the application of the successful memory mapping. Accordingly, the hardware layer of the node is then configured to directly service any request referencing that virtual address. More detail on the direct access to hardware layer components is discussed in FIGS. 8A and 8B below.

FIG. 7B shows a flowchart of a method for identifying a physical location that satisfies the mapping request, in accordance with one or more embodiments of the invention.

All or a portion of the method shown in FIG. 7B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 712, the file system container receives a mapping request to data located in memory. As discussed above in Step 706, the file system container may receive a page fault (including the mapping request) or the mapping request, alone, from a kernel module of the node. In one or more embodiments of the invention, the space manager of the file system container processes the mapping request.

In Step 714, the space manager identifies one or more sparse virtual space segments associated with the requested data. In one or more embodiments of the invention, as discussed in Step 700 above, the mapping request specifies the data using a file identifier and a file offset.

In one or more embodiments of the invention, the space manager uses the file identifier to identify a logical volume and a logical volume offset, within that logical volume, associated with file identifier. Once the logical volume offset is known, the sparse virtual space segment(s) associated with that file are similarly identified. Further, using the specified file offset, one or more sparse virtual space segments are identified and located that are specific to the data specified in the received mapping request. Accordingly, at this point, the space manager has located, in the sparse virtual space, the data specified in the mapping request.

In Step 716, the space manager identifies the pools mapped to the one or more sparse virtual space segments identified in Step 714. Further, in one or more embodiments of the invention, as the pools are categorized into two categories, memory pool(s) and persistent storage pool(s), the storage type of the requested data is similarly identifiable.

In Step 718, the space manager determines the storage type of the device on which the requested data is located. As discussed in Step 716 above, in one embodiment of the invention, identifying the pool associated with the sparse virtual space segment is sufficient to determine the storage type of the device, as each pool is unique to the two types of storage (persistent storage and memory).

In one or more embodiments of the invention, mapping to a region of memory requires that data to be located on a byte-addressable device (i.e., memory). Accordingly, it is therefore not possible to establish a direct mapping to data physically located in persistent storage (stored in blocks). That is, persistent storage is not configured to support, and is therefore not suitable for, servicing mapping requests.

Accordingly, if the specified data of the mapping request is located in persistent storage, the requested data is relocated to a suitable device in order to establish the direct mapping. However, if the data is already located on a device that is suitable for direct memory mapping (i.e., memory), the current location of that data is therefore sufficient to service the request, without first moving the data.

If the requested data is located in persistent storage (718-NO), the process proceeds to Step 720. Alternatively, if the requested data is located in memory (718—YES), the process proceeds to Step 722.

In Step 720, the file system container initiates copying the data from persistent storage to memory. Specifically, in one or more embodiments of the invention, the space manager identifies the physical location of the requested data using the persistent storage pool(s). As described in FIG. 4 above, each identified persistent storage pool segment is associated with persistent storage segments that identify the physical locations of the requested data.

In one or more embodiments of the invention, once the physical location of the requested data is known, the space manager identifies available locations of memory to relocate the data. Specifically, the space manager may analyze one or more memory pools and/or the sparse virtual space to located regions of physical memory that are available (e.g., includes sufficient free space) to copy to the requested data. The exact type of memory chosen to relocate the data is irrelevant, in one or more embodiments of the invention, the only relevant characteristic of the new memory device is that byte-level manipulation be possible, thereby allowing for direct virtual-to-physical address mapping.

In one or more embodiments of the invention, once the physical location of the requested data and the physical location of available memory are known, the space manager generates a copy command to copy the data from the data's location in persistent storage to the new location in memory. Further, in one embodiment of the invention, as the requested data is stored in blocks in persistent storage, every block that includes the requested data will have to be copied, even though those blocks may contain other, non-requested data. However, the copy command issued by the space manager ensures only the requested data is copied to memory, and not all of the data from each entire block identified in persistent storage.

Accordingly, in one or more embodiments of the invention, once the copy command is generated by the space manager, the file system container forwards that command to the OS to initiate copying of the data from persistent storage to memory.

In Step 722, the file system container informs the OS of the virtual-to-physical address mapping. In one or more embodiments of the invention, once a physical address of the memory is known, the space manager generates a virtual-to-physical address mapping using the virtual address received with the mapping request and the physical address identified in the memory pool.

In one or more embodiments of the invention, once the virtual-to-physical address mapping is generated, the space manager initiates sending the virtual-to-physical address mapping to the OS (to ultimately inform the MMU).

FIG. 8A shows a flowchart of a method for directly accessing a region of memory, in accordance with one or more embodiments of the invention. All or a portion of the method shown in FIG. 8A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 800, an application issues a read request to the virtual address space of that application. In one or more embodiments of the invention, the read request specifies the virtual address space segment (e.g., virtual address) of the virtual address space. Further, in one embodiment of the invention, the application is aware that a memory mapping exists for the virtual address space segments being utilized.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 802, the application container, to which the application belongs, forwards the read request to the OS. In one or more embodiments of the invention, although the application issued the read request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 804, the MMU of the hardware layer performs a lookup in the TLB to identify a physical address associated with the specified virtual address. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 806, the MMU identifies the physical address(es) associated with the virtual address of the read request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 808, the MMU reads the data at the physical addresses specified by the TLB. In one or more embodiments of the invention, the MMU transmits that data to one or more processors (and the cache therein) for temporary storage while being read by the application.

In Step 810, one or more processors receives the data from memory, via the MMU. In one or more embodiments of the invention, a processor stores that data in the cache local to the processor for more rapid reading and manipulation. Further, once in cache, the processor may provide the data to the application, as initially requested.

FIG. 8B shows a flowchart of a method for directly writing to a region of memory, in accordance with one or more embodiments of the invention. All or a portion of the method shown in FIG. 8B may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 812, an application issues a write request to store new data in the virtual address space of that application (or overwrite/modify existing data in the virtual address space). In one or more embodiments of the invention, the write request specifies the virtual address space segment (e.g., virtual address) of the virtual address space and the data to be written to the associated virtual address space segment. Further, in one embodiment of the invention, the application is aware that a memory mapping exists for the utilized virtual address space segments.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 814, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 816, the processor writes the requested data to the cache. In one or more embodiments of the invention, the processors receives the write request issued by the application and processes that new data (or changes to existing data) in the local cache of the processor. That is, even though the application specified a virtual address which is mapped to a physical address of memory, the processor may first internally stores and processes the changes requested by the application. In one embodiment of the invention, when data is located in cache, instead of its intended location in memory and/or persistent storage, that data may be considered "uncommitted" or "dirty". Further, in one embodiment of the invention, the application is unaware of whether the data sent in the write request is stored in cache or in the intended physical location of memory (associated with the virtual address).

In Step 818, the processor initiates of copy of the new data (of the write request) to memory via the MMU. In one or more embodiments of the invention, the cache is a limited resource (e.g., little total space) and may therefore reach a maximum capacity more quickly than other devices of the hardware layer. In the event the cache is determined to be too full, the processor begins copying certain data from the internal cache to the location originally specified by the request. The determination of which data in the cache to copy to memory may be based on one or more characteristics including, but not limited to, which data is least recently used, which data is least frequently used, and/or any other characteristic for determining which data may be least useful to maintain in cache. In one or more embodiments of the invention, the processor issues a write request to the MMU that includes the modified data and the virtual address specified by the application.

Further, in one embodiment of the invention, the application is unaware of when the processor copies data from cache to memory resulting from a determination that the cache is too full. And, therefore, the application is unaware of whether the data sent in the write request is stored in cache or in the intended physical location of memory (associated with the virtual address).

In Step 820, the MMU of the hardware layer performs a lookup in the TLB to identify a physical address associated with the specified virtual address of the write request. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 822, the MMU identifies the physical address(es) associated with the virtual address of the write request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 824, the MMU copies the data of the write request to the physical addresses specified in the TLB. In one or more embodiments of the invention, after the MMU finishes copying the data to memory, the MMU informs the processor of a successful write. Further, in one embodiment of the invention, the processor may consequently inform the OS that the data was successfully copied to memory, and the OS may inform the application that the data was successfully written to memory.

Figure 9A:
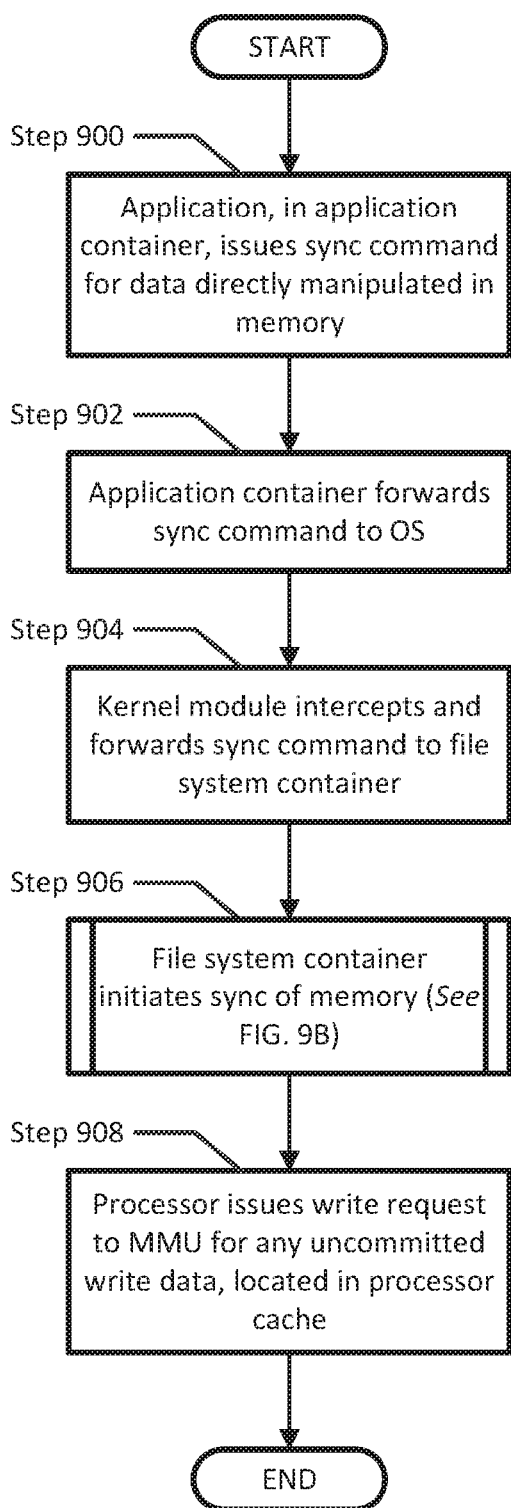
FIG. 9A shows a flowchart of a method of committing data in accordance with one or more embodiments of the invention.

FIG. 9A shows a flowchart of a method for syncing data changes of a memory mapped region, in accordance with one or more embodiments of the invention. All or a portion of the method shown in FIG. 9A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 900, an application issues a sync command for data that has been directly manipulated in memory. In one or more embodiments of the invention, the application is unaware as to whether the data sent in previous write requests has been persisted (e.g., copied) to the physical address(es) of memory associated with the virtual address(es) of the write requests (e.g., whether that data is uncommitted). Accordingly, to force the potentially uncommitted data to be committed (i.e., copied to memory, e.g., PMem), the application may issue a sync command to instruct the processor to force any uncommitted data, located in cache, to memory.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 902, the application container, to which the application belongs, forwards the write request to the OS. In one or more embodiments of the invention, the application container forwards the command, unaltered to the OS of the node. Alternatively, in one embodiment of the invention, the application container may modify the command prior to forwarding, for example, by translating the virtual address specified by the application to another virtual address (in the event of a known conflict) and/or otherwise modify the command to conform with the operations of the node.

In Step 904, the kernel module of the OS intercepts and forwards the sync command to the file system container of the node. In one or more embodiments of the invention, in contrast to Steps 606 and 706, the kernel module intercepts the sync command from the application before being passed to the hardware layer of the node. Specifically, in one embodiment of the invention, the kernel module is configured to identify sync commands and redirect those commands to a new destination (i.e., the file system container).

In Step 906, the file system container, having received and processed the sync command forwarded by the kernel module, re-initiates the sync process by forwarding one or more sync commands back to the OS. More details of the process of Step 906 are discussed in relation to FIG. 9B below.

In Step 908, the processor receives the sync command and initiates the copying of the relevant uncommitted data to memory. In one or more embodiments of the invention, the processor identifies the data associated with the sync command and initiates the copying of the identified data, to memory. As described in Steps 820, 822, and 824 above, the MMU receives the write request, perform a lookup in the TLB, identify the associated physical address(es) in memory for the write request, copy the uncommitted data to the associated physical address(es), then inform the processor of the successful writing of the data. In turn, in one embodiment of the invention, the processor then informs the OS of the successful writing of the data indicated by the sync command to memory; and the OS informs the application that the data was successfully written to memory.

Figure 9B:
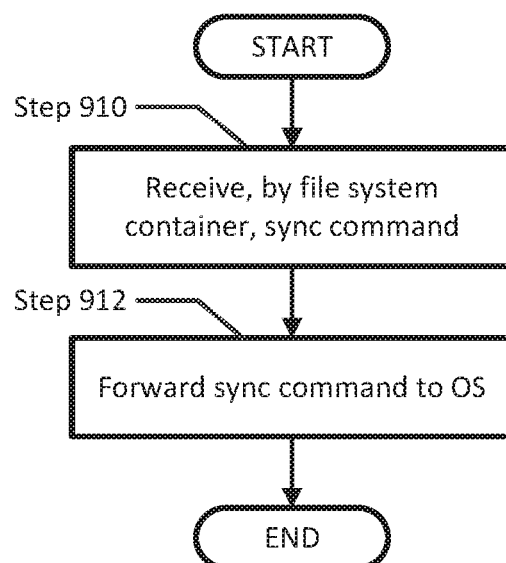
FIG. 9B shows a flowchart of a method of servicing a sync command in accordance with one or more embodiments of the invention.

FIG. 9B shows a flowchart of a method for servicing a sync command, in accordance with one or more embodiments of the invention. All or a portion of the method shown in FIG. 9B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 910, the file system container receives a sync command for data that was being directly manipulated by the application. In one or more embodiments of the invention, the space manager may modify the sync command consistent with the physical addresses identified in one or more memory pool(s). Further, the sync command may be modified such that the kernel module will not, again, intercept the sync command when traversing the OS. In one embodiment of the invention, if one or more memory pool segments associated with the sync command are associated with two or more memory segments, the space manager may generate additional sync commands to duplicate the changes in data to those additional memory segments.

In Step 912, the file system container forwards the sync command(s) to the OS in order to commit the data, located in cache, to memory. In one or more embodiments of the invention, the sync command may be the same sync command as originally received by the file system container, or alternatively be modified consistent with the one or more determinations of Step 910.

Figure 10:
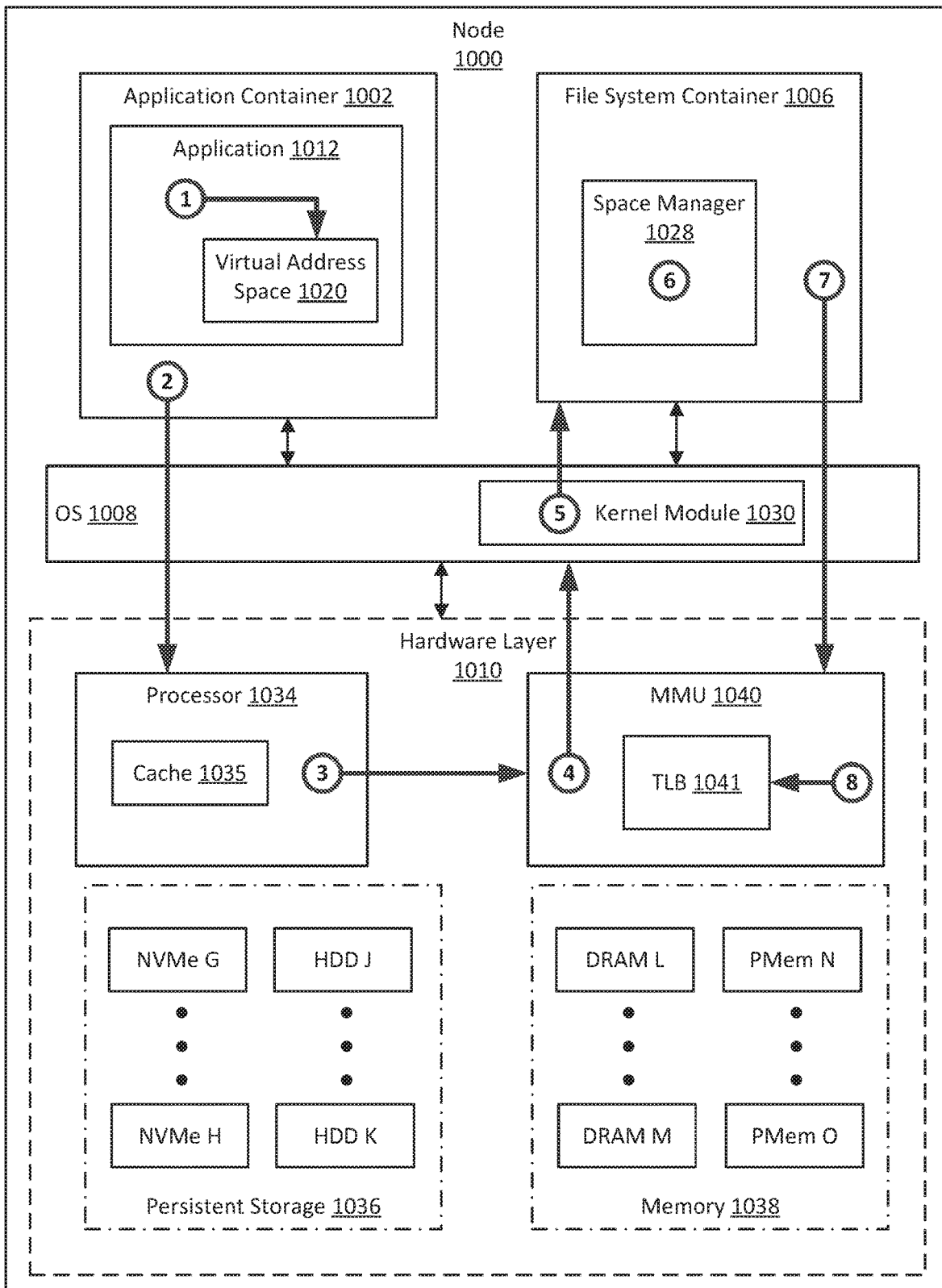
FIG. 10 shows an example in accordance with one or more embodiments of the invention.

FIG. 10 shows an example in accordance with one or more embodiments of the invention. The following use case is for explanatory purposes only and not intended to limit the scope to this embodiment.

In FIG. 10, consider a scenario in which, at (1), application (1012) issues a mapping request for data in virtual address space (1020) to establish direct access to memory (1038). The mapping request specifies a virtual address of the virtual address space (1020) and specific data using a file identifier and a file offset.

At (2), application container (1002) forwards the mapping request to the OS (1008). Here, the application container (1002) forwards the request, unaltered to the OS (1008) of the node (1000). Further, the OS (1008) passes the mapping request to hardware layer (1010) of the node (1000) without any additional processing.

At (3), the processor (1034) receives the mapping request in the hardware layer (1010) and forwards the request to the MMU (1040). At (4), the MMU (1040) performs a lookup in TLB (1041) to locate a physical address associated with the virtual address of the mapping request. However, the TLB (1041) does not contain a virtual-to-physical address mapping for the specified virtual address. Accordingly, the MMU (1040) issues a page fault to the OS (1008) that includes the mapping request.

At (5), the kernel module (1030) detects a page fault in the OS (1008) and interrupts normal handling of the page fault by the OS (1008). Specifically, the kernel module (1030) intercepts the page fault and forwards the mapping request (of the page fault) to the file system container (1006).

At (6), the space manager (1028) of the file system container (1006) receives the mapping request and locates the file in the sparse virtual space by analyzing the file identifier to identify a logical volume and a logical volume offset, within that logical volume, associated with file identifier. Once the logical volume offset is known, the sparse virtual space segments associated with that file are similarly identified. Further, using the specified file offset, the space manager (1028) identifies and locates the sparse virtual space segment specific to the data specified in the received mapping request.

Further, at (6), the space manager (1028) identifies that the sparse virtual space segment is associated with memory pool segment, which in turn, is directly associated with a memory segment (and corresponding physical address). The space manager (1028) then generates and initiates the transmission of a virtual-to-physical address mapping that specifies the virtual address of the mapping request and the physical address identified from the memory pool segment.

At (7), the file system container (1006) forwards the virtual-to-physical address mapping to the MMU (1040). In one or more embodiments of the invention, the file system container (1006) transmits the virtual-to-physical address mapping to hardware layer (1010) via the OS (1008).

At (8), the MMU (1040) writes a new entry to the TLB (1041) corresponding to the virtual-to-physical address mapping received from the file system container (1006). After the MMU (1040) writes the entry into the TLB (1041), the MMU (1040) additionally informs the OS (1008) that the memory mapping was successful. In turn the OS (1008) informs the application container (1002) and the application (1012) that the memory mapping request was successfully serviced and direct access has been established.

Figure 11:
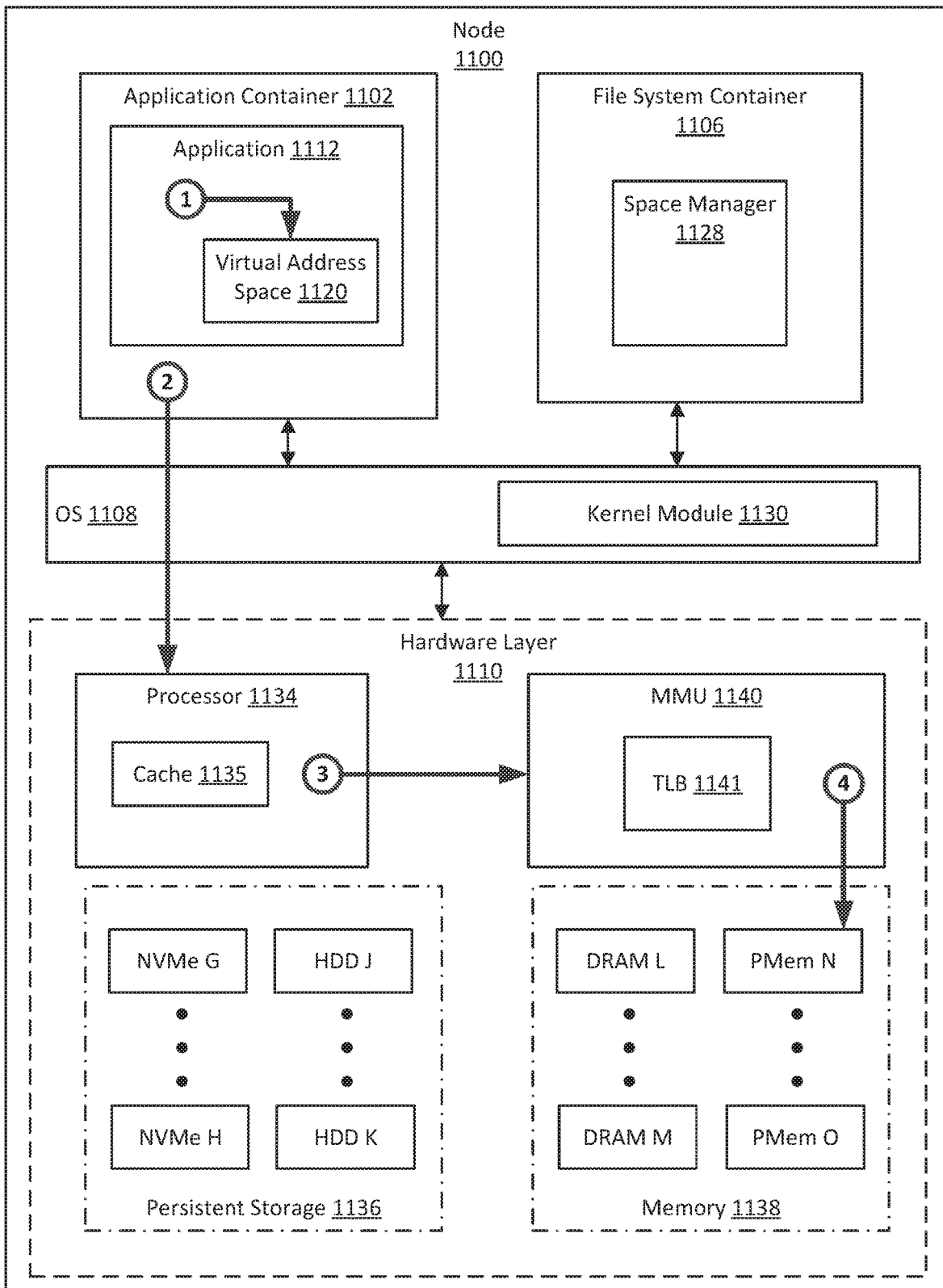
FIG. 11 shows an example in accordance with one or more embodiments of the invention.

FIG. 11 shows an example in accordance with one or more embodiments of the invention. The following use case is for explanatory purposes only and not intended to limit the scope to this embodiment.

In FIG. 11, consider a scenario in which, at (1), application (1112) issues a write request to overwrite existing data in virtual address space (1120) for which direct access to memory (1138) has already been established. The write request specifies a virtual address and the changes to the data.

At (2), application container (1102) forwards the write request to the OS (1108). Here, the application container (1002) forwards the request, unaltered to the OS (1108) of the node (1100). Further, the OS (1108) passes the write request to hardware layer (1110) of the node (1100) without any additional processing.

At (3), the processor (1134) receives the write request in the hardware layer (1110), stores the data changes to cache (1135), and forwards the request to the MMU (1140). At (4), the MMU (1140) performs a lookup in TLB (1141) to locate a physical address associated with the virtual address of the mapping request. The TLB (1141) then successfully identifies and returns to the MMU (1140) the physical address associated with the virtual address. The MMU (1140) then copies the data changes from cache (1135) to the physical location in memory (1138) specified by the physical address found in the TLB (1141). Specifically, in this case, the data is written to some portion of PMem N.

Figure 12:
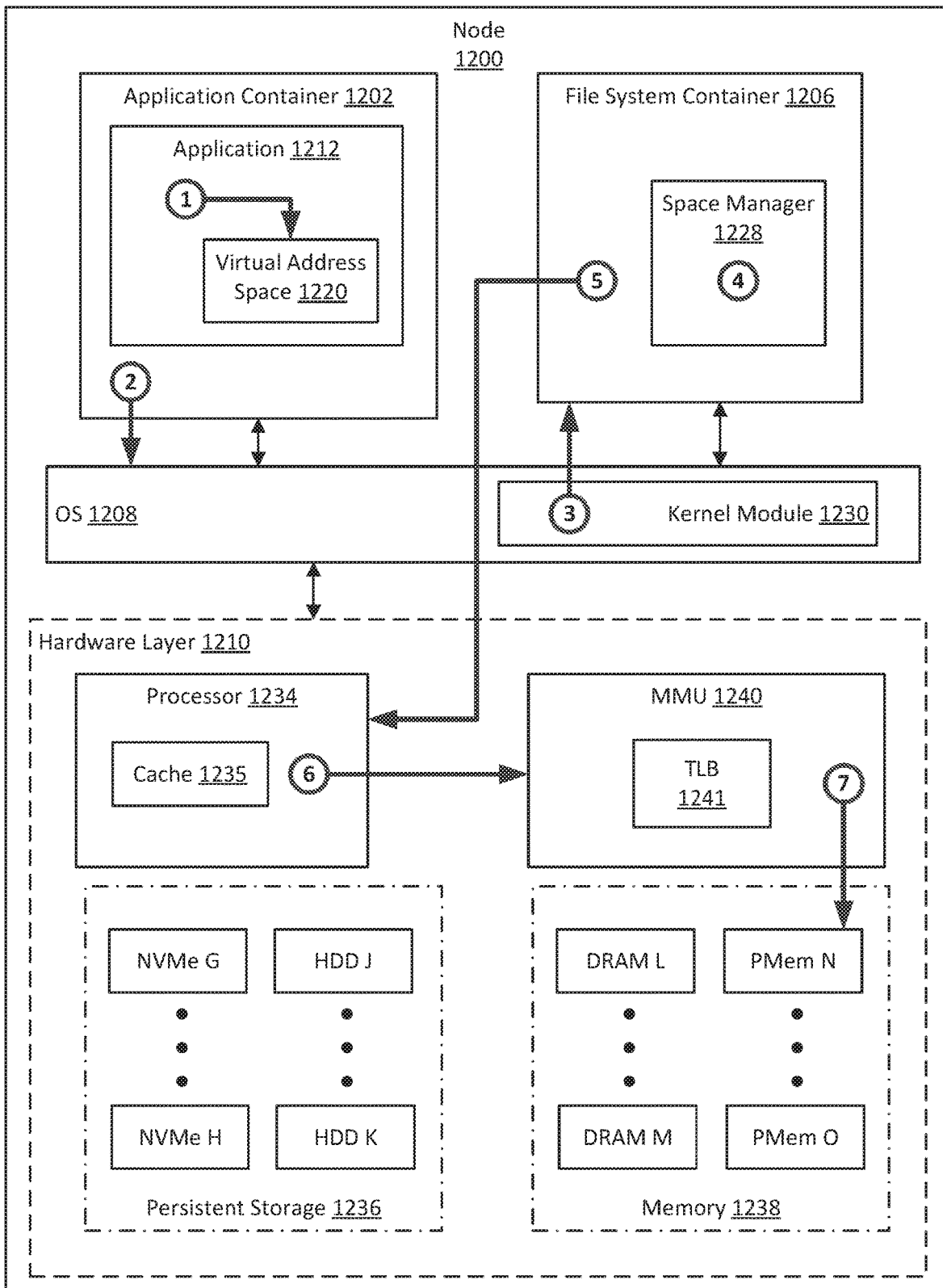
FIG. 12 shows an example in accordance with one or more embodiments of the invention.

FIG. 12 shows an example in accordance with one or more embodiments of the invention. The following use case is for explanatory purposes only and not intended to limit the scope to this embodiment.

In FIG. 12, consider a scenario in which, at (1), application (1212) issues a sync command for data being manipulated in the virtual address space (1220) via direct access to memory (1238). The sync command specifies a virtual address of the virtual address space (1220) and the modified data.

At (2), application container (1002) forwards the sync command to the OS (1208). Here, the application container (1202) forwards the request, unaltered to the OS (1208) of the node (1200). At (3), the kernel module (1230) detects the sync command in the OS (1208) and interrupts normal handling of the sync command by the OS (1208). Specifically, the kernel module (1230) intercepts the sync command and forwards the sync command to the file system container (1206).

At (4), the space manager (1228) of the file system container (1206) receives the sync command and identifies each memory segment affected by the sync command. Then, after identifying that PMem N is only affected memory (1238) device, space manager (1228) analyzes the sync command to ensure that the sync command properly specifies copying data to correct physical locations. The space manager (1228) then regenerates the sync command consistent with the physical locations identified in the memory pool.

At (5), the file system container (1206) forwards the sync command to the processor (1234) through OS (1208). At (6), processor (1234) receives the sync command and identifies all relevant uncommitted data associated with the sync command, in cache (1235), to be copied to memory (1238). Processor (1234) then initiates copying the identified uncommitted data to memory by sending a write request to the MMU (1240) to copy the data to memory (1238).

At (7), the MMU (1240) performs a lookup in TLB (1241) to locate a physical address associated with the virtual address of the write request from the processor (1234). The TLB (1241) then successfully identifies and returns, to the MMU (1240), the physical address associated with the virtual address. The MMU (1240) then copies the data from cache (1235) to the physical location in memory (1238) specified by the physical address found in the TLB (1241). Specifically, in this case, the data is written to some portion of PMem N.

Figure 13:
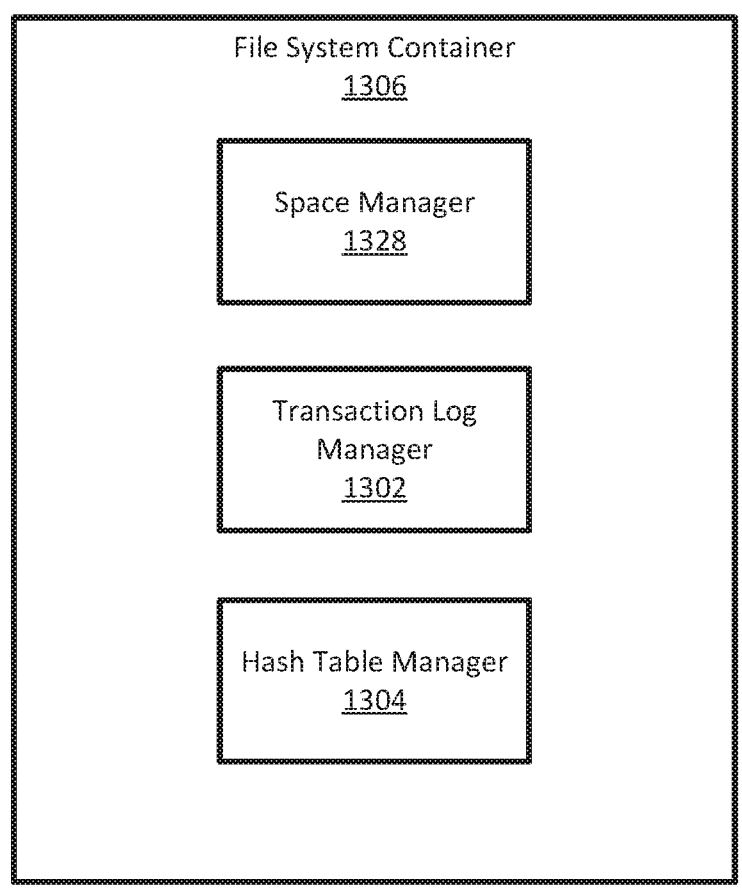
FIG. 13 shows a diagram of a file system container, in accordance with one or more embodiments of the invention.

FIG. 13 shows a diagram of a file system container (1306), in accordance with one or more embodiments of the invention. In one embodiment of the invention, file system container (1306) includes a space manager (1328), a transaction log manager (1302) and a hash table manager (1304).

Similarly named parts shown in FIG. 13 have all of the same properties and functionalities as discussed in the description of FIG. 2. Accordingly, only additional properties and functionalities will be described below.

In one or more embodiments of the invention, a transaction log manager (1302) is software executing within the file system container (1306), that may include instructions which, when executed, initiate operations of one or more components in the hardware layer (not shown) of the node (not shown). In one or more embodiments of the invention, a transaction log manager (1302) may create and/or manage a transaction log and/or a transaction log core association list, as discussed in the description of FIGS. 15-16. Further, in one or more embodiments of the invention, the transaction log manager (1302) is configured to perform all, or a portion, of the functionality described in FIGS. 18A-19.

Figure 14:
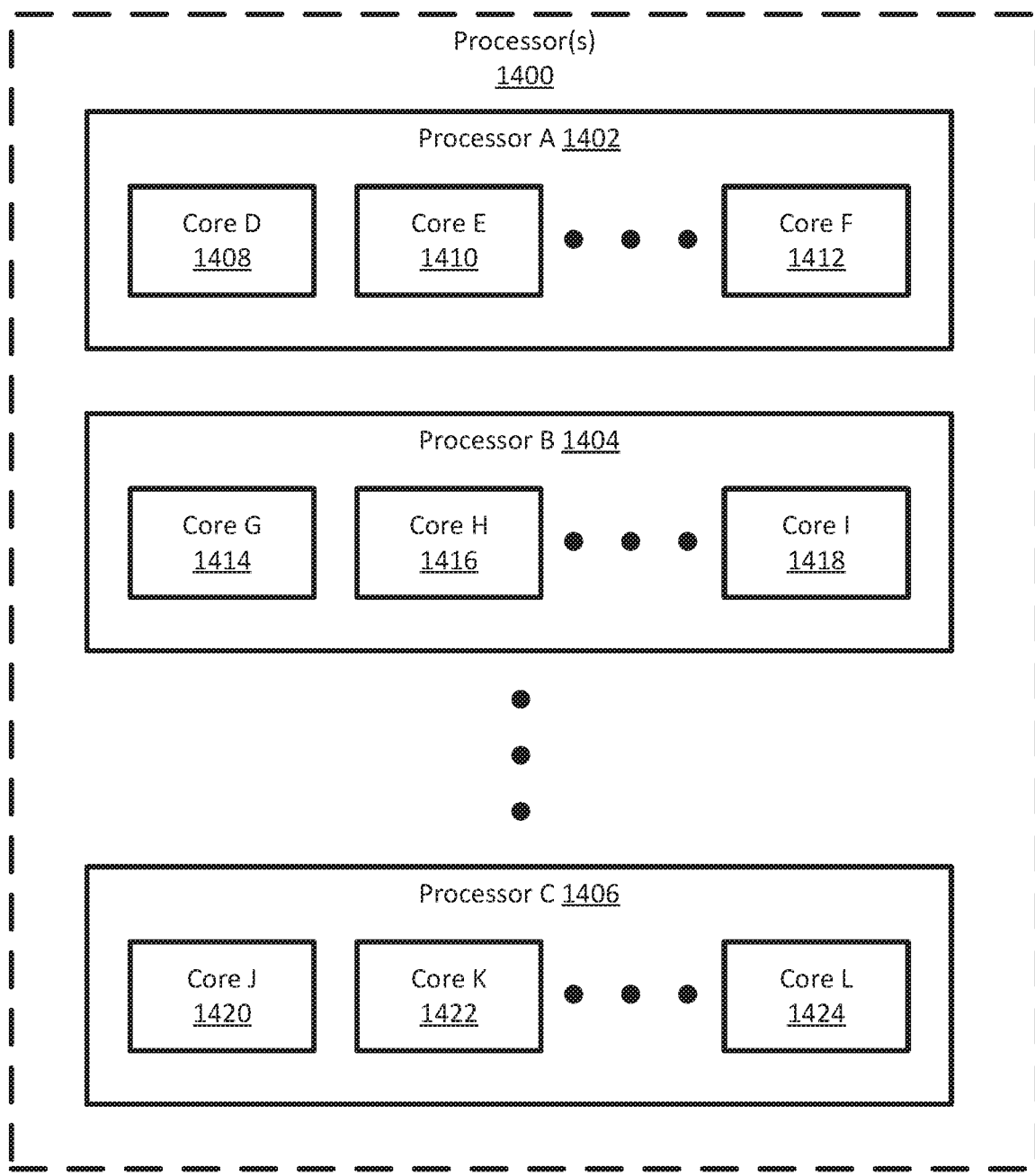
FIG. 14 shows a diagram of processors, in accordance with one or more embodiments of the invention.

In one or more embodiments of the invention, while a transaction log manager may be considered to be executing within a file system container (1306), a transaction log manager (1302) is executing on one or more cores of the node (discussed in the description of FIG. 14). Accordingly, in one or more embodiments of the invention, the actions performed by the transaction log manager (1302) are, effectively, performed by one or more cores. Thus, while the transaction log manager (1302) may be considered to communicate ("send", "receive") information ("messages", "commands", "requests") with a core, it is the core, itself, which is executing the transaction log manager. Accordingly, despite the terminology "send" and "receive", there may not be any physical transmission of information outside of the core. In one embodiment of the invention, a transaction log manager may be considered logic executed by one or more cores to perform internal management. Further, while the logic may be considered internal to one or more core(s), 'user space' software (e.g., the file system container) may still be able to control and/or interact with the transaction log manager (albeit still within the cores executing that 'user space' software).

In one or more embodiments of the invention, a hash table manager (1304) is software executing within the file system container (1306), that may include instructions which, when executed, initiate operations of one or more components in the hardware layer (not shown) of the node (not shown). In one or more embodiments of the invention, a hash table manager (1304) may create and/or manage a hash table, one or more core least recently used entry queue(s), and/or one or more core uncommitted entry queue(s) as discussed in the description of FIGS. 22-24. Further, in one or more embodiments of the invention, the hash table manager (1304) is configured to perform all, or a portion, of the functionality described in FIGS. 24-25.

While FIG. 13 shows a specific configuration of a file system container (e.g., file system container (1306)), other configurations may be used without departing from the scope of the disclosure. Accordingly, embodiments disclosed herein should not be limited to the configuration of devices and/or components shown in FIG. 13.

FIG. 14 shows a diagram of processors (1400), in accordance with one or more embodiments of the invention. In one or more embodiments of the invention, processor(s) (1400) includes one or more processors (e.g., processor A (1402), processor B (1404), processor C (1406)) each of which includes one or more cores (e.g., core D (1408), core E (1410), core F (1412), core G (1414), core H (1416), core I (1418), core J (1420), core K (1422), core L (1424)). Each of these components is described below.

In one or more embodiments of the invention, a processor (e.g., processor A (1402), processor B (1404), processor C (1406)) is an integrated circuit for processing instructions of components in a node. In one or more embodiments of the invention, processors (1402, 1404, 1406) have all of the same properties and functionalities as discussed in the description of FIG. 2. Further, in one or more embodiments of the invention, a processor (1402, 1404, 1406) may include one or more core(s), and may therefore be considered a "multi-core processor". Each processor (1402, 1404, 1406) may include additional, fewer, and/or different components without departing from the invention. In one or more embodiments of the invention, a core (e.g., 1408, 1410, 1412, 1414, 1416, 1418, 1420), core K (1422), core L (1424)) is an individual processing component of a processor (1402, 1404, 1406). In one or more embodiments of the invention, a core (1408, 1410, etc.) is an integrated circuit for processing instructions of components in a node.

In one or more embodiments of the invention, the process described with respect to the transaction log manager (the functionalities described in FIGS. 18A-19) may be performed by one or more core(s) (1408, 1410, etc.) with or without the involvement of software executing user space.

While FIG. 14 shows a specific configuration of one or more processors (e.g., processor(s) (1400)), other configurations may be used without departing from the scope of the disclosure. Accordingly, embodiments disclosed herein should not be limited to the configuration of devices and/or components shown in FIG. 14.

Figure 15:
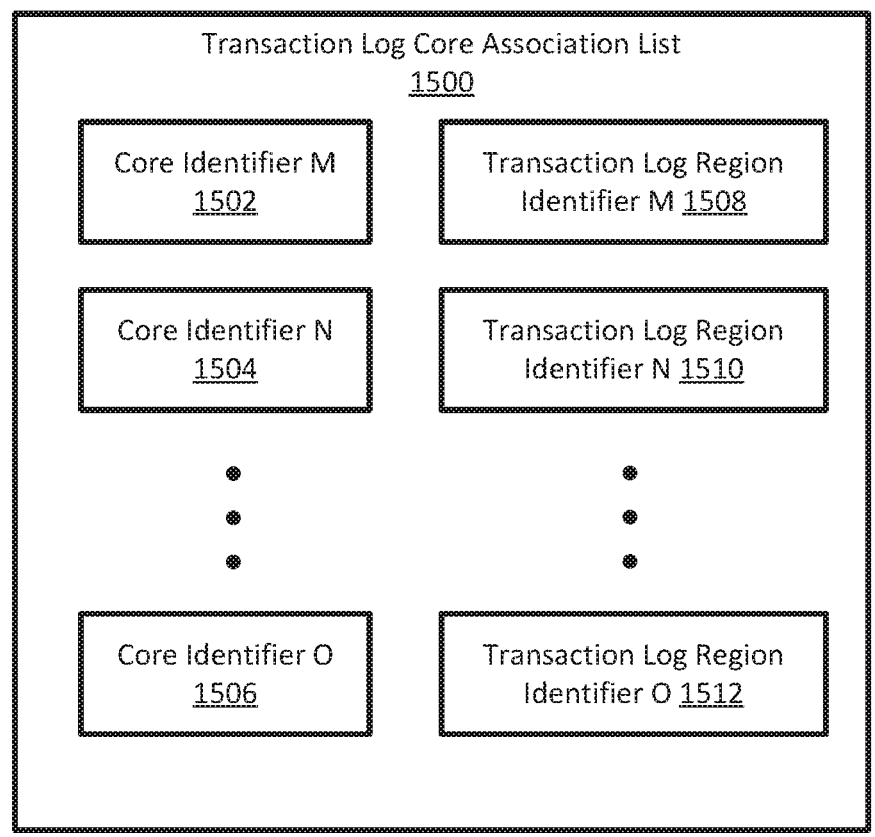
FIG. 15 shows a diagram of a transaction log core association list, in accordance with one or more embodiments of the invention.

FIG. 15 shows a diagram of a transaction log core association list (1500), in accordance with one or more embodiments of the invention. In one or more embodiments of the invention, a transaction log core association list (1500) is a data construct that associates one or more core identifiers(s) (e.g., core identifier M (1502), core identifier N (1504), core identifier O (1506)) with one or more transaction log region identifier(s) (e.g., transaction log region identifier M (1508), transaction log region identifier N (1510), transaction log region identifier O (1512)). Each of these components is described below.

In one or more embodiments of the invention, a core identifier (e.g., 1502, 1504, 1506) is a unique identifier associated with a single core. In one embodiment of the invention, the core identifier (1502, 1504, 1506) is a unique number assigned to a core that allows for the transaction log manager to uniquely identify that core. Further, in one embodiment of the invention, each core identifier (1502, 1504, 1506) may be a number of equal length (e.g., a 5, 10, or 20 digit number) that provides uniformity for two or more core identifiers (1502, 1504, 1506) of the transaction log core association list (1500). In one embodiment of the invention, a core identifier (1502, 1504, 1506) may be a physical address of the associated core. One of ordinary skill in the art, having the benefit of this detailed description, would appreciate that a core identifier may be any text expression and/or numerical value that is unique to the associated core.

In one or more embodiments of the invention, a transaction log region identifier (e.g., 1508, 1510, 1512) is a unique identifier associated with a single region of the transaction log (e.g., a transaction log region). In one embodiment of the invention, the transaction log region identifier (1508, 1510, 1512) is a unique number assigned to a transaction log region that allows for the transaction log manager to uniquely identify that transaction log region. Further, in one embodiment of the invention, each transaction log region identifier (1508, 1510, 1512) may be a number of equal length (e.g., a 5, 10, or 20 digit number) that provides uniformity for two or more transaction log region identifiers (1508, 1510, 1512) of the transaction log core association list (1500). In one embodiment of the invention, a transaction log region identifier (1508, 1510, 1512) may be a physical and/or virtual address (and/or a range of virtual and/or physical addresses) where the associated transaction log region is stored on a memory device. One of ordinary skill in the art, having the benefit of this detailed description, would appreciate that a transaction log region identifier may be any text expression and/or numerical value that is unique to the associated transaction log region.

While FIG. 15 shows a specific configuration of a transaction log core association list (e.g., transaction log core association list (1500)), other configurations may be used without departing from the scope of the disclosure. Accordingly, embodiments disclosed herein should not be limited to the configuration of devices and/or components shown in FIG. 15.

Figure 16:
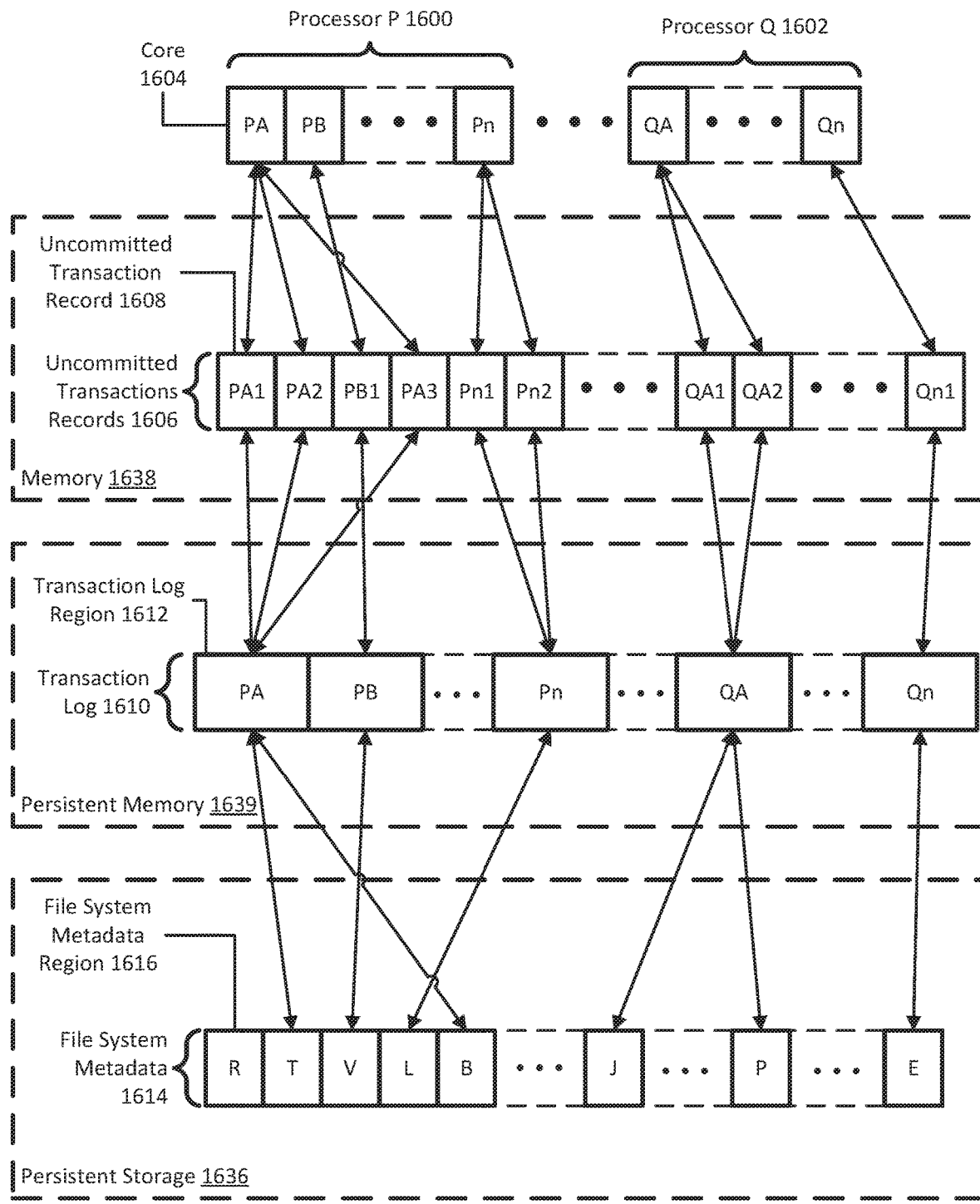
FIG. 16 shows a diagram of a transaction log data path, in accordance with one or more embodiments of the invention.

FIG. 16 shows a diagram of a transaction log data path, in accordance with one or more embodiments of the invention. In one or more embodiments of the invention, a transaction log data path is the route a transaction record traverses from its creation by a core (e.g., core (1604)) in memory (e.g., memory (1638)) to a transaction log (e.g., transaction log (1610)) to file system metadata (e.g., file system metadata (1614)) in persistent storage (e.g., persistent storage (1636)). Similarly named parts shown in FIG. 16 have all of the same properties and functionalities as discussed in the description of FIG. 2 and FIG. 14. Accordingly, only additional properties and functionalities will be described below.

In one or more embodiments of the invention, uncommitted transaction records (1606) are a collection of one or more uncommitted transaction record(s) (e.g., uncommitted transaction record (1608)) located in memory (e.g., memory (1638)). In one or more embodiments of the invention, an uncommitted transaction record (1608) is a transaction record created by a core (e.g., core (1604)) of a processor (e.g., processor P (1600), processor Q (1602)), maintained in memory (1638), prior to the commitment of the transaction being processed by the core (e.g., core (1604)) (i.e., making the transaction uncommitted).

In one or more embodiments of the invention, a transaction record is data that indicates a transaction (e.g., a series of changes, writes, and/or modifications) performed by a core (1604) on other data (e.g., files, file segments, etc.). A transaction record may include a data identifier (i.e., an identifier indicating the data being manipulated), the change made to the data, and/or a process identifier (specifying a larger process that initiated the change). In one or more embodiments of the invention, a transaction record may additionally include a core identifier (as discussed in the description of FIG. 15) and/or a timestamp that is globally unique to the transaction record.

In one or more embodiments of the invention, uncommitted transaction records (1606) are stored in memory (1638). In one embodiment of the invention, uncommitted transaction records (1606) are written memory to allow for more rapid modification of one or more uncommitted transaction record(s) (1608) than if stored on a persistent storage device (e.g., 1636). Nonetheless, while uncommitted transaction records (1606) are shown on memory (1638), one of ordinary skill in the art, having the benefit of this detailed description, would appreciate that uncommitted transaction records (1606) may be stored on any type of storage (memory or persistent storage).

In one or more embodiments of the invention, a transaction log (1610) is a data construct that stores one or more committed transaction record(s) (not shown) into one or more transaction log region(s) (e.g., transaction log region (1612)).

In one or more embodiments of the invention, a transaction log region (1612) is a region of the transaction log (1610) that is uniquely associated with a core (1604). In one embodiment of the invention, each core (1604) is associated with only one transaction log region (1612), and each transaction log region (1612) is associated with only one core (1604) thereby forming a one-to-one association of transaction log regions (1612) to cores (1604). For example, as shown in FIG. 16, five cores (PA, PB, Pn, QA, and Qn) are uniquely associated with five transaction log regions (PA, PB, Pn, QA, and Qn), respectively. Further, as shown in FIG. 16, although core PA is creates three uncommitted transaction records (PA1, PA2, and PA3) in different areas of memory, each of those uncommitted transaction records (PA1, PA2, and PA3) are copied to the same transaction log region (PA) prior to being committed.

In one or more embodiments of the invention, the outer boundaries of the transaction log region (1612) (i.e., the physical addresses assigned to that region) do not constrain the ability to write new data to the transaction log region (1612). Rather, in one embodiment of the invention, once the physical "end" of the transaction log region (1612) is reached, new data is written to the "beginning" of the transaction log region (1612) as if the transaction log region (1612) continues, in a loop, without physical interruption. That is, in one embodiment of the invention, the transaction log region (1612) is considered "circular" because the newest entries to the transaction log region (1612) are copied adjacent to the previous new entry, without consideration regarding the physical limitations of the device.

In one embodiment of the invention, a new write to the transaction log region (1612) is appended to a "head" of the existing data within the transaction log region (1612). If new writes are continually added to the transaction log region (1612), the transaction log region (1612) may eventually fill with data, without any physical indication that the transaction log region (1612) is full. Accordingly, in one or more embodiments of the invention, a committed transaction copied to the transaction log region (1612) overwrites the oldest existing data ("the tail") in the transaction log region (1612) (i.e., first-in-first-out). Further, as the transaction log (1610) may be partitioned into two or more transaction log regions (1612), each transaction log region (1612) may be writing (and overwriting) data at different rates within the single transaction log (1610).

In one or more embodiments of the invention, the sequential order in which the committed transaction records (of the transaction log (1610)) are stored is not the chronological order in which the associated transactions occurred. For example, while the uncommitted transaction records may be stored chronologically in memory (1638); the committed transaction records stored in the transaction log (1610) are copied into transaction log regions—associated with the core (1604) that processed the transaction—regardless of the chronology of those committed transaction records with respect to other committed transaction records in other transaction log regions (1612). Thus, in one embodiment of the invention, one or more committed transaction records of one transaction log region (e.g., transaction log region "PA") may include a plurality of committed transaction records that occurred before and after a plurality of committed transaction records of a different transaction log region (e.g., transaction log region "PB"). Further, in one or more embodiments of the invention, a single file and/or data segment may be manipulated by two or more cores; thus, the transactions associated with that file will be located in two different transaction log regions of the transaction log.

In one or more embodiments of the invention, transaction log (1610) is stored in persistent memory (1639). In one embodiment of the invention, when the transaction log (1610) and the uncommitted transaction records (1606) are both stored in memory (e.g., DRAM, persistent memory, etc.) copying of transaction records may be performed using memory-sematic copying techniques. In one embodiment of the invention, utilizing byte-level, memory-sematic copying of transaction records allows for copying those transaction records more quickly than when utilizing block-sematic techniques of one or more persistent storage devices (e.g., persistent storage (1636)). Nonetheless, while transaction log (1610) is shown on persistent memory (1639), one of ordinary skill in the art, having the benefit of this detailed description, would appreciate that the transaction log (1610) may be stored on any type of storage (memory or persistent storage).

In one or more embodiments of the invention, file system metadata (1614) is a data construct where committed transaction records (not shown) are stored for an indefinite period of time. In one or more embodiments of the invention, file system metadata includes one or more committed transaction records organized consistent with the structure and rules underlying the file system.

In one or more embodiments of the invention, file system metadata (1614) is stored in persistent storage (1636). In one embodiment of the invention, file system metadata (1614) is stored in persistent storage (1636) as operations (e.g., reads and/or writes) are performed on the file system metadata (1614) less then frequently than uncommitted transaction records (1606) or transaction log (1610). Nonetheless, while file system metadata (1614) is shown in persistent storage (1636), one of ordinary skill in the art, having the benefit of this detailed description, would appreciate that the file system metadata (1614) may be stored on any type of storage (memory or persistent storage).

While FIG. 16 shows a specific configuration of a transaction log data path, other configurations may be used without departing from the scope of the disclosure. Accordingly, embodiments disclosed herein should not be limited to the configuration of devices and/or components shown in FIG. 16.

Figure 17:
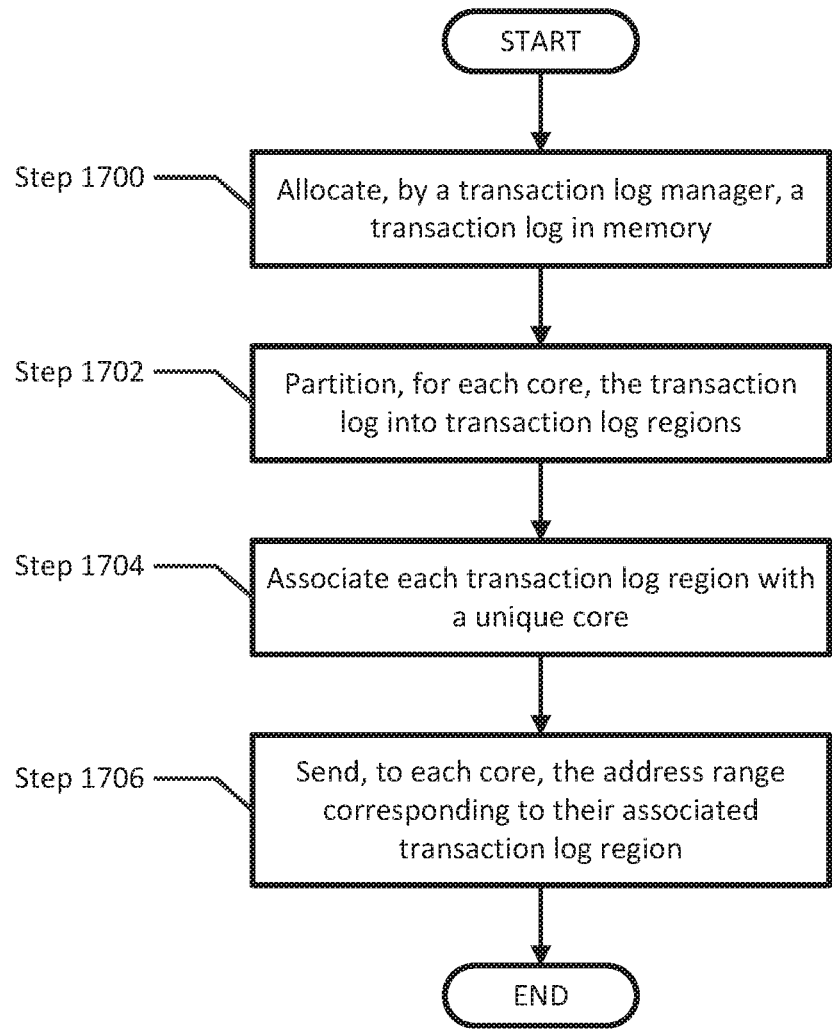
FIG. 17 shows a flowchart of a method of creating a transaction log, in accordance with one or more embodiments of the invention.

FIG. 17 shows a flowchart of a method of creating a transaction log, in accordance with one or more embodiments of the invention. All or a portion of the method shown in FIG. 17 may be performed by a transaction log manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1700, a transaction log manager allocates a portion of memory for a transaction log. In one or more embodiments of the invention, the transaction log manager is configured to allocate a portion of memory large enough to allow for the storage of one or more transaction records.

In Step 1702, the transaction log manager partitions the transaction log into one or more transaction log regions greater than or equal to the number of cores that will utilize the transaction log. In one or more embodiments of the invention, the transaction log manager identifies each core that will utilize the transaction log by analyzing the hardware layer of the node to determine the number of available cores and which of those cores will be performing operations requiring the transaction log.

In one or more embodiments of the invention, a transaction log may be associated with one or more data structures (e.g., file systems, sparse virtual space regions, memory and/or persistent storage pool(s), etc.) where only certain cores perform operations on those one or more data structures. Accordingly, in one embodiment of the invention, the transaction log manager identifies which cores will not utilize the transaction log and excludes those cores when determining the number of transaction log regions to partition the transaction log into.

In one or more embodiments of the invention, the transaction log manager partitions the transaction log into equally sized transaction log regions. Alternatively, in one embodiment of the invention, the transaction log manager may be configured to identify that certain cores that are likely to generate more transaction records (e.g., cores that are more powerful than other cores, cores that handle a larger volume of transactions, etc.) and partition certain transaction log regions to be larger for those cores.

In one or more embodiments of the invention, the transaction log manager generates and maintains a transaction log core association list that associates one or more core identifiers to one or more transaction log region identifiers (as discussed in the description of FIG. 15).

In Step 1704, the transaction log manager uniquely associates one or more transaction log region(s) with one or more core(s). In one or more embodiments of the invention, after the transaction log is partitioned into a number of transaction log regions greater than or equal to the number of cores, each transaction log region is then uniquely associated with only a single core.

In one embodiment of the invention (as discussed in the description of Step 1702), larger transaction log regions may be partitioned based on cores that are likely to generate more transaction records. Accordingly, in one embodiment of the invention, the transaction log manager associates those differently sized transaction log regions with the respective cores that resulted in the creation of those proportional transaction log regions.

In Step 1706, the transaction log manager sends to each core, a transaction log region identifier associated with that core. In one or more embodiments of the invention, the transaction log region may be identified by a unique identifier, a virtual address range corresponding to the transaction log region, and/or a physical address range corresponding to the transaction log region.

In one or more embodiments of the invention, the transaction log is created in memory, and therefore each transaction log region corresponds to a range of physical addresses unique to that transaction log region. In one embodiment of the invention, the transaction log manager provides the range of physical address, associated with one or more transaction log region(s), to one or more core(s) that are uniquely associated with those one or more transaction log region(s), respectively. In one or more embodiments of the invention, the transaction log manager maintains an association of one or more core identifiers to one or more transaction log region identifiers, in a transaction log core association list (as discussed in the description of FIG. 15).

Figure 18A:
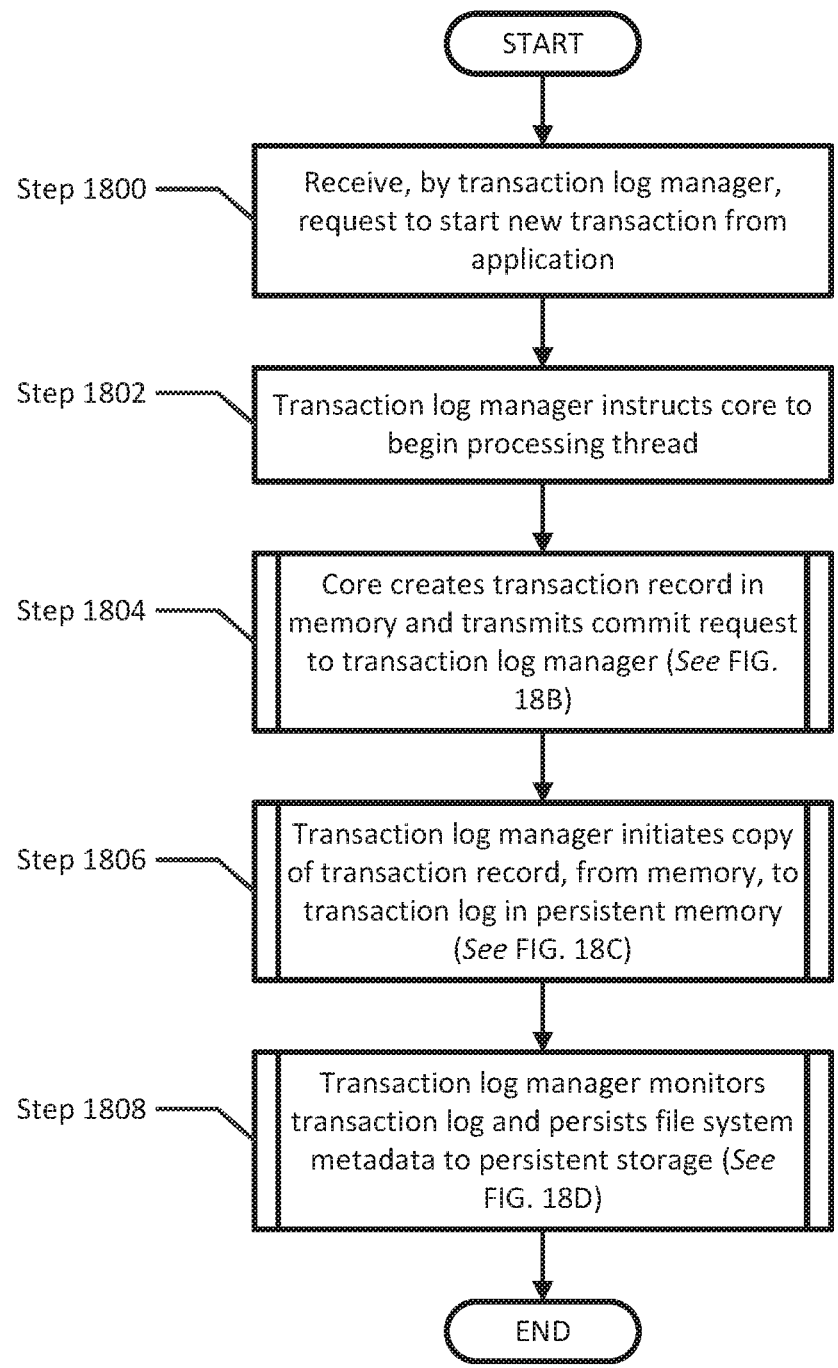
FIG. 18A shows a flowchart of a method of maintaining transaction records, in accordance with one or more embodiments of the invention.

FIG. 18A shows a flowchart of a method of maintaining transaction records, in accordance with one or more embodiments of the invention. All or a portion of the method shown in FIG. 18A may be performed by a transaction log manager and/or a core. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1800, a transaction log manager receives a request to start processing a transaction from a core. In one or more embodiments of the invention, the transaction log manager determines if the transaction log region associated with the core surpasses an available space threshold (see Step 1834) and/or if the core is in an otherwise paused state (see Step 1836). If the transaction log manager does not determine that the core is paused, the process proceeds to Step 1802; alternatively, if the core is in a paused state, the transaction log manager waits until the core is no longer paused before proceeding.

Alternatively, in one or more embodiments of the invention, the transaction log manager may not make any determination about the processor core; but rather, the transaction log manager allows a pause to persist until removed by whatever process initiated that pause.

In Step 1802, the transaction log manager instructs the core to begin processing the transaction. In one or more embodiments of the invention, the transaction log manager may not actively communicate with the core; rather, the transaction log manager may allow the execution of the transaction to begin (e.g., passively allowing the process to begin, if no pause exists). Thus, in one embodiment of the invention, as discussed in Step 1800, the transaction log manager may not perform any action other than allow any pauses to remain, or do nothing if no pause is active on the core.

In Step 1804, the core creates an uncommitted transaction record in memory, processes the transactions, and sends a request to commit the transaction. Details regarding the process of Step 1804 are discussed in the description of FIG. 18B.

In Step 1806, a transaction log manager initiates a copy of committed transaction records, from memory, to the transaction log region associated with the core. Details regarding the process of Step 1806 are discussed in the description of FIG. 18C.

In Step 1808, a transaction log manager monitors the transaction log and copies committed transaction records to file system metadata in persistent storage. Details regarding the process of Step 1808 are discussed in the description of FIG. 18D.

Figure 18B:
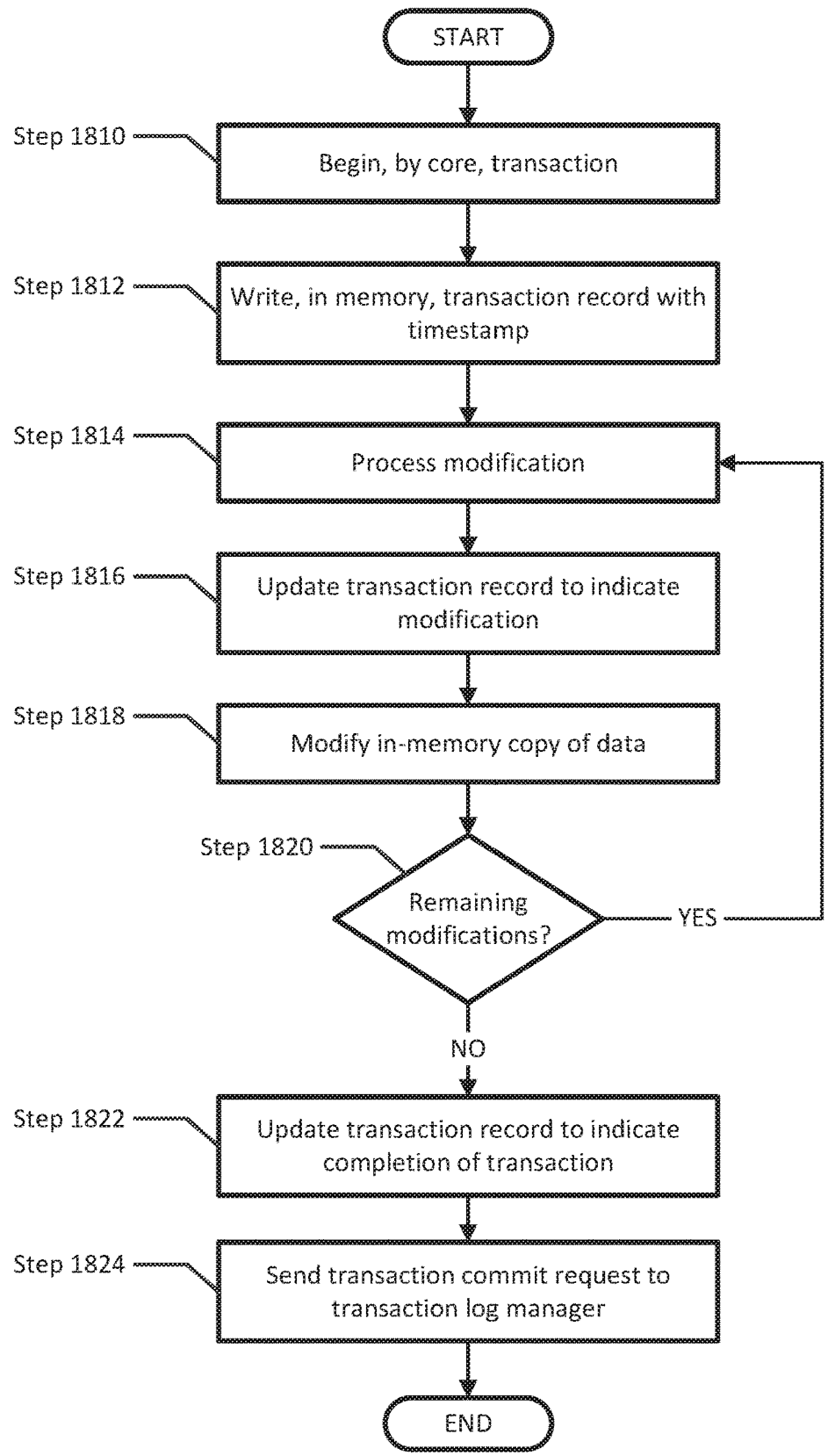
FIG. 18B shows a flowchart of a method of creating a transaction records, in accordance with one or more embodiments of the invention.

FIG. 18B shows a flowchart of a method of creating one or more transaction record(s), in accordance with one or more embodiments of the invention. All or a portion of the method shown in FIG. 18B may be performed by a core. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1810, a core begins a transaction. In one or more embodiments of the invention, the core begins processing the transaction after being instructed to begin (by the transaction log manager) or otherwise passively allowed to begin processing the transaction (e.g., no pause on processing exists).

In Step 1812, the core creates a new uncommitted transaction record, in memory, with a unique timestamp and an identifier of the core processing the transaction. The core may create the uncommitted transaction in any available region of memory, or in a region of memory associated with the core.

In Step 1814, the core reads the transaction to determine the next (or first) modification specified by the transaction. In one or more embodiments of the invention, the core generates and saves the instructions necessary to perform the modification (e.g., internally to cache). A modification may include creating new data, altering existing data, copy existing data, and/or any other changes to data which may be performed by a core.

In Step 1816, the core updates the uncommitted transaction record, in memory, to reflect that the modification (read in Step 1814) has been processed. In one or more embodiments of the invention, the uncommitted transaction record is updated prior to the completion of the modification, such that the uncommitted transaction record accurately reflects one or more modification(s) that have been completed, and one or more modification(s) which are actively being performed by the core. Further, in one embodiment of the invention, the core ensures that the copy of the uncommitted transaction record is updated in memory (not only in core cache) prior to proceeding to Step 1818.

In Step 1818, the core performs the modification on the data, as specified. In one or more embodiments of the invention, the core executes the instructions (generated in Step 1814) on a copy of the data existing in memory. In one or more embodiments of the invention, the core may perform the modification in cache (internal to the core), before copying that data to an external memory device (where the data may temporarily or indefinitely reside).

In Step 1820, the core determines if the transaction includes any additional modification(s) to be processed. In one or more embodiments of the invention, a transaction may include two or more modifications, requiring each modification to be performed prior to committing the transaction. If the transaction does include additional modification(s) not yet processed (1820-YES), the process returns to Step 1814. If the transaction does not include additional modification(s) not yet processed (1820-NO), the process proceeds to Step 1822.

In Step 1822, the core updates the uncommitted transaction record to indicate that the core has completed performing the one or more modification(s) specified in the transaction. Further, in one embodiment of the invention, the core ensures that the copy of the uncommitted transaction record is updated in memory (not only in core cache) prior to proceeding to Step 1824.

In Step 1824, the core sends a request to commit the transaction to the transaction log manager. In one or more embodiments of the invention, the core must receive permission (or passive allowance) from the transaction log manager prior to committing the transaction. Alternatively, in one or more embodiments of the invention, the core does not send a commit request to the transaction log manager; instead, the core begins committing the transaction based on logic internal to the core.

Figure 18C:
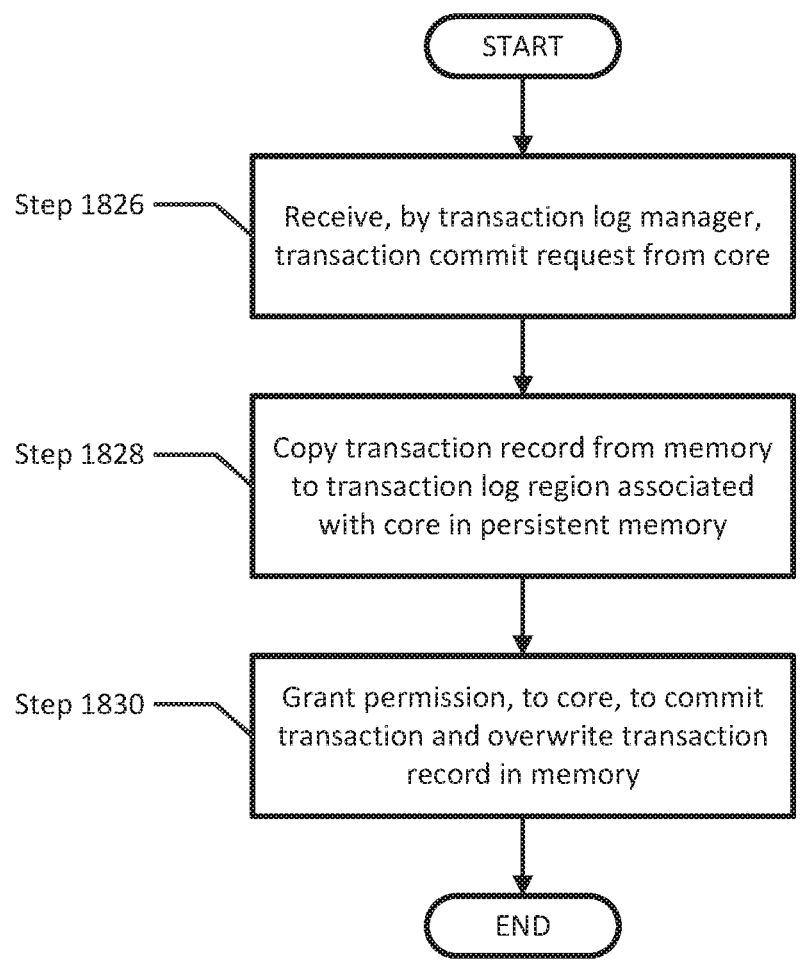
FIG. 18C shows a flowchart of a method of copying transaction records to a transaction log, in accordance with one or more embodiments of the invention.

FIG. 18C shows a flowchart of a method of copying transaction records to a transaction log, in accordance with one or more embodiments of the invention. All or a portion of the method shown in FIG. 18C may be performed by a transaction log manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1826, the transaction log manager receives a request to commit a transaction from a core. In one or more embodiments of the invention, the request to commit a transaction is received by the transaction log manager after a core has completed performing the modifications specified by a transaction and generated an uncommitted transaction record.

In Step 1828, the transaction log manager copies the uncommitted transaction record from memory to the transaction log region associated with the core, in persistent memory. In one or more embodiments of the invention, the uncommitted transaction record is copied adjacent to the most previously copied entry in the transaction log region, associated with the core. The exact physical addresses to copy the uncommitted transaction record (adjacent to the previous record) may be determined by identifying (or separately keeping a record of) the physical location(s) to which the most previous uncommitted transaction record was copied. For example, if the previous uncommitted transaction record was copied to physical address 78 through 83, the transaction log manager may be configured to start writing the next uncommitted transaction record at physical address 84.

The transaction log manager may identify the transaction log region (to write the data to) based on the core that sent the commit request, an identifier within the transaction record specifying the core, and/or a transaction log core association list (as discussed in the description of FIG. 15) that allows the transaction log manager to identify the transaction log region associated with the core that performed the transaction.

In Step 1830, the transaction log manager grants permission to the core to commit the transaction. In one or more embodiments of the invention, the transaction log manager sends the permission to the core by generating and sending a message that confirms the uncommitted transaction record was copied to persistent memory and/or otherwise permits the transaction to be committed.

In one or more embodiments of the invention, the transaction log manager does not provide the permission to commit the transaction until after confirmation is received that the uncommitted transaction record has successfully been copied to persistent storage. Thus, in one embodiment of the invention, the transaction may not be committed until the transaction record is stored in a non-volatile medium (which may be retrieved in the event of a system crash).

In one or more embodiments of the invention, the process of FIG. 18C may be performed by logic internal to the core that performed the modifications. For example, the software instructions that cause the transaction log manager to perform the processes of Steps 1826-1830 may exist within, and/or otherwise be accessible to the core, thereby allowing the core to perform one or more functions of the transaction log manager.

Figure 18D:
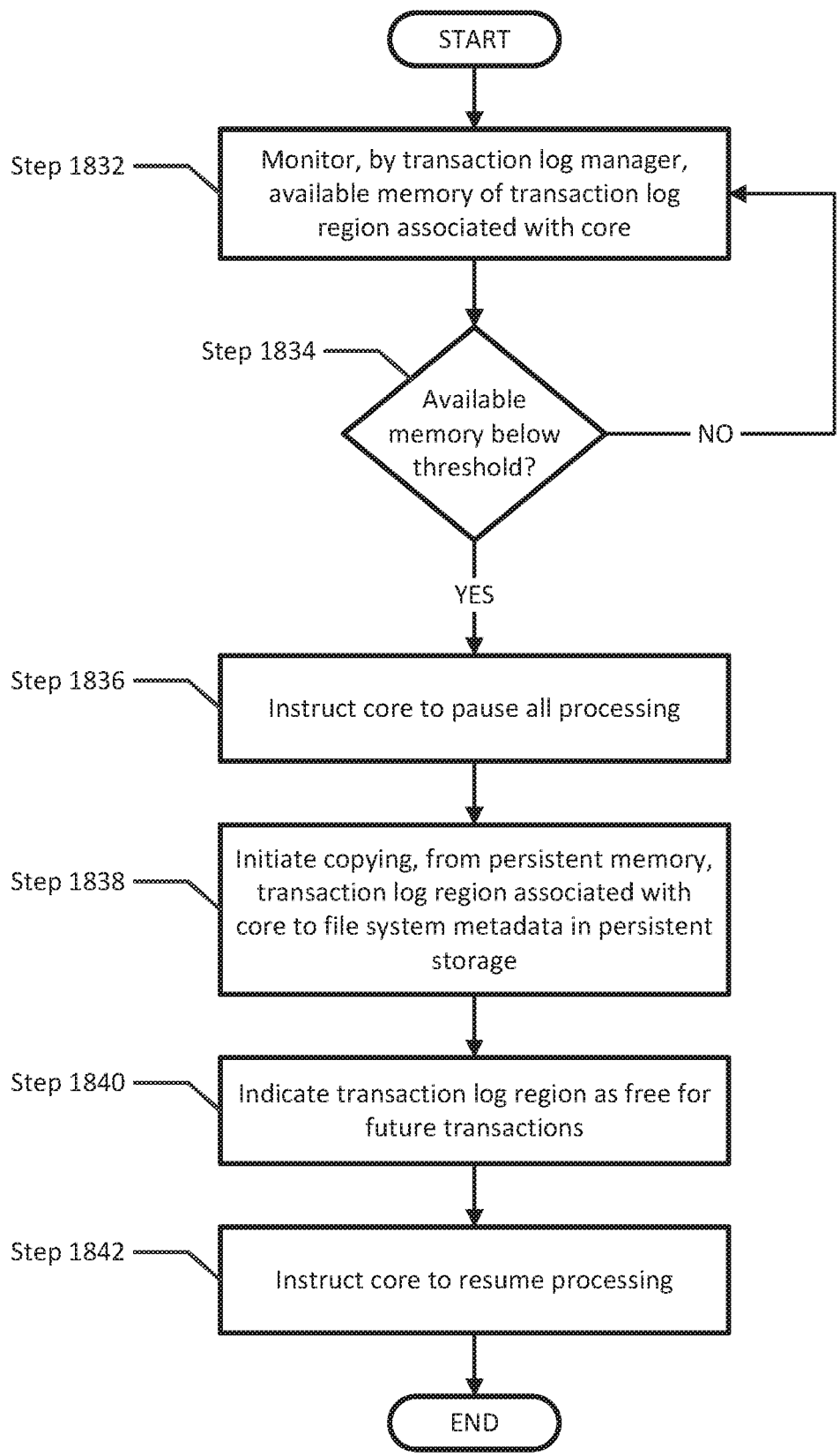
FIG. 18D shows a flowchart of a method of updating file system metadata, in accordance with one or more embodiments of the invention.

FIG. 18D shows a flowchart of a method of updating file system metadata, in accordance with one or more embodiments of the invention. All or a portion of the method shown in FIG. 18D may be performed by a transaction log manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1832, the transaction log manager monitors the available space of the transaction log region. In one or more embodiments of the invention, as discussed in the description of FIG. 16, each transaction log region may be "circular" and therefore continuously overwriting existing data. Thus, the measure of the available space of the transaction log region may not be based simply on whether transaction records occupy the entirety of the transaction log region; rather, one or more properties of the transaction records may be used to monitor available space.

In one or more embodiments of the invention, for any given transaction log region, the transaction records have either (i) already been copied to the file system metadata (see Step 1838) and therefore designated to be overwritten, or (ii) not yet copied to the file system metadata and therefore cannot be overwritten. Accordingly, in one embodiment of the invention, the transaction log manager monitors how much of the transaction log region is occupied by transaction records that have not yet been copied to file system metadata and therefore cannot be overwritten.

In one or more embodiments of the invention, the transaction log manager maintains a separate data structure to track which transaction records may be overwritten and which have yet to be copied to file system metadata. Alternatively, in one embodiment of the invention, the transaction records are altered to indicate that the region of memory occupied by that transaction record may be overwritten, in the transaction log region.

In Step 1834, the transaction log manager determines whether the available space within the transaction log region is below a threshold. In one or more embodiments of the invention, the transaction log manager determines that the available memory of the transaction log region is below a threshold when transaction records, that cannot be overwritten, exceed a certain percentage of the transaction log region. In one or more embodiments of the invention, the transaction log manager may determine that the transaction log region includes insufficient available space based on one or more other metrics including, but not limited time, the speed at which transaction records are being copied to the transaction log region, the size of the transaction records being copied, and/or any other factor that may indicate that the copying of one or more transaction record(s) would overwrite an existing transaction record (that has not yet been copied to file system metadata).

In one or more embodiments of the invention, there are two concurrent thresholds that result in different actions when surpassed. In one embodiment of the invention, a "lower" threshold exists that, when surpassed, causes the transaction log manager to copy other file system metadata located in memory, to the file system metadata located in persistent storage. During this time, after the lower threshold has been surpassed, new transaction records may still be copied to the transaction log region located in persistent memory. In one embodiment of the invention, the "lower" threshold indicates that the transaction log region is beginning to fill with uncopied data, but may still continue to accept new transaction records.

Concurrently, in one or more embodiments of the invention, an "upper" threshold exists that, when surpassed, causes the transaction log manager to pause all transactions occurring on the core associated with the transaction log region, and/or not allow any additional writes to the transaction log region. In one embodiment of the invention, once the transaction log manager pauses all transactions processed on the core and initiates copying the yet-to-be-copied transaction records of the transaction log region from persistent memory to the file system metadata of persistent storage. In one embodiment of the invention, performing the process caused by the "lower" threshold (copying other file system metadata located in memory to the file system metadata located in persistent storage) allow for more rapid copying of the transaction log region to persistent storage once the "upper" threshold is passed (thereby reducing the amount of time the core is paused from processing transactions.

Further, in one or more embodiments of the invention, the transaction log manager measures the available space of the transaction log region while copying the transaction records of the transaction log region from persistent memory to persistent storage. Accordingly, in one embodiment of the invention, there may be a third threshold used to measure the availability of the transaction log region as transaction records are copied to persistent storage. In one or more embodiments of the invention, once the third threshold is passed (indicating sufficient available space), the transaction log manager allows the core to resume processing transactions.

Continuing with the discussion of FIG. 18D, if the transaction log manager determines that the available space in the transaction log region is below a threshold (1834-YES), the process proceeds to Step 1836. If the transaction log manager determines that the available space in the transaction log region is not below a threshold (1834-NO), the process returns to Step 1832.

In Step 1836, the transaction log manager instructs the core (for which the transaction log region is associated) to pause all processing. In one or more embodiments of the invention, the transaction log manager sends a command to the core to stop performing any operations and/or processing transactions until a command is received to resume operations.

In Step 1838, the transaction log manager initiates copying of all previously uncopied transaction records, from the transaction log region, to file system metadata in persistent storage. In one or more embodiments of the invention, the transaction log manager maintains a record of the memory addressees that are associated with transaction records that have not yet been copied to file system metadata. Thus, in one embodiment of the invention, when the transaction log manager determines that the available space in the transaction log region is below a threshold, the transaction log manager initiates a copy of the data located at the memory addresses associated with the yet-to-be-copied transaction records.

In one or more embodiments of the invention, the file system metadata organizes the transaction records into a different layout and/or data structure than stored in the transaction log. Specifically, in one embodiment of the invention, transaction records stored in the file system metadata are organized consistent with the structure and rules underlying the file system.

In Step 1840, the transaction log manager indicates that the transaction records, copied in Step 1838, may be overwritten by future incoming transaction records. As discussed in the description of Step 1832, in one or more embodiments of the invention, the transaction log manager maintains a separate data structure to track which transaction records may be overwritten and which have yet-to-be-copied to file system metadata. Alternatively, in one embodiment of the invention, the transaction log manager alters the transaction records to indicate that the region of memory occupied by that transaction record may be overwritten in the transaction log region.

In one or more embodiments of the invention, prior to indicating that the existing copies in the transaction log region may be overwritten, the transaction log manager confirms that the transaction records copied in Step 1838 have been successfully copied to persistent storage.

In Step 1842, the transaction log manager instructs the core to resume processing. In one or more embodiments of the invention, the transaction log manager may send a command to remove the pause, placed in Step 1836, to the core. In one embodiment of the invention, the core may begin generating new transaction records now that the transaction log region, associated with that core, includes sufficient available space (e.g., data that may be overwritten) to write new transaction records.

In one or more embodiments of the invention, the process of FIG. 18D may be performed by logic internal to the core that is associated with the transaction log region. For example, the software instructions that cause the transaction log manager to perform the processes of Steps 1832-1842 may exist within, and/or otherwise be accessible to the core, thereby allowing the core to perform one or more functions of the transaction log manager.

Figure 19:
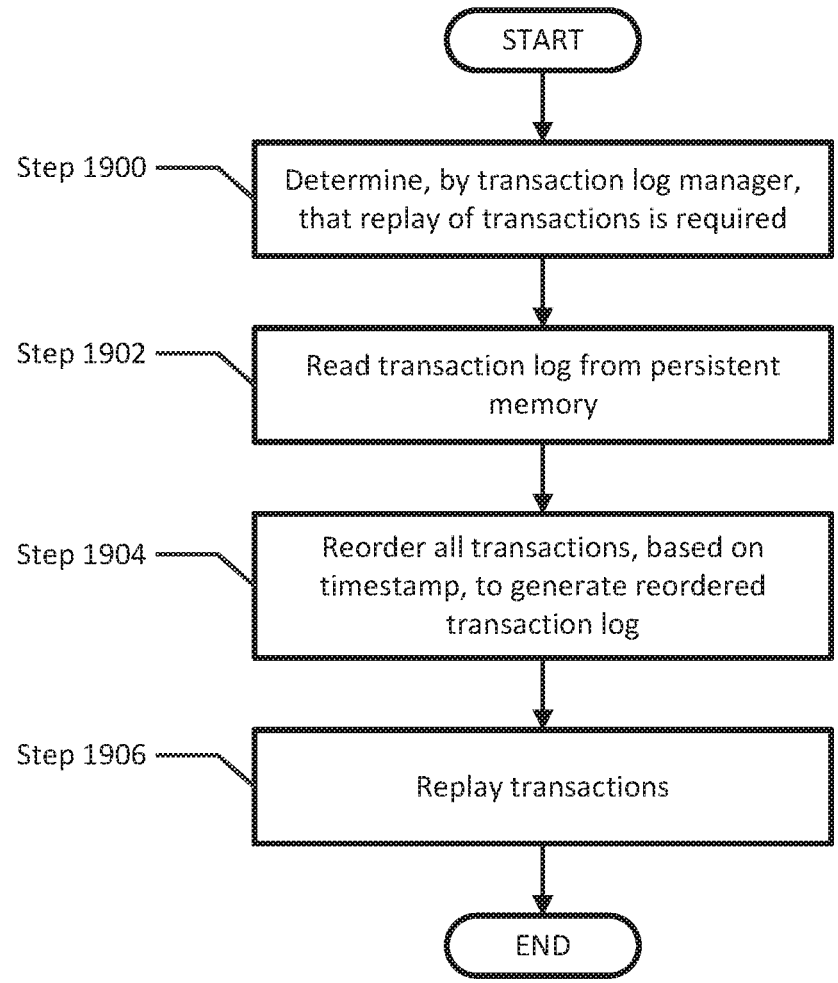
FIG. 19 shows a flowchart of a method of replaying transactions, in accordance with one or more embodiments of the invention.

FIG. 19 shows a flowchart of a method of replaying transactions, in accordance with one or more embodiments of the invention. All or a portion of the method shown in FIG. 19 may be performed by a transaction log manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1900, the transaction log manager determines that a replay of transactions is required. In one or more embodiments of the invention, a determination that replay of transaction is required may be based on, but not limited to, an indication the node (and/or one or more components thereof) is recovering from a previous failed state, a command to replay one or more transaction(s) is received, one or more corrupted files are detected, and/or any other indication that a transaction may need to be re-processed or reversed.

In Step 1902, the transaction log manager reads all transaction records from the transaction log (from all transaction log regions thereof). In one or more embodiments of the invention, some of the relevant transaction records may exist in the file system metadata in persistent storage; accordingly, in addition to reading transaction records from persistent memory, the transaction log manager may also read transaction records from the file system metadata located in persistent storage.

In one or more embodiments of the invention, after all transaction records are obtained, the transaction log manager identifies transaction records relevant to corrupted data and/or files. For example, if a particular file is identified to be corrupted, the transaction log manager may identify only those transactions that are associated with that one file. Further, if the one corrupted file is dependent upon one or more other files, those files may also be identified for replay.

In Step 1904, the transaction log manager reorders all transactions, from the transaction log, based on their timestamp to generate a reordered transaction log. In one or more embodiments of the invention, as discussed in the description of FIG. 16, the transaction records in the transaction log may not be sequenced consistent with the chronological ordering of the transactions. Rather, in one or more embodiments of the invention, the transaction log is partitioned into transaction log regions, accessible only by one core, thereby physically grouping transaction records according to the core that performed the transaction.

In one or more embodiments of the invention, the transaction log manager reorders the transaction records by comparing the timestamp of each transaction record to the timestamp of one or more other transaction record(s) to determine the position of each transaction record in the reordered transaction log.

In Step 1906, the transaction log manager replays the transactions, as specified by the transaction records of the reordered transaction log. In one or more embodiments of the invention, the transactions can be replayed, or reversed, to return the data to an uncorrupted state and/or a state consistent with other dependent data.

Figure 20:
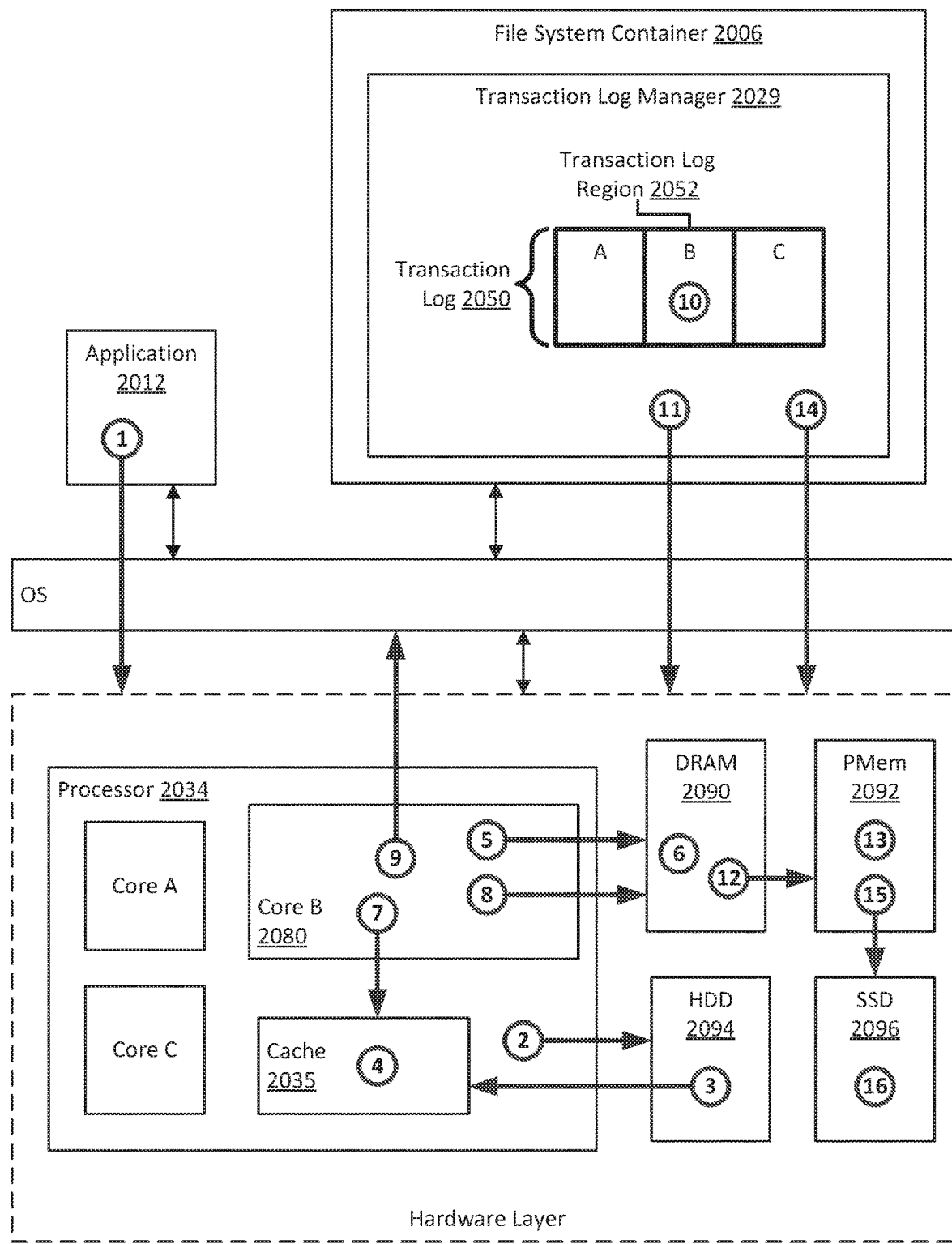
FIG. 20 shows an example, in accordance with one or more embodiments of the invention.

FIG. 20 shows an example, in accordance with one or more embodiments of the invention. The following use case is for explanatory purposes only and not intended to limit the scope to this embodiment.

In FIG. 20, consider a scenario in which, at (1), an application (2012) sends a request to open and modify a file located in HDD (2094). A transaction is created that includes each of the modifications specified by the application (2012). At (2), processor (2034) requests the file be copied to the cache (2035). At (3), the HDD (2094) retrieves and sends the requested file to cache (2035). At (4), the file is written to cache (2035) of the processor (2034).

At (5), core B (2080) processes the transaction generated by application (2012), initiates a new transaction record in DRAM (2090), and processes the first modification specified in the transaction. At (6), the transaction record is created in DRAM (2090) with a timestamp unique to the transaction record and the transaction record is updated to indicate the first modification specified by the transaction. At (7), core B (2080) performs the first modification specified in the transaction on the copy of the file located in cache (2025). Core B (2080) then determines that no additional modifications are required by the transaction. At (8), core B (2080) updates the transaction record to indicate completion of the modifications specified in the transaction.

At (9), core B (2080) sends a commit request to the transaction log manager (2029) of the file system container (2006). At (10), the transaction log manager (2029) identifies the transaction log region (2052) associated with core B (2080) ("B") of the transaction log (2050). At (11), the transaction log manager initiates copying the uncommitted transaction record from DRAM (2090) to the transaction log region (2052) associated with the core B, located in PMem (2092). At (12), core B (2080) copies the uncommitted transaction record from DRAM (2090) to PMem (2092). At (13), the uncommitted transaction record is confirmed to be copied into the transaction log region (2052) of PMem (2092). Further, once the uncommitted transaction record is confirmed to be copied into PMem (2092), core B (2080) commits the changes made to the file and may further copy the file from cache (2035) to HDD (2094).

At (14), the transaction log manager (2029) determines that the available space in the transaction log region (2052), associated with core B (2080), is below a threshold. Transaction log manager (2029) initiates copying all previously uncopied (e.g., yet-to-be copied) transaction records of transaction log region (2052) to file system metadata stored in SSD (2096). At (15), core B (2080) copies the transaction records from the transaction log region (2052) to the file system metadata in SSD (2096), as instructed by the transaction log manager (2029). At (16), the transaction records are confirmed to be copied to the file system metadata, after which the transaction log manager (2029) indicates that the transaction records copied from PMem (2092) may be overwritten in the transaction log region (2052) associated with core B (2080).

Figure 21:
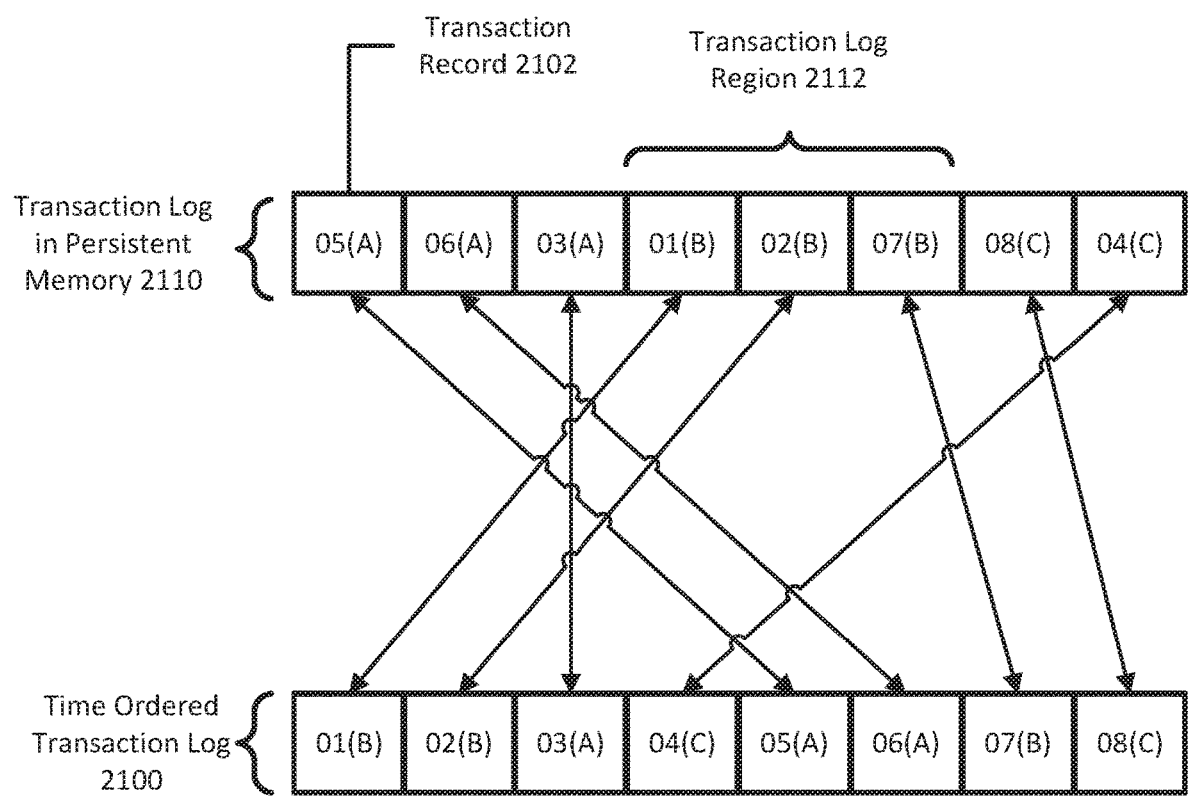
FIG. 21 shows an example, in accordance with one or more embodiments of the invention.

FIG. 21 shows an example, in accordance with one or more embodiments of the invention. The following use case is for explanatory purposes only and not intended to limit the scope to this embodiment.

In the example shown in FIG. 21, a transaction log in persistent memory (2110) includes eight transaction records (e.g., transaction record (2102)) in a non-chronological order. In this example, the number preceding the parenthesis indicates the time at which the transaction record was created and the letter in the parenthesis indicates the core that processed the transaction.

As can be seen in the example diagram, the transaction records is grouped based on the core that performed in the transaction (i.e., transaction log region (2112)) irrespective of the chronological order in which the transaction occurred.

In one or more embodiments of the invention, in the event that a replay is required (as discussed in the description of FIG. 19), the transaction log in persistent memory (2100) must be reordered to match the chronological order in which the transactions occurred. Thus, as can be seen in the example diagram, time ordered transaction log (2100) provides the transaction records in chronological order so that a replay of transactions may be performed on the data specified in those transactions.

Figure 22:
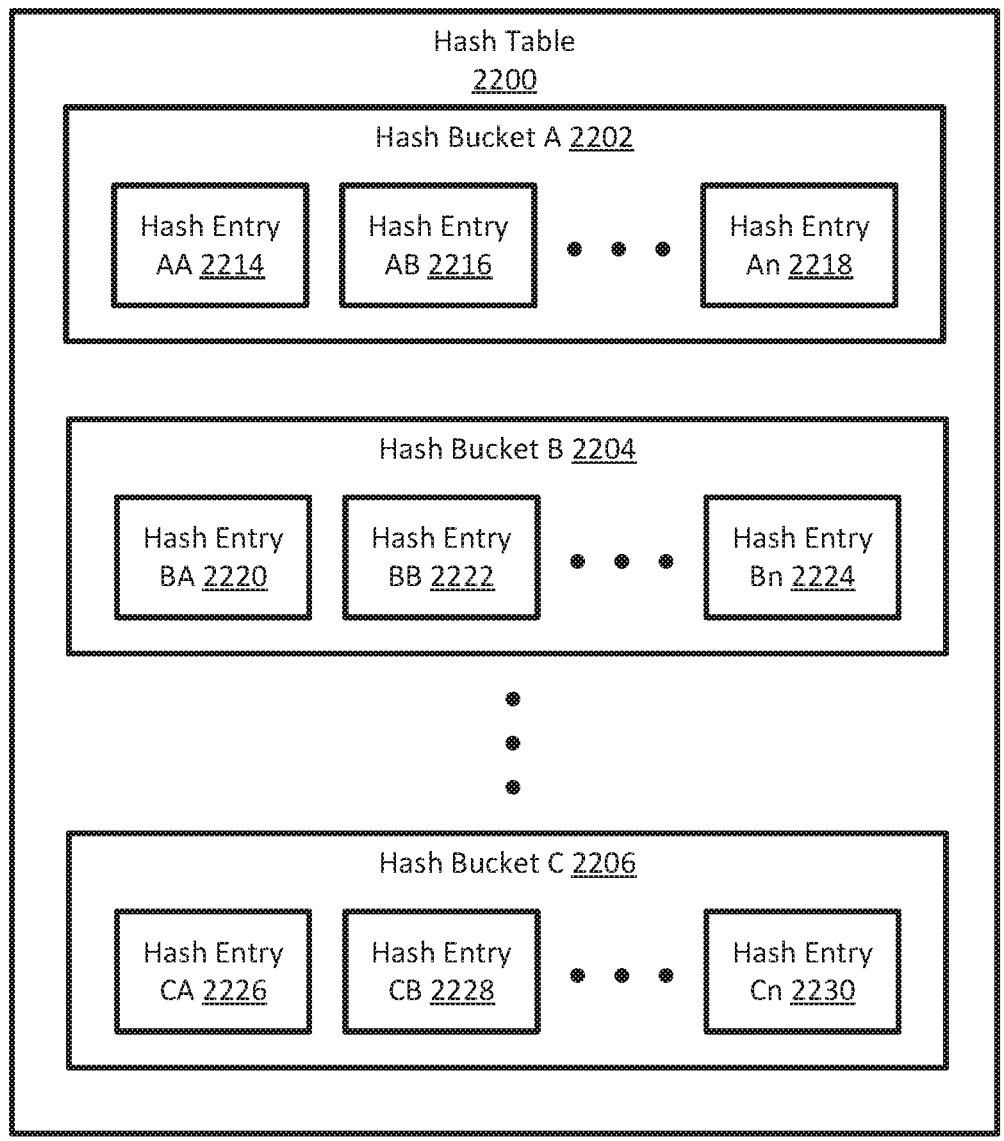
FIG. 22 shows a diagram of a hash table, in accordance with one or more embodiments of the invention.

FIG. 22 shows a diagram of a hash table (2200), in accordance with one or more embodiments of the invention. In one or more embodiments of the invention, a hash table (2200) is a data structure that includes one or more output values (e.g., hash buckets), organized by an associated result of a hash function (not shown). In one or more embodiments of the invention, a hash table (2200) includes one or more hash bucket(s) (e.g., hash bucket A (2202), hash bucket B (2204), hash bucket C (2206)). Each of these components is described below.

In one or more embodiments of the invention, a hash bucket (e.g., 2202, 2204, 2206) is a unique entry in the hash table associated with a value (e.g., an index) of the hash function (not shown) utilized for the hash table (2200). In one or more embodiments of the invention, a hash bucket (2202, 2204, 2206) is an association of one or more hash entries (e.g., hash entry AA (2214), hash entry AB (2216), hash entry An (2218), hash entry BA (2220), hash entry BB (2222), hash entry Bn (2224), hash entry CA (2226), hash entry CB (2228), hash entry Cn (2230)). In one embodiment of the invention, a hash bucket associates two or more hash entries (2214, 2216, etc.) based on each hash entry (associated with a shared bucket) sharing a common value when utilizing the hash function (e.g., the value associated with the hash bucket).

In one or more embodiments of the invention, a hash entry (e.g., 2214, 2216, etc.) is a data entry associated with other data on which the hash function was performed. In one or more embodiments of the invention, some data (other data) may be associated with a hash entry; thus, in order to efficiently locate the hash entry, using the other data, the hash function is applied to other data to quickly locate the hash bucket to which the hash entry is associated. One of ordinary skill in the art, having the benefit of this detailed description, would appreciate that hash table (2200), hash buckets (2202, 2204, 2206), and hash entries (2214, 2216, etc.) may be any data structure type that associates one or more inputs (e.g., "other data") to one or more outputs (e.g., "buckets") that are associated with the desired data (e.g., "hash entries") utilizing a some function on the input to locate the desired data.

While FIG. 22 shows a specific configuration of a hash table (e.g., hash table (2200)), other configurations may be used without departing from the scope of the disclosure. Accordingly, embodiments disclosed herein should not be limited to the configuration of devices and/or components shown in FIG. 22.

Figure 23:
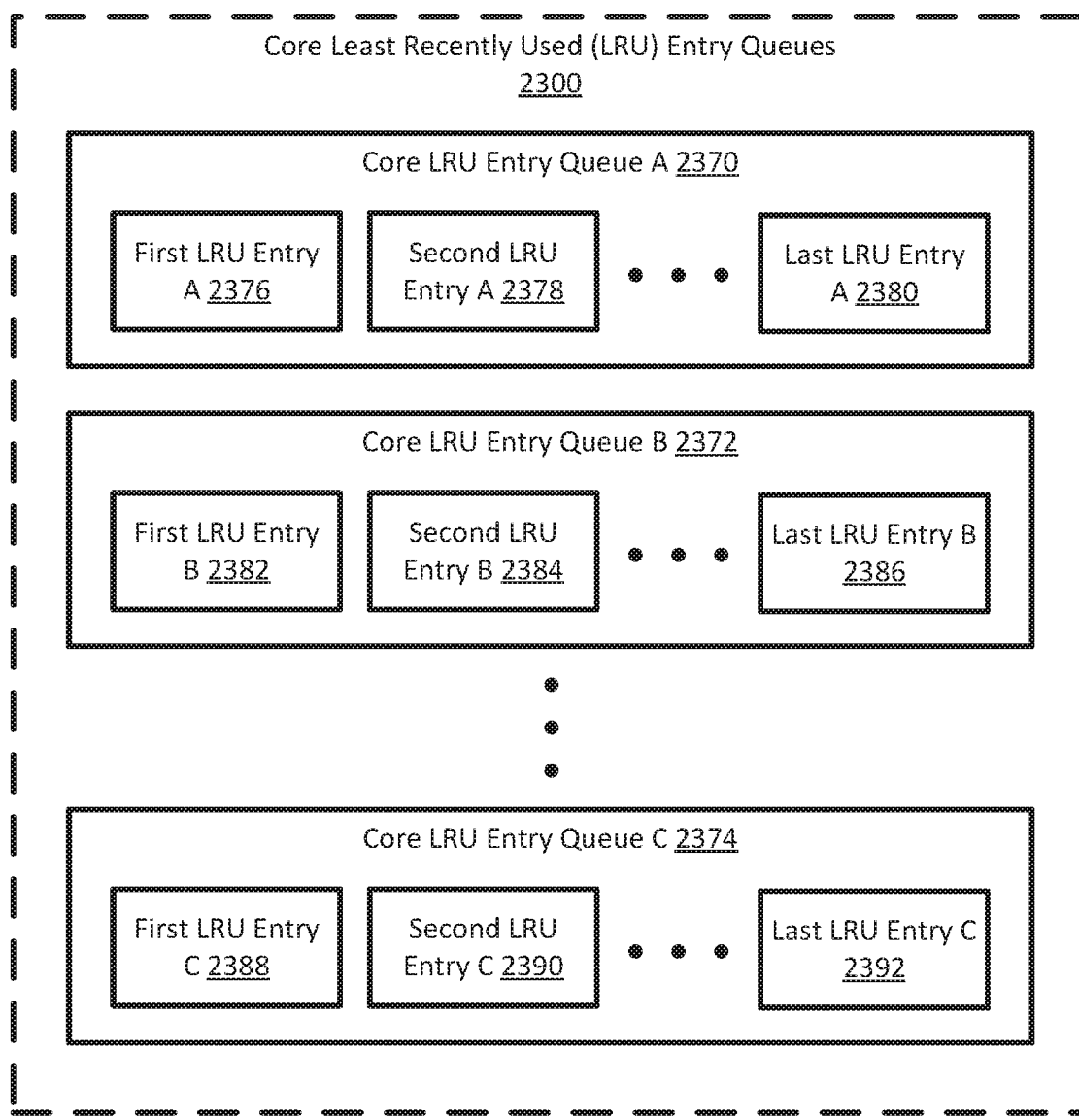
FIG. 23 shows a diagram of core least recently used entry queues, in accordance with one or more embodiments of the invention.

FIG. 23 shows a diagram of core least recently used (LRU) entry queues (2300), in accordance with one or more embodiments of the invention. In one or more embodiments of the invention, core LRU entry queues (2300) is data construct of one or more core LRU entries queues (e.g., core LRU entry queue A (2370), core LRU entry queue B (2372), core LRU entry queue C (2374)). Each of these components is described below.

In one or more embodiments of the invention, a core LRU entry queue (e.g., 2370, 2372, 2374) is a data construct, uniquely associated with a single core, that includes one or more LRU entries (2376, 2378, etc.) associated with hash entries, created by the associated core. In one or more embodiments of the invention, in a core LRU entry queue (2370, 2372, 2374) the LRU entries are ordered such that a "first" LRU entry (e.g., 2376, 2382, 2388) is associated with and indicates a least-recently-used hash entry (created by that core), whereas a "last" LRU entry (e.g., 2380, 2386, 2392) indicates a most-recently-used hash entry (created by that core). In one embodiment of the invention, the ordering of the LRU entries, in the core LRU entry queue (2370, 2372, 2374), is what determines which entry is considered "first", "second", "third", . . . or "last". Alternatively, in one or more embodiments of the invention, each LRU entry may include an indication of an order (e.g., a timestamp of last use) and be located in the core LRU entry queue irrespective of use order.

In one or more embodiments of the invention, when a LRU entry is removed from a core LRU entry queue (2370, 2372, 2374), the ordering of one or more LRU entries "behind" (e.g., after, succeeding) the removed LRU entry is altered. For example, when the first LRU entry (2376, 2382, 2388) is removed from the core LRU entry queue (2370, 2372, 2374) the "second" LRU entry (e.g., 2378, 2384, 2390) is then considered the "first" LRU entry as no LRU exists before in "front" of it. As another example, when a "second" LRU entry (2378, 2384, 2390) is removed, the "first" LRU entry (2376, 2382, 2388) remains the first LRU entry, but every LRU entry "after" the removed second LRU entry is advanced in the ordering (i.e., the "third" LRU entry (not shown) becomes the second LRU entry).

In one or more embodiments of the invention, a core LRU entry queue (2370, 2372, 2374) for a particular core may not include any LRU entries (2376, 2378, etc.) (i.e., is empty). In one embodiment of the invention, a core LRU entry queue (2370, 2372, 2374) may not include any LRU entries (2376, 2378, etc.) because, for example, the associated core has never generated a hash entry or, because all hash entries associated with a core have been removed (e.g., evicted) from the hash table and the associated LRU were similarly removed.

In one or more embodiments of the invention, an LRU entry (e.g., 2376, 2378, 2380, 2382, 2384, 2386, 2388, 2390, 2392) is an identifier of a unique hash entry in a hash table. In one or more embodiments of the invention, an LRU entry (2376, 2378, etc.) includes a pointer (e.g., an address and/or other identifiable information) of the hash entry to which the LRU entry (2376, 2378, etc.) is associated. Thus, in one embodiment of the invention, when identifying and reading the LRU entry (2376, 2378, etc.), it is possible to quickly locate the hash entry associated with the LRU entry (2376, 2378, etc.). Further, in one embodiment of the invention, when a new hash entry is added to a the hash table, a new LRU entry (2376, 2378, etc.) is added as a "last" LRU entry to the core LRU entry queue (2370, 2372, 2374) associated with the core that requested the new entry.

While FIG. 23 shows a specific configuration of core LRU entry queues (e.g., core LRU entry queues (2300)), other configurations may be used without departing from the scope of the disclosure. Accordingly, embodiments disclosed herein should not be limited to the configuration of devices and/or components shown in FIG. 23.

Figure 24:
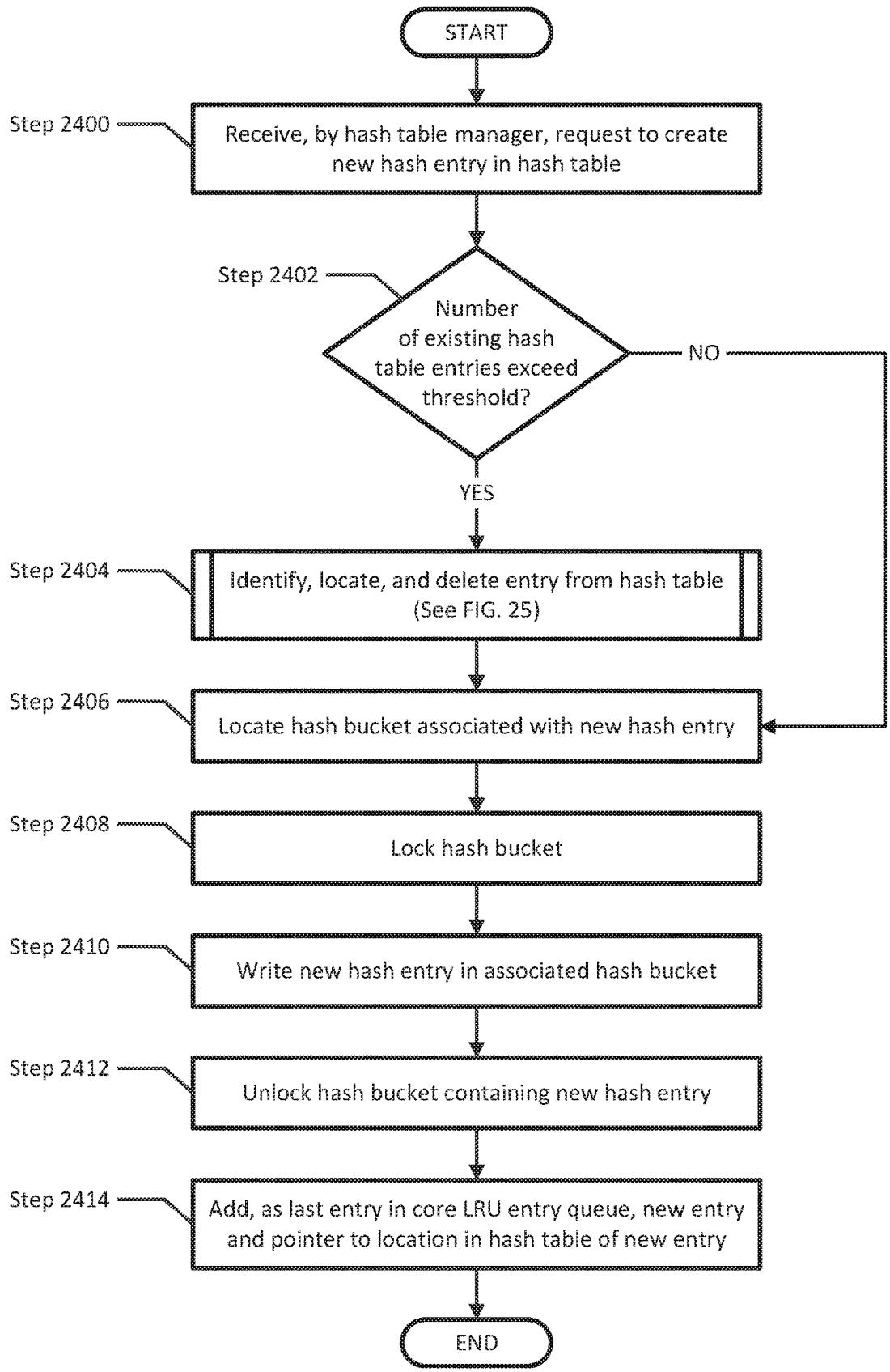
FIG. 24 shows a flowchart of a method of processing new hash entry requests, in accordance with one or more embodiments of the invention.

FIG. 24 shows a flowchart of a method of processing new hash entry requests, in accordance with one or more embodiments of the invention. All or a portion of the method shown in FIG. 24 may be performed by a hash table manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 2400, a hash table manager receives a request to create a new hash entry in a hash table. In one or more embodiments of the invention, after data is processed to find an associated hash bucket in a hash table (via the creation of the hash entry), the hash table manager initiates a process to write a new hash entry to the associated hash bucket.

In one or more embodiments of the invention, the hash table manager may identify a request (to enter a new hash entry into the hash table) by one or more cores of the nodes and intervene in the process to coordinate hash table management. Alternatively, in one or more embodiments of the invention, a core sends the request to the hash table manager in order to write the new hash entry to the hash table.

In one or more embodiments of the invention, the core requesting the new hash entry (or the hash table manager) writes the new hash entry in a core uncommitted entry queue (associated with that core). In one embodiment of the invention, the new hash entry will remain in the core uncommitted entry queue (associated with that core) until the new hash entry is copied to the hash table (Step 2410). In one or more embodiments of the invention, similar to the core LRU entry queues, one or more core uncommitted entry queues may exists, each uniquely associated with each core, and are used to store new hash entries prior to being copied to the hash table.

In Step 2402, the hash table manager determines if the number of hash entries in the hash table exceeds a threshold. In one or more embodiments of the invention, a hash table is limited in size and therefore can only accept a limited number of hash entries. In one embodiment of the invention, a hash table manager is configured to analyze the hash table, prior to writing a new entry, to determine is sufficient space is available to write the new hash entry associated with request (received in Step 2400).

If the hash table manager determines that the number of hash table entries exceeds a threshold (2402-YES), the process proceeds to Step 2404. If the hash table manager determines that the number of hash table entries does not exceed a threshold (2402—NO), the process proceeds to Step 2406.

In Step 2404, the hash table manager identifies, locates, and removes an existing entry within the hash table. Details regarding the process of Step 2404 are discussed in the description of FIG. 25.

In Step 2406, the hash table manager locates the hash bucket associated with the new hash entry. As discussed in the description of FIG. 22, in one or more embodiments of the invention, each hash entry is associated with a unique hash bucket of the hash table. In one or more embodiments of the invention, the hash function may not yet have been performed on the data to be entered into the hash table. Accordingly, in one embodiment of the invention, the hash table manager processes the data to generate a hash entry and therefore identify the hash bucket associated with the hash entry.

In Step 2408, the hash table manager locks the hash bucket identified in Step 2406 (where the new hash entry is going to written). In one or more embodiments of the invention, the hash table manager locks the hash bucket to prevent one or more other process(es) (core processes, executing software, etc.) from altering the same hash bucket while the hash table manager is performing operations, on the hash table, related to that hash bucket.

In Step 2410, the hash table manager writes the new hash entry to hash table. In one or more embodiments of the invention, the hash table manager writes the new hash entry into the table and associates the new hash entry with the hash bucket (locked in Step 2408) corresponding to the value of data as processed by the hash function.

In one or more embodiments of the invention, the new hash entry may be copied from a core uncommitted queue entry queue, uniquely associated with the core, that stores the new hash value. In one or more embodiments of the invention, the core creates and stores the new hash entry in its associated core uncommitted queue entry queue while the hash table manager determines if the hash table can accept the new hash entry and prepares the associated hash bucket (e.g., the process of Steps 2400-2408 and FIG. 25). Further, in one or more embodiments of the invention, the core uncommitted hash queue entry and the hash table may both exist on memory devices, thereby allowing for the direct memory copy of the new hash queue from the core uncommitted queue entry queue to the hash table.

In Step 2412, the hash table manager unlocks the hash bucket associated with the new hash entry. In one or more embodiments of the invention, the hash bucket is unlocked so that other processes needing to modify that same hash bucket may add and/or remove hash entries, as needed, to update the hash bucket.

In Step 2414, the hash table manager adds a new LRU entry that includes a pointer to the new hash entry (written in Step 2410) to the core LRU entry queue associated with core that requested the new hash entry. In one or more embodiments of the invention, as discussed in the description of FIG. 23, the last entry added to the hash table, for a particular core, is the most-recently-used hash entry. Accordingly, in one embodiment of the invention, reference to the new hash entry is added to the "end" of the core LRU entry queue associated with that core.

Figure 25:
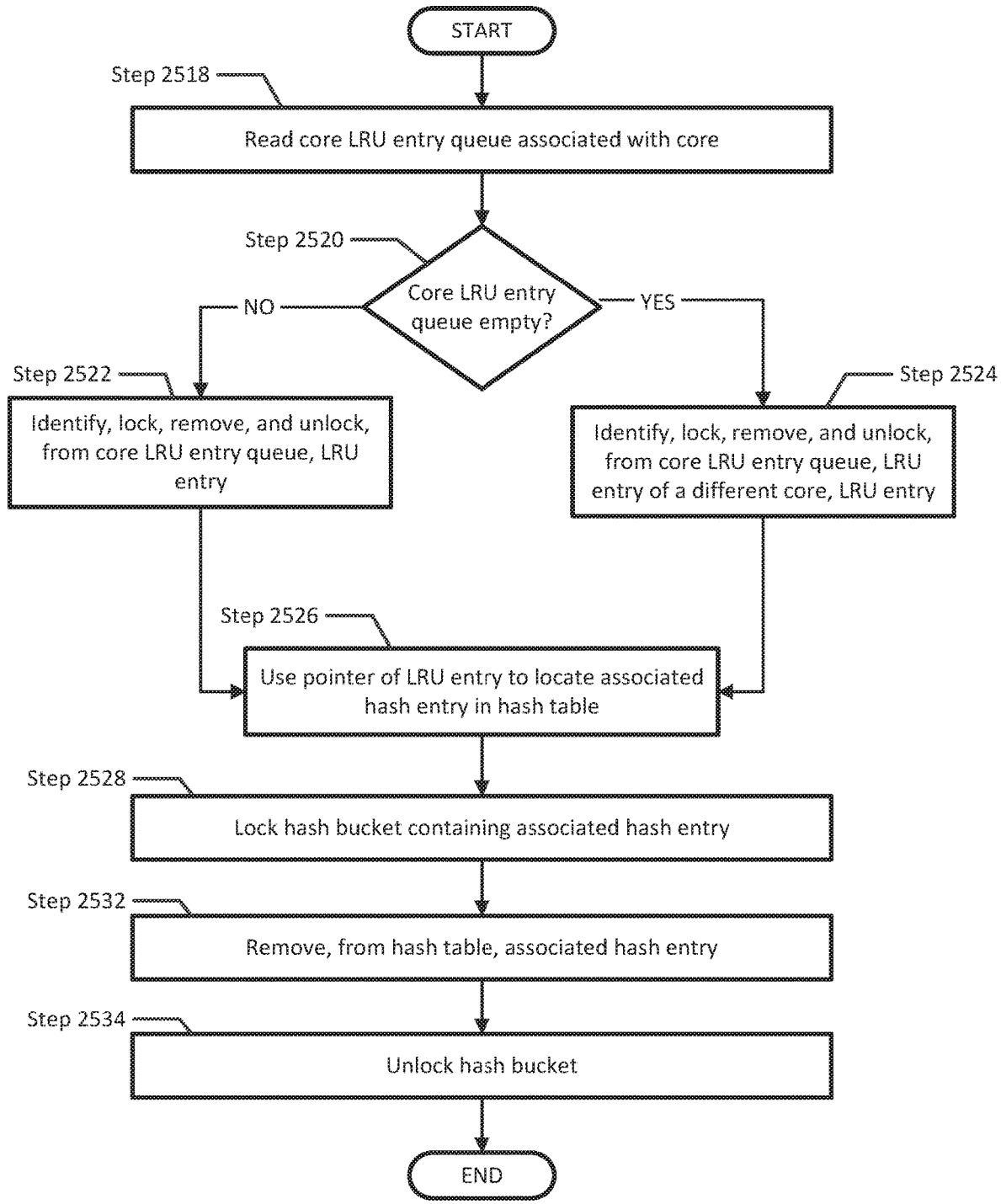
FIG. 25 shows a flowchart of a method of evicting hash entries, in accordance with one or more embodiments of the invention.

FIG. 25 shows a flowchart of a method of evicting hash entries, in accordance with one or more embodiments of the invention. All or a portion of the method shown in FIG. 25 may be performed by a hash table manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 2518, the hash table manager reads the core LRU entry queue associated with the core making the new hash entry request. In one or more embodiments of the invention, the hash table manager identifies the core, based on the new hash entry request, and performs a lookup to identify the core LRU entry queue associated with that core.

In Step 2520, the hash table manager determines if the core LRU entry queue, associated with the core that made the new hash entry request, is empty. In one or more embodiments of the invention, as discussed in the description of FIG. 23, a core LRU entry queue may not include an LRU entry for a particular core (that core may not have previously generated any hash entries or, all existing hash entries from that core were previously evicted). Thus, in one embodiment of the invention, the hash table manager first analyzes the core LRU entry queue (associated with the requesting core) to determine if an LRU entry exists with which to find an associated hash entry.

If the hash table manager determines that the core LRU entry queue is empty (2520-YES), the process proceeds to Step 2524. If the hash table manager determines that the core LRU entry queue is not empty (2520-NO), the process proceeds to Step 2522.

In Step 2522, the hash table manager identifies, in the core LRU entry queue associated with the core that made the hash entry request, the first LRU entry indicating the LRU hash entry for that core. In one or more embodiments of the invention, as discussed in the description of FIG. 23, only one entry in the core LRU entry queue indicates the hash entry that is actually the least-recently-used hash entry (e.g., the "first" LRU entry).

In one or more embodiments of the invention, the hash table manager locks the core LRU entry queue, saves the pointer indicated by the LRU entry, removes the LRU entry from the core LRU entry queue, then unlocks the core LRU entry queue. Accordingly, in one embodiment of the invention, no other processes are able to manipulate the core LRU entry queue while the hash table manager is removing the LRU entry.

In Step 2524, the hash table manager identifies, in the core LRU entry queue of a different core, the LRU entry that indicates the LRU hash entry for that different core. In one or more embodiments of the invention, as determined in Step 2520, the core LRU entry queue for the core that requested the new hash entry may be empty. Accordingly, in one embodiment of the invention, the hash table manager identifies the first LRU entry of a different core, from the core LRU entry queue of that other core. In one or more embodiments of the invention, as discussed in the description of FIG. 23, only one entry in the core LRU entry queue indicates the hash entry that is actually the least-recently-used hash entry (e.g., the "first" LRU entry).

In one or more embodiments of the invention, the hash table manager locks the core LRU entry queue of a different core, saves the pointer indicated by the LRU entry for that different core, removes the LRU entry of that different core from the core LRU entry queue of that different core, then unlocks the core LRU entry queue of that different core. Accordingly, in one embodiment of the invention, no other processes are able to manipulate the core LRU entry queue of that different core while the hash table manager is removing the LRU entry.

In Step 2526, the hash table manager reads the first LRU entry, identified in Step 2524, and uses the pointer of the first LRU entry to locate the hash entry associated with the first LRU entry. In one or more embodiments of the invention, as discussed in the description of FIG. 23, the LRU entry includes a pointer to the hash entry associated with that LRU. Thus, in one embodiment of the invention, the hash table manager reads the LRU entry and uses the pointer specified therein to locate the hash entry (and the hash bucket to which the hash entry is associated) in the hash table.

In Step 2528, the hash table manager locks the hash bucket identified in Step 2526 (where the first LRU entry pointer indicated the hash entry). In one or more embodiments of the invention, the hash table manager locks the hash bucket to prevent one or more other process(es) (core processes, executing software, etc.) from altering the same hash bucket while the hash table manager is performing operations, on the hash table, related to that hash bucket.

In Step 2532, the hash table manager removes the hash entry, associated with the LRU entry, from the hash table. In one or more embodiments of the invention, the hash table manager removes the hash entry by modifying the hash table to remove any reference to the hash entry and further modify the hash bucket (from which the hash entry is removed) to allow for proper functioning of the hash table (e.g., reforming indirect hash entry links, if necessary).

In Step 2534, the hash table manager unlocks the bucket that included the removed hash entry (locked in Step 2528). In one or more embodiments of the invention, after the removal of the hash entry, the hash table now includes an available space to write the new hash entry requested by the core (Step 2400). After the completion of Step 2534, the process proceeds to Step 2406.

Figure 26:
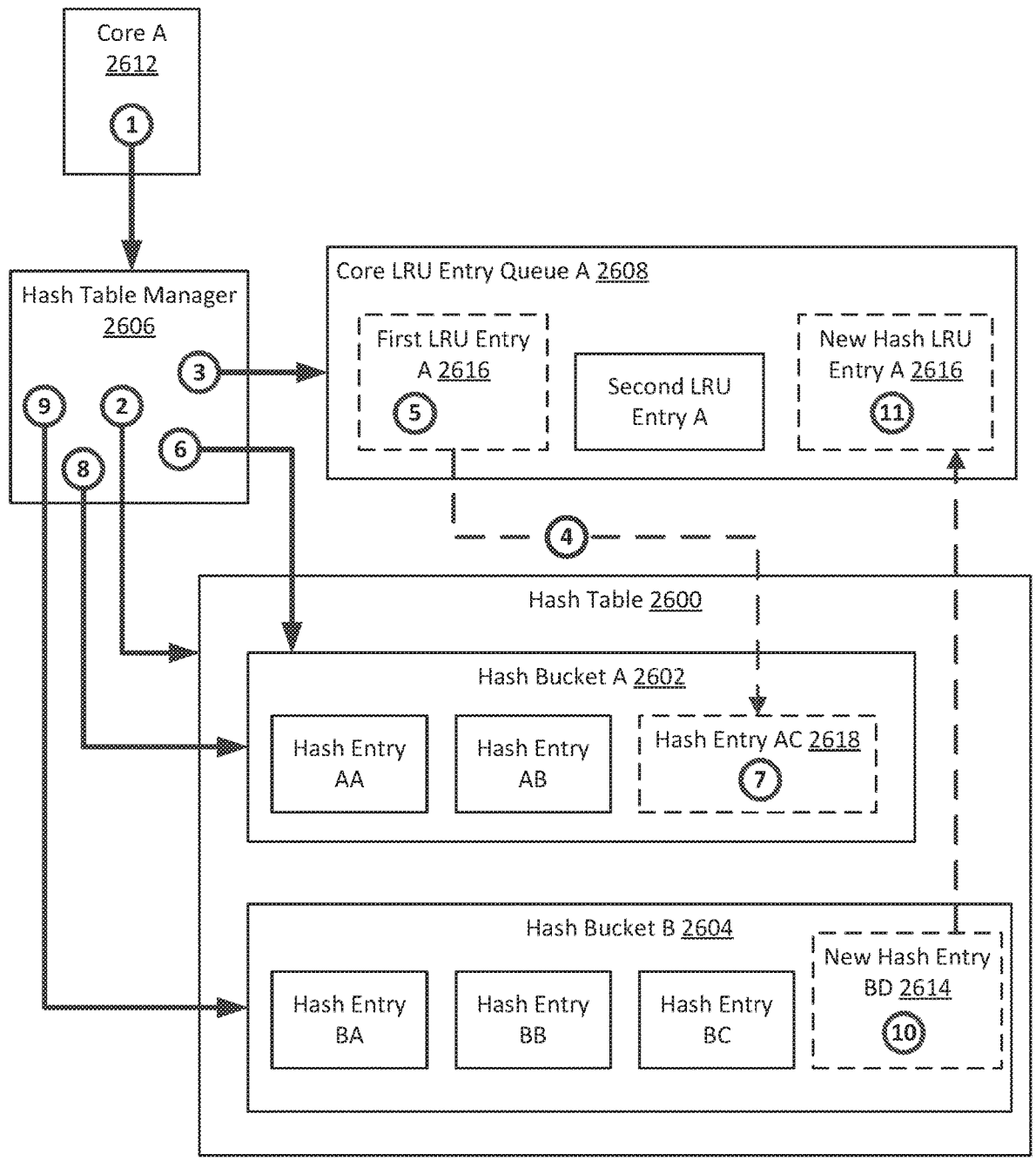
FIG. 26 shows an example, in accordance with one or more embodiments of the invention.

FIG. 26 shows an example, in accordance with one or more embodiments of the invention. The following use case is for explanatory purposes only and not intended to limit the scope to this embodiment.

In FIG. 26, consider a scenario in which, at (1), core A (2612) requests a new hash entry (new hash entry BD (2614)) be entered into hash table (2600). At (2), the hash table manager (2606) analyzes the hash table (2600) and determines that the hash table (2600) is full and that no new hash entries can be added to the table without first evicting an existing hash entry.

At (3), the hash table manager (2606) reads core LRU entry queue A (2608) associated with core A (2612) and identifies first LRU Entry A (2616) as the first LRU entry in core LRU entry queue A (2608). The hash table manager then locks core LRU entry queue A (2608), reads first LRU entry A (2616), and identifies the pointer therein pointing to the associated hash entry. At (4), the hash table manager (2606) uses the pointer of first LRU entry A (2616) and identifies and locates hash entry AC (2618) in the hash table. At (5), the hash table manager removes first LRU entry A (2616) from core LRU entry queue A (2608) and unlocks core LRU entry queue A (2608).

At (6), the hash table manager (2606) locks hash bucket A (2602) (the hash bucket associated with hash entry AC (2618)). At (7), the hash table manager removes hash entry AC (2618) from the hash table (2600). At (8), the hash table manager (2606) further modifies hash bucket A (2602) to allow for proper operation (now that hash entry AC (2618) is removed from hash bucket A (2602) (e.g., reforming indirect hash entry links, if necessary)) and unlocks hash bucket A (2602).

At (9), the hash table manager (2606) identifies hash bucket B (2604) as the hash bucket associated with the new hash entry (new hash entry BD (2614)) and locks hash bucket B (2604). At (10), the hash table manager (2606) adds new hash entry BD (2614) to hash bucket B (2604). Further, at (10), the transaction log manager (2606) unlocks hash bucket B (2604) after the new hash entry is added. At (11), the hash table manager (2606) adds new hash LRU entry A (2616) to the core LRU entry queue A (2608) with a pointer to new hash entry BD (2614). The hash table manager adds new hash LRU entry A (2616) to the end of the core LRU entry queue A (2608), as new hash entry BD (2614) is the most-recently-used hash entry (and therefore is placed at the end of the associated core LRU entry queue).

One or more embodiments of the invention make it possible to maintain transaction records of alternation to data on a per core basis. Further, one or more other embodiments of the invention make it possible to efficiently maintain one or more hash tables by evicting entries on a per core basis. Thus, as transaction logging and/or hash table management are occurring on a per core basis, the possibility for lock contention, of those cores, is minimized, as those other cores are independently operating (with their own transaction log regions and/or core LRU entry queues).

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:

1. A method for storing transaction records, comprising:
    receiving, by a transaction log manager, a first commit request for a first transaction record from a first core;
    copying, based on the first commit request, the first transaction record to a first region of memory, wherein the first region is uniquely associated with the first core;
    making a first determination that the first region surpasses a space threshold; and
    copying, based on the first determination, a first plurality of transaction records from the first region to storage, wherein the first plurality of transaction records comprises the first transaction record,
    wherein prior to making the first determination, the method further comprises:
        receiving a second commit request for a second transaction record from a second core;
        copying, based on the second commit request, the second transaction record to a second region of the memory;
        receiving a third commit request for a third transaction record from the first core; and
        copying, based on the third commit request, the third transaction record to the first region.

2. The method of claim 1, wherein the method further comprises:
    after making the first determination:
        sending a pause command to the first core,
    after copying the first plurality of transaction records:
        sending a resume command to the first core.

3. The method of claim 1, wherein the first plurality of transaction records further comprises the third transaction record.

4. The method of claim 3, wherein the method further comprises:
- receiving a replay request; and
- generating, based on the replay request, a reordered transaction log, wherein the reordered transaction log comprises:
  - the first plurality of transaction records; and
  - the second transaction record.

5. The method of claim 4, wherein generating the reordered transaction log comprises:
- analyzing a timestamp of each of the first plurality of transaction records and the second transaction record; and
- reordering, based on timestamp, each of the first plurality of transaction records and the second transaction record.

6. A non-transitory computer readable medium comprising instructions which, when executed by a computer processor, enables the computer processor to perform a method for storing transaction records, the method comprising:
- receiving, by a transaction log manager, a first commit request for a first transaction record from a first core;
- copying, based on the first commit request, the first transaction record to a first region of memory, wherein the first region is uniquely associated with the first core;
- making a first determination that the first region surpasses a space threshold; and
- copying, based on the first determination, a first plurality of transaction records from the first region to storage, wherein the first plurality of transaction records comprises the first transaction record,
- wherein prior to making the first determination, the method further comprises:
  - receiving a second commit request for a second transaction record from a second core;
  - copying, based on the second commit request, the second transaction record to a second region of the memory;
  - receiving a third commit request for a third transaction record from the first core; and
  - copying, based on the third commit request, the third transaction record to the first region.

7. The non-transitory computer readable medium of claim 6, wherein the method further comprises:
- after making the first determination:
  - sending a pause command to the first core,
- after copying the first plurality of transaction records:
  - sending a resume command to the first core.

8. The non-transitory computer readable medium of claim 6, wherein the first plurality of transaction records further comprises the third transaction record.

9. The non-transitory computer readable medium of claim 8, wherein the method further comprises:
- receiving a replay request; and
- generating, based on the replay request, a reordered transaction log, wherein the reordered transaction log comprises:
  - the first plurality of transaction records; and
  - the second transaction record.

10. The non-transitory computer readable medium of claim 9, wherein generating the reordered transaction log comprises:
- analyzing a timestamp of each of the first plurality of transaction records and the second transaction record; and
- reordering, based on timestamp, each of the first plurality of transaction records and the second transaction record.

11. A node, comprising:
memory; and
a processor, wherein the processor is configured to:
- receive, by a transaction log manager, a first commit request for a first transaction record from a first core;
- copy, based on the first commit request, the first transaction record to a first region of the memory, wherein the first region is uniquely associated with the first core;
- make a first determination that the first region surpasses a space threshold; and
- copy, based on the first determination, a first plurality of transaction records from the first region to storage, wherein the first plurality of transaction records comprises the first transaction record,
- wherein prior to making the first determination, the processor is further configured to:
  - receive a second commit request for a second transaction record from a second core;
  - copy, based on the second commit request, the second transaction record to a second region of the memory;
  - receive a third commit request for a third transaction record from the first core; and
  - copy, based on the third commit request, the third transaction record to the first region.

12. The node of claim 11, wherein the processor is further configured to:
- after making the first determination:
  - send a pause command to the first core,
- after copying the first plurality of transaction records:
  - send a resume command to the first core.

13. The node of claim 11, wherein the first plurality of transaction records further comprises the third transaction record.

14. The node of claim 13, wherein the processor is further configured to:
- receive a replay request; and
- generate, based on the replay request, a reordered transaction log, wherein the reordered transaction log comprises:
  - the first plurality of transaction records; and
  - the second transaction record.

* * * * *